(12) United States Patent
Negatu et al.

(10) Patent No.: US 11,680,950 B2
(45) Date of Patent: Jun. 20, 2023

(54) SCANNING APPARATUS AND METHODS FOR DETECTING CHEMICAL AND BIOLOGICAL ANALYTES

(71) Applicant: Pacific Biosciences of California, Inc., Menlo Park, CA (US)

(72) Inventors: Matias Negatu, San Diego, CA (US); Alex Nemiroski, San Diego, CA (US); Drew Ival Frerichs, San Diego, CA (US); Dale Buermann, San Diego, CA (US); Michael John Erickstad, San Diego, CA (US); Rebecca McGinley, San Diego, CA (US); Harry Scott Rapoport, San Diego, CA (US); Arnold Oliphant, Morgan Hill, CA (US); Eugene Pogrebinsky, San Diego, CA (US)

(73) Assignee: Pacific Biosciences of California, Inc., Menlo Park, CA (US)

( * ) Notice: Subject to any disclaimer, the term of this patent is extended or adjusted under 35 U.S.C. 154(b) by 626 days.

(21) Appl. No.: 16/796,623

(22) Filed: Feb. 20, 2020

(65) Prior Publication Data

US 2020/0264204 A1    Aug. 20, 2020

Related U.S. Application Data

(60) Provisional application No. 62/807,934, filed on Feb. 20, 2019.

(51) Int. Cl.
*G01N 35/02* (2006.01)
*G01N 35/04* (2006.01)

(52) U.S. Cl.
CPC ... *G01N 35/026* (2013.01); *G01N 2035/0413* (2013.01); *G01N 2035/0465* (2013.01); *G01N 2035/0475* (2013.01)

(58) Field of Classification Search
CPC ......... G01N 35/026; G01N 2035/0413; G01N 2035/0465; G01N 2035/0475;
(Continued)

(56) References Cited

U.S. PATENT DOCUMENTS 3,572,888 A    3/1971   Kawashima
3,765,745 A    10/1973  Burboeck
(Continued)

FOREIGN PATENT DOCUMENTS

CA    2227177 A1    2/1997
JP    5499404 B2    5/2014
(Continued)

OTHER PUBLICATIONS

WO, International Search Report dated Nov. 7, 2018 for PCT Application No. PCT/US2018/000164, filed Aug. 15, 2018, 6 pages, dated Nov. 7, 2018.
(Continued)

*Primary Examiner* — Jill A Warden
*Assistant Examiner* — John Mcguirk
(74) *Attorney, Agent, or Firm* — Orrick, Herrington & Sutcliffe, LLP

(57) ABSTRACT

A scanning apparatus that can include (a) a scan actuator including a linear actuator and a mount for a removeable vessel, wherein the mount has a mechanical fastener that is configured to engage a complementary mechanical fastener on the removeable vessel, and wherein the linear actuator is configured to translate the mount while the mechanical fastener engages the complementary mechanical fastener on the removeable vessel; (b) a reference surface; and (c) a preload configured to urge the vessel to contact the reference surface, wherein the linear actuator is configured to slide the vessel along the reference surface while the preload urges the vessel to contact the reference surface.

18 Claims, 35 Drawing Sheets

(58) Field of Classification Search
CPC .... G01N 21/85; G01N 21/8483; B01L 9/527; B01L 2200/025; B01L 2200/027; B01L 2300/0816; G02B 21/26
See application file for complete search history.

(56) References Cited

U.S. PATENT DOCUMENTS

| | | | |
|---|---|---|---|
| 4,012,112 | A | 3/1977 | Masterson |
| 4,589,551 | A | 5/1986 | Helion |
| 4,704,013 | A | 11/1987 | Clark |
| 4,902,132 | A | 2/1990 | Murphy, Jr. et al. |
| 5,130,238 | A | 7/1992 | Malek et al. |
| 5,234,665 | A | 8/1993 | Ohta et al. |
| 5,455,166 | A | 10/1995 | Walker |
| 5,459,325 | A | 10/1995 | Hueton et al. |
| 5,587,833 | A | 12/1996 | Kamentsky |
| 5,592,289 | A | 1/1997 | Norris |
| 5,641,658 | A | 6/1997 | Adams et al. |
| 5,695,934 | A | 12/1997 | Brenner |
| 5,863,722 | A | 1/1999 | Brenner |
| 5,888,737 | A | 3/1999 | DuBridge et al. |
| 6,140,489 | A | 10/2000 | Brenner |
| 6,151,161 | A | 11/2000 | Mayer et al. |
| 6,175,002 | B1 | 1/2001 | DuBridge et al. |
| 6,214,587 | B1 | 4/2001 | Dattagupta et al. |
| 6,266,459 | B1 | 7/2001 | Walt et al. |
| 6,355,431 | B1 | 3/2002 | Chee et al. |
| 6,770,441 | B2 | 8/2004 | Dickinson et al. |
| 6,859,570 | B2 | 2/2005 | Walt et al. |
| 7,001,792 | B2 | 2/2006 | Sauer et al. |
| 7,057,026 | B2 | 6/2006 | Barnes et al. |
| 7,115,400 | B1 | 10/2006 | Adessi et al. |
| 7,211,414 | B2 | 5/2007 | Hardin et al. |
| 7,315,019 | B2 | 1/2008 | Turner et al. |
| 7,329,492 | B2 | 2/2008 | Hardin et al. |
| 7,329,860 | B2 | 2/2008 | Feng et al. |
| 7,405,281 | B2 | 7/2008 | Xu et al. |
| 7,622,294 | B2 | 11/2009 | Walt et al. |
| 8,252,911 | B2 | 8/2012 | Bjornson et al. |
| 8,530,164 | B2 | 9/2013 | Patel et al. |
| 8,951,781 | B2 | 2/2015 | Reed et al. |
| 9,073,033 | B2 | 7/2015 | Lebl et al. |
| 9,193,996 | B2 | 11/2015 | Buermann et al. |
| 9,476,080 | B2 | 10/2016 | Li et al. |
| 9,581,550 | B2 | 2/2017 | Rulison et al. |
| 10,501,796 | B2 | 12/2019 | Buermann et al. |
| 10,858,701 | B2 | 12/2020 | Buermann et al. |
| 10,858,703 | B2 | 12/2020 | Buermann et al. |
| 2002/0055100 | A1 | 5/2002 | Kawashima et al. |
| 2004/0002090 | A1 | 1/2004 | Mayer et al. |
| 2004/0096853 | A1 | 5/2004 | Mayer |
| 2005/0064460 | A1 | 3/2005 | Holliger et al. |
| 2005/0130173 | A1 | 6/2005 | Leamon et al. |
| 2007/0020152 | A1 | 1/2007 | Costello et al. |
| 2007/0099208 | A1 | 5/2007 | Drmanac et al. |
| 2007/0128624 | A1 | 6/2007 | Gormley et al. |
| 2008/0009420 | A1 | 1/2008 | Schroth et al. |
| 2008/0108082 | A1 | 5/2008 | Rank et al. |
| 2009/0026082 | A1 | 1/2009 | Berg et al. |
| 2009/0127589 | A1 | 5/2009 | Berg et al. |
| 2009/0197326 | A1 | 8/2009 | El Gamal et al. |
| 2009/0247414 | A1 | 10/2009 | Obradovic et al. |
| 2010/0111768 | A1 | 5/2010 | Banerjee et al. |
| 2010/0137143 | A1 | 6/2010 | Berg et al. |
| 2010/0282617 | A1 | 11/2010 | Berg et al. |
| 2011/0090563 | A1 | 4/2011 | Krasov |
| 2011/0157343 | A1 | 6/2011 | Blum et al. |
| 2012/0002276 | A1 | 1/2012 | Suzuki et al. |
| 2012/0270305 | A1 | 10/2012 | Reed et al. |
| 2015/0293021 | A1 | 10/2015 | Finkelstein et al. |
| 2016/0017416 | A1 | 1/2016 | Boyanov et al. |
| 2016/0076025 | A1 | 3/2016 | Boutell et al. |
| 2016/0356715 | A1 | 12/2016 | Zhong et al. |
| 2017/0022553 | A1 | 1/2017 | Vijayan et al. |
| 2017/0191125 | A1 | 7/2017 | Vijayan et al. |
| 2018/0044727 | A1 | 2/2018 | Vijayan et al. |
| 2018/0187245 | A1 | 7/2018 | Dambacher et al. |
| 2018/0208983 | A1 | 7/2018 | Dambacher et al. |
| 2018/0259432 | A1 | 9/2018 | Lee et al. |
| 2018/0280975 | A1 | 10/2018 | Kilcoin et al. |
| 2019/0055596 | A1 | 2/2019 | Buermann et al. |
| 2019/0055598 | A1 | 2/2019 | Buermann et al. |
| 2020/0063201 | A1 | 2/2020 | Buermann et al. |

FOREIGN PATENT DOCUMENTS

| | | |
|---|---|---|
| WO | WO-91/06678 A1 | 5/1991 |
| WO | WO-00/63437 A2 | 10/2000 |
| WO | WO-00/63437 A3 | 10/2000 |
| WO | WO-2004/018497 A2 | 3/2004 |
| WO | WO-2004/018497 A3 | 3/2004 |
| WO | WO-2005/010145 A2 | 2/2005 |
| WO | WO-2005/010145 A3 | 2/2005 |
| WO | WO-2005/065814 A1 | 7/2005 |
| WO | WO-2007/095090 A2 | 8/2007 |
| WO | WO-2007/095090 A3 | 8/2007 |
| WO | WO-2007/123744 A2 | 11/2007 |
| WO | WO-2007/123744 A3 | 11/2007 |
| WO | WO-2012/096703 A1 | 7/2012 |
| WO | WO 2014033320 A1 | 3/2014 |
| WO | WO 2015107359 A1 | 7/2015 |
| WO | WO 2016/092815 A2 | 6/2016 |
| WO | WO-2016/1 54193 A1 | 9/2016 |
| WO | WO 2018235073 A1 | 12/2018 |
| WO | WO-2019/035897 A1 | 2/2019 |

OTHER PUBLICATIONS

WO, Written Opinion dated Nov. 7, 2018 for PCT Application No. PCT/US2018/000164, filed Aug. 15, 2018, 8 pages, dated Nov. 7, 2018.
WO, International Search Report and Written Opinion dated May 5, 2020 for PCT Application No. PCT/US2020/019087, filed Feb. 20, 2020, 10 pages, dated May 20, 2020.
Anonymous (Sep. 6, 1998). "Molecular Expressions Microscopy Primer: Anatomy of the Microscope-Microscope Stages," located at <https//micro.magnet.fsu.edu/primer/anatomy/stage.html> 6 pages.
Bently,D.R. et al. (Nov. 6, 2008). "Accurate whole human genome sequencing using reversible terminator chemistry," *Nature* 456(7218):53-59.
Dean, F.B. et al. (Apr. 16, 2002). "Comprehensive human genome amplification using multiple displacement amplification," *PNAS USA* 99(8):5261-5266.
Dressman, D. et al. (Jul. 22, 2003, e-published Jul. 11, 2003). "Transforming single DNA molecules into fluorescent magnetic particles for detection and enumeration of genetic variations," *PNAS USA* 100(15):8817-8822.
Kern, M.A. (Sep. 3, 2005). "Stage-extension device for transmission light microscopes," *The Royal Microscopical Society Journal of Microscopy*, 219:157-159.
Korlach, J. et al. (Jan. 29, 2008, e-published Jan. 23, 2008). "Selective aluminum passivation for targeted immobilization of single DNA polymerase molecules in zero-mode waveguide nanostructures," *PNAS USA* 105(4):1176-1181.
Lage, J.M. et al. (Feb. 2003). "Whole genome analysis of genetic alterations in small DNA samples using hyperbranched strand displacement amplification and array-CGH," *Genome Res* 13(2):294-307.
Levene, M.J. et al. (Jan. 31, 2003). "Zero-mode waveguides for single-molecule analysis at high concentrations," *Science* 299(5607):682-686.
Lizardi, P.M. et al. (Jul. 1998). "Mutation detection and single-molecule counting using isothermal rolling-circle amplification," *Nat Genet* 19(3):225-232.
Lundquist, P.M. et al. (May 2008). "Parallel confocal detection of single molecules in real time," *Opt Lett* 33(9):1026-1028.
Soni & Meller, Clin. Chem. 53, 1996-2001 (2007).
Walker, G.T. et al. (Apr. 11, 1992). "Strand displacement amplification—an isothermal, in vitro DNA amplification technique," *Nucleic Acids Res* 20(7):1691-1696.

(56) References Cited

OTHER PUBLICATIONS

CN, First Office Action for Application No. 202080023035.0 with English translation, 14 pages, dated Aug. 19, 2022.
EP, Extended European Search Report for European Application No. 20758896.3, 6 pages, dated Nov. 14, 2022.

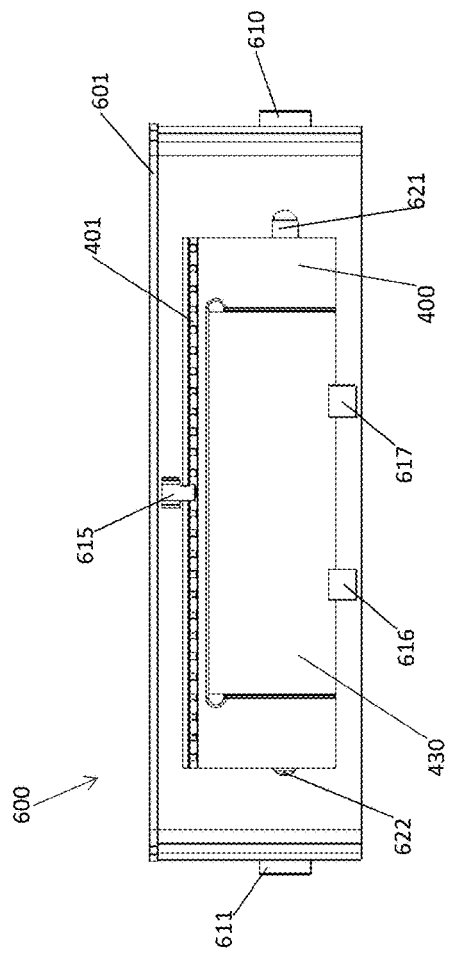
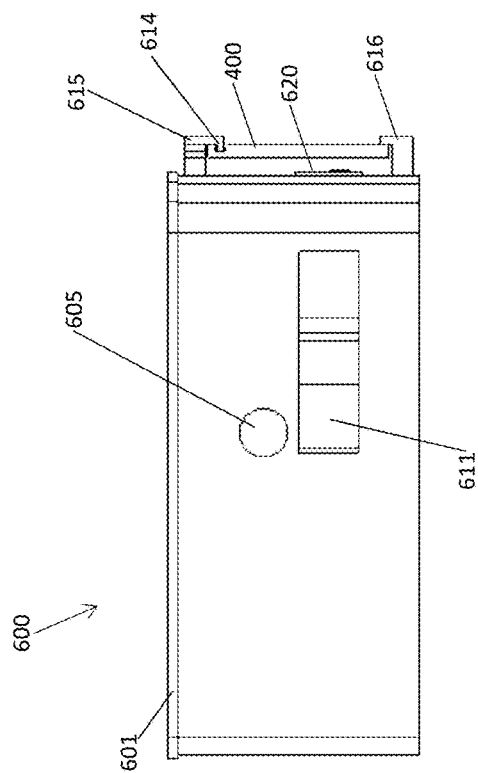

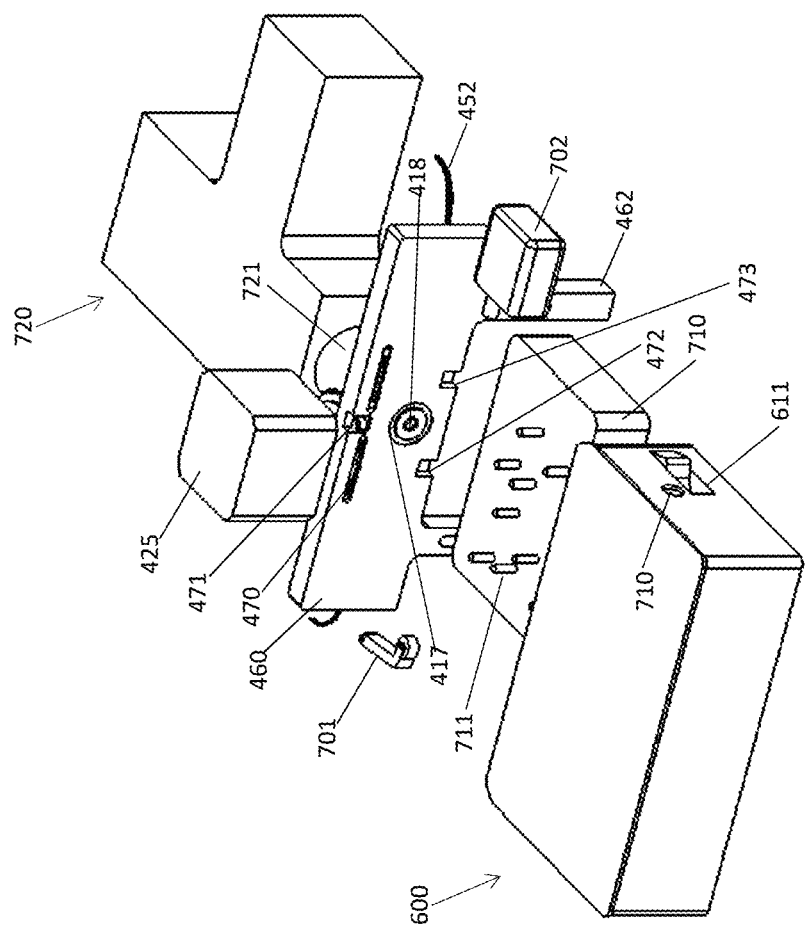

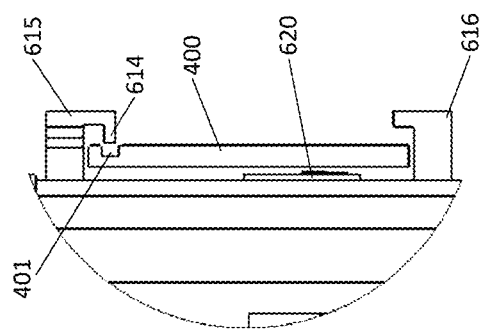
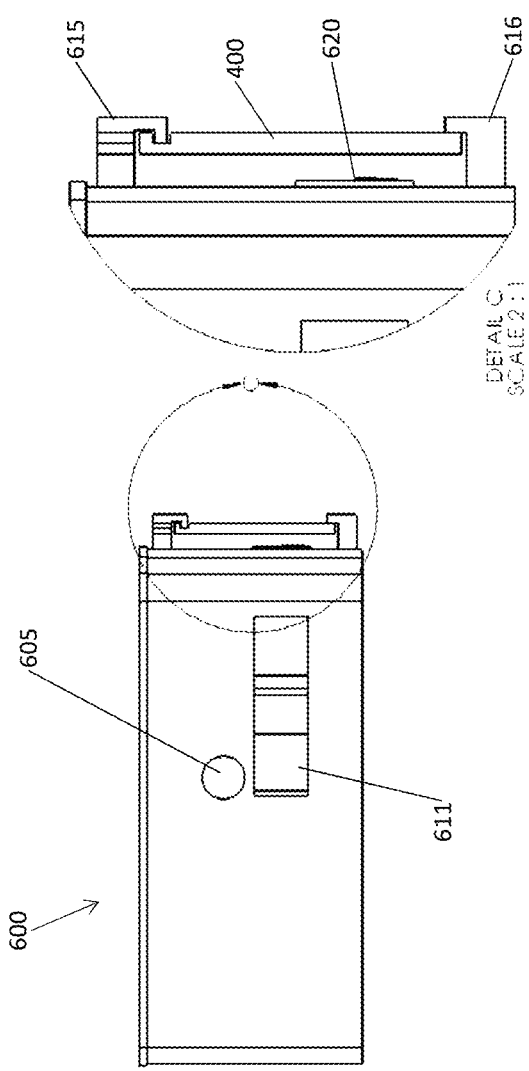
FIG. 10A
FIG. 10B

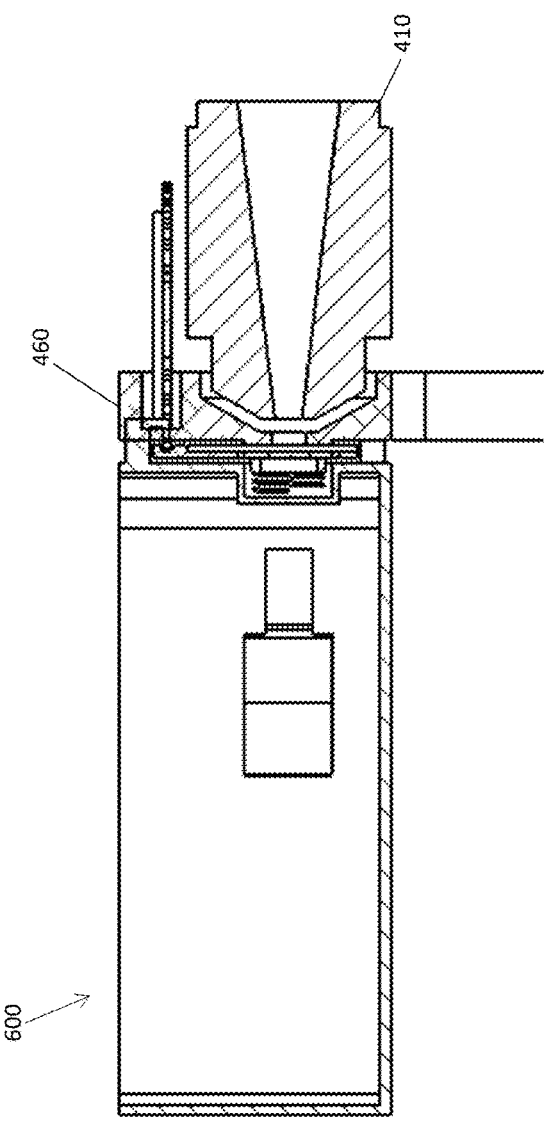
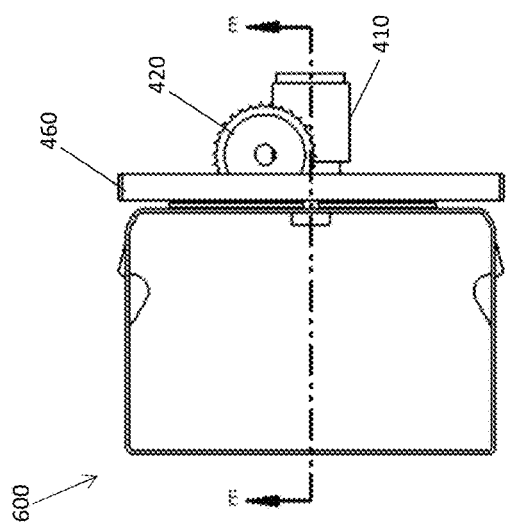

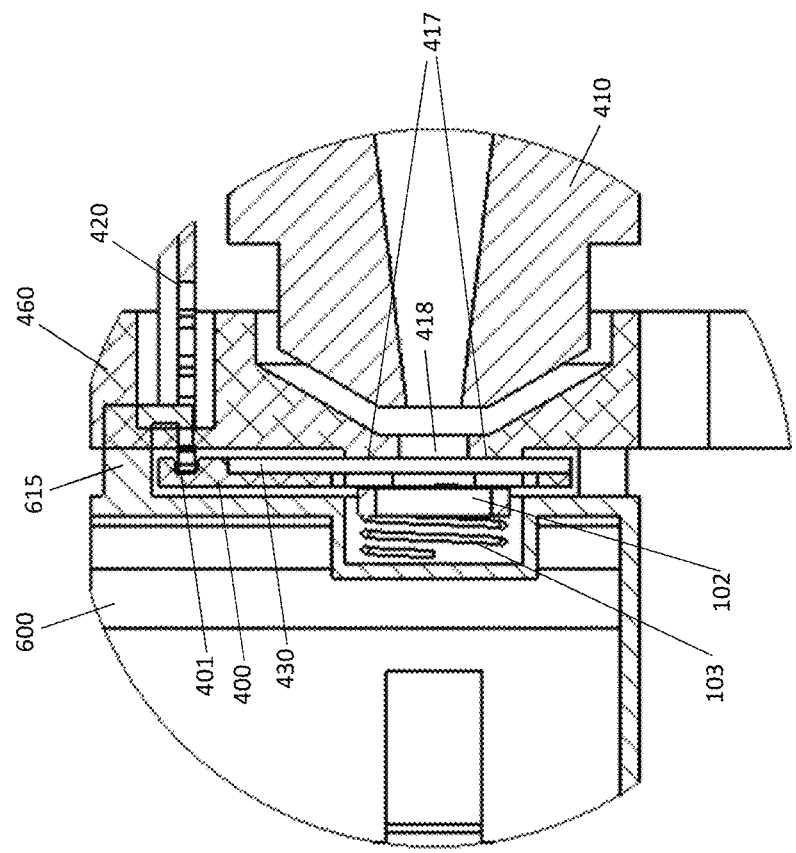

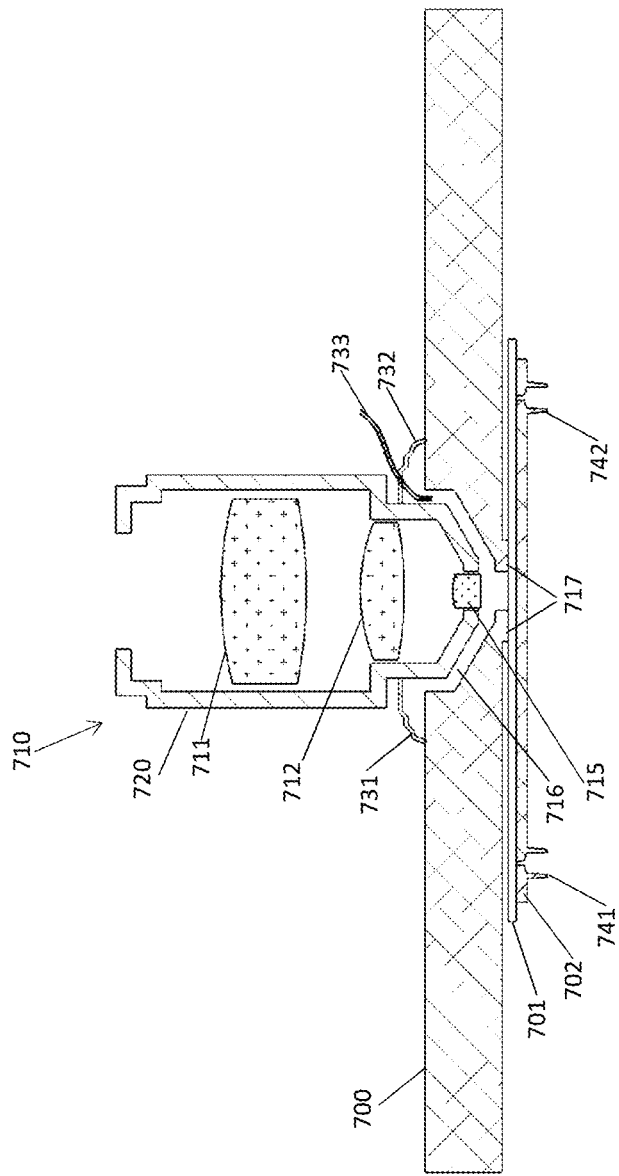

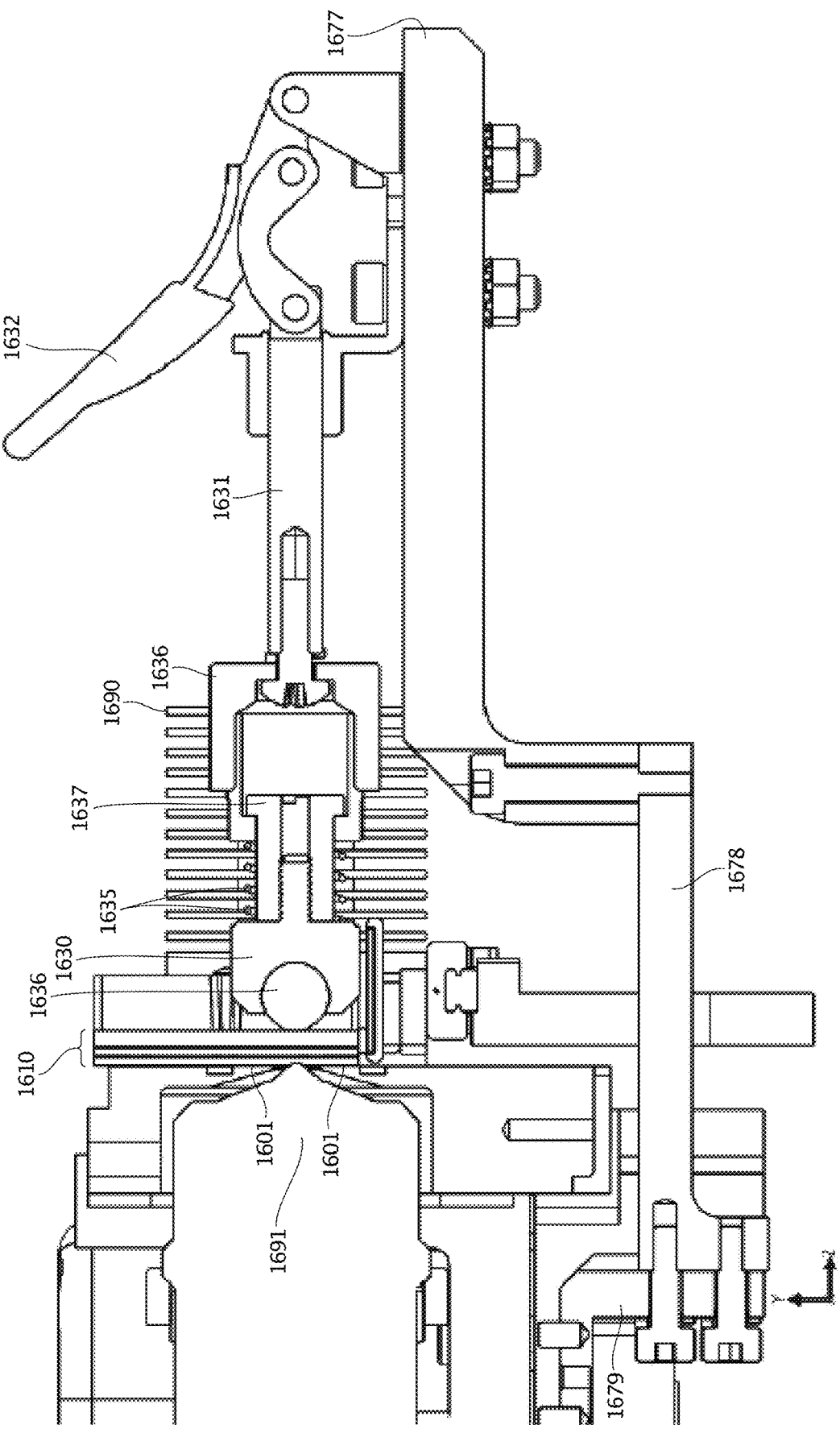

SCANNING APPARATUS AND METHODS FOR DETECTING CHEMICAL AND BIOLOGICAL ANALYTES

This application is based on, and claims the benefit of, U.S. Provisional Application No. 62/807,934, filed Feb. 20, 2019, which is incorporated herein by reference.

BACKGROUND

The present disclosure relates generally to detection of chemical and biological analytes and has specific applicability to nucleic acid sequencing.

The determination of nucleic acid sequence information is important in biological and medical research. Sequence information is used for identifying gene associations with diseases and phenotypes, identifying potential drug targets, and understanding the mechanisms of disease development and progress. Sequence information is an important part of personalized medicine, where it can be used to optimize the diagnosis, treatment, or prevention of disease for a specific individual.

Many scientists and medical practitioners struggle to tap into modern sequencing technology due to prohibitive costs to run and maintain complex instrumentation in current commercial offerings. These platforms favor centralized laboratories in which expensive "factory scale" instruments are run by highly trained specialists, and samples are batched to achieve economies of scale. This centralized system offers very little flexibility in terms of performance specifications—users are forced into ecosystems that are unnecessarily limited in scope and variety of use. When it comes to clinical applications, the centralized model is costly for doctors and their patients in terms of both the time and money required to ship patient samples from local clinics to distant sequencing labs. Further delays can be incurred as a centralized sequencing lab waits to receive sufficient number of samples to batch together into an economical run. Other applied markets such as forensics, veterinary diagnostics, food safety, agricultural analysis and environmental analysis suffer similar limitations.

Thus, there is a need for a sequencing platform that is better suited for use in local laboratories in support of a decentralized system of research and clinical care. The present invention satisfies this need and provides related advantages as well.

BRIEF SUMMARY

The present disclosure provides a scanning detection apparatus that can include (a) a scan actuator including a linear actuator and a mount for a removeable vessel, wherein the mount has a mechanical fastener that is configured to engage a complementary mechanical fastener on the removeable vessel, and wherein the linear actuator is configured to translate the mount while the mechanical fastener engages the complementary mechanical fastener on the removeable vessel; (b) a detection apparatus including a reference surface that forms a structural loop with a detector, and an objective configured to direct an optical signal from the vessel to the detector; and (c) a preload configured to urge the vessel to contact the reference surface, wherein the linear actuator is configured to slide the vessel along the reference surface while the preload urges the vessel to contact the reference surface. Optionally the mechanical fastener comprises one or more post and the complementary mechanical fastener comprises one or more slot.

A method of scanning a vessel is provided and can include steps of (a) providing a scan actuator including a linear actuator and a mount, wherein the mount includes a mechanical fastener; (b) engaging a vessel with the mount, whereby the mechanical fastener is engaged with a complementary mechanical fastener on the vessel, wherein the vessel has a lumen and a wall, wherein the lumen contains analytes; (c) activating the scan actuator to slide the engaged vessel along a reference surface of a detection apparatus, wherein the reference surface contacts at most a portion of the wall during the sliding, and wherein the reference surface forms a structural loop with a detector; and (d) detecting the analytes at different locations along the vessel using the detector, wherein the vessel is urged to the reference surface by a preload during the detecting, thereby scanning the vessel. Optionally the mechanical fastener comprises one or more post and the complementary mechanical fastener comprises one or more slot.

In some configurations a method of scanning a vessel can include steps of (a) providing a scan actuator having a linear actuator and a mount, wherein the mount includes a mechanical fastener; (b) engaging a vessel with the mount, whereby the mechanical fastener is engaged with a complementary mechanical fastener on the vessel, wherein the vessel has a lumen and a wall, wherein the lumen contains analytes; (c) examining a first subset of analytes in the engaged vessel while applying a preload to a first portion of the wall, wherein the preload positions the first subset of analytes to occupy an xy plane in a detection zone, wherein the preload is not applied to a second portion of the vessel; (d) activating the scan actuator to translate the engaged vessel to position a second subset of the analytes in the xy plane of the detection zone; and (e) examining the second subset of the analytes in the engaged vessel while applying the preload to a second portion of the vessel, wherein the preload positions the second subset of the analytes to occupy the xy plane of the detection zone, wherein the preload is not applied to the first portion of the vessel, thereby scanning the vessel. Optionally the mechanical fastener comprises one or more post and the complementary mechanical fastener comprises one or more slot.

The present disclosure also provides a detection apparatus that can include (a) a vessel having a lumen and a wall, wherein the wall has an internal surface and an external surface, wherein the internal surface contacts the lumen; (b) a reference surface that forms a structural loop with a detector; (c) a preload configured to urge the external surface of the vessel to contact an area on the reference surface; (d) a scan actuator configured to slide the vessel along the reference surface in a scan dimension; and (e) a transmitter configured to direct, to the detector, a signal from the internal surface or the lumen, when the external surface of the vessel is urged by the preload to contact the reference surface.

Also provided is a method of scanning a vessel. The method can include (a) translating a vessel along a reference surface of a detection apparatus, wherein the vessel comprises a lumen and a wall, wherein the lumen comprises analytes, wherein the reference surface contacts at least a portion of the vessel during the translating, and wherein the reference surface forms a structural loop with a detector; and (b) detecting the analytes at different locations along the vessel using the detector, wherein the vessel is urged to the reference surface by a preload during the detecting, thereby scanning the vessel.

In some embodiments, a method of scanning a vessel can include (a) examining a first subset of analytes in a vessel while applying a preload to a first portion of the vessel, wherein the preload positions the first subset of analytes to occupy an xy plane in a detection zone, wherein the preload is not applied to a second portion of the vessel; (b) translating the vessel to position a second subset of the analytes in the xy plane of the detection zone; and (c) examining the second subset of the analytes in the vessel while applying the preload to a second portion of the vessel, wherein the preload positions the second subset of the analytes to occupy the xy plane of the detection zone, wherein the preload is not applied to the first portion of the vessel, thereby scanning the vessel.

The present disclosure provides reactor apparatus. A reactor apparatus can include (a) a vessel having a lumen and a wall, wherein the wall has an internal surface and an external surface, wherein the internal surface contacts the lumen; (b) a reference surface that forms a structural loop with an energy source; (c) a preload configured to urge the external surface of the vessel to contact an area on the reference surface; (d) a scan actuator configured to slide the vessel along the reference surface in a scan dimension; and (e) a transmitter configured to direct energy from the energy source to the internal surface or the lumen when the external surface of the vessel is urged by the preload to contact the reference surface.

Also provided is a method of performing reactions in a vessel. The method can include (a) translating a vessel along a reference surface of a reactor apparatus, wherein the vessel comprises a lumen and a wall, wherein the lumen comprises reactants, wherein the reference surface contacts at least a portion of the vessel during the translating, and wherein the reference surface forms a structural loop with an energy source; and (b) directing energy from the energy source to the reactants at different locations along the vessel, wherein the vessel is urged to the reference surface by a preload during the directing of the energy to the reactants, thereby performing reactions in the vessel.

A method of performing reactions in a vessel can include (a) delivering energy from a reactor apparatus to a first subset of reactants in a vessel while applying a preload to a first portion of the vessel, wherein the preload positions the first subset of reactants to occupy an xy plane of a reaction zone, wherein the preload is not applied to a second portion of the vessel; (b) translating the vessel to position a second subset of the reactants in the xy plane of the reaction zone; and (c) delivering energy from the reactor apparatus to the second subset of the analytes in the vessel while applying the preload to a second portion of the vessel, wherein the preload positions the second subset of the analytes to occupy the xy plane, wherein the preload is not applied to the first portion of the vessel, thereby performing reactions in the vessel.

In particular embodiments, the present disclosure provides a detection apparatus that includes (a) a vessel having a lumen and a wall, wherein the wall has an internal surface and an external surface, wherein the internal surface contacts the lumen, and wherein the external surface has length l in a scan dimension x; (b) a reference surface; (c) a preload configured to urge the external surface of the vessel to contact an area on the reference surface, optionally the area of contact can have a maximum length in the scan dimension x that is shorter than length t; (d) a scan actuator configured to slide the vessel along the reference surface in the scan dimension x; (e) a detector; and (f) an objective configured to direct radiation from the vessel to the detector when the external surface of the vessel is urged by the preload to contact the reference surface.

Also provided is a method of optically scanning a vessel. The method can include (a) providing a vessel having a lumen and a wall, wherein the lumen contains optically detectable analytes and wherein the wall is transparent to the optically detectable analytes; (b) translating a length of the vessel along a reference surface and detecting the optically detectable analytes at different locations along the length, wherein the reference surface contacts only a portion of the length of the vessel at any time during the translation, wherein the vessel is urged to the reference surface by a preload during the detection, wherein the detection includes transmitting radiation through the wall, then through an objective and then to a detector, thereby optically scanning the vessel.

The present disclosure further provides a detection apparatus that includes (a) a vessel having a lumen and a wall, wherein the wall has an internal surface and an external surface, wherein the wall has a plurality of discrete contacts between the internal surface and the external surface, wherein the internal surface contacts the lumen, and wherein the plurality of discrete contacts occupies a length l in a scan dimension x; (b) a transmissive surface; (c) a preload configured to urge discrete contacts on the external surface of the vessel to contact the transmissive surface, optionally the area of the transmissive surface can have a maximum length in the scan dimension x that is shorter than length l; (d) a scan actuator configured to slide the vessel along the transmissive surface in the scan dimension x; and (e) a detector configured to acquire signals from the discrete contacts via the transmissive surface.

BRIEF DESCRIPTION OF THE DRAWINGS

FIG. 8C shows a front view of the fluidic caddy with attached flow cell; FIG. 8D shows a side view of the fluidic caddy with attached flow cell.

FIG. 9C shows a perspective view of the fluidic caddy disengaged from the detection apparatus.

FIG. 10A shows a side view, and expanded view of section c, for a fluidic caddy with attached flow cell; FIG. 10B shows the expanded view of the flow cell after being released from the fluidic caddy; FIG. 10C shows a top view of a fluidic caddy engaged with components of a detection apparatus; FIG. 10D shows a cutaway view of the fluidic caddy (along line m) engaged with components of a detection apparatus; and FIG. 10E shows an expanded view of the fluidic caddy engaged with components of a detection apparatus.

FIG. 11 shows a cutaway profile view of a rigid support aligned to a flow cell and an immersion objective.

FIG. 16E shows a cross section of a subset of the scanning device components.

DETAILED DESCRIPTION

Figure 1:
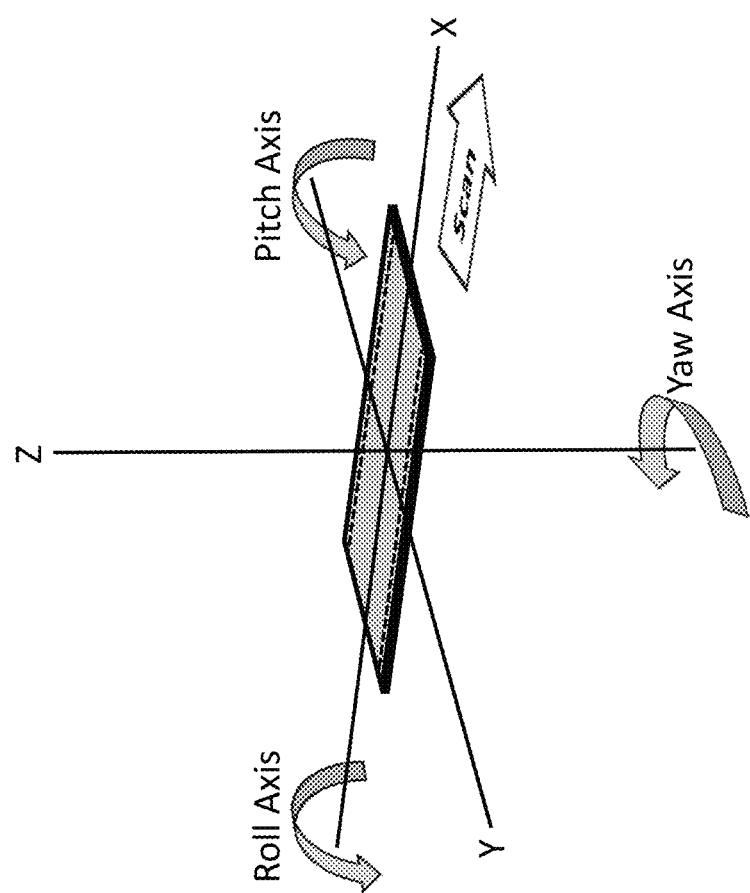
FIG. 1 shows dimensions and axes of rotation used to describe relative orientation of components in optical systems and other apparatus set forth herein.

The present disclosure provides apparatus and methods for detecting analytes, such as chemical or biological analytes. The detection can occur for analytes that are consumed, modified or produced as part of a reaction of interest. Several embodiments of the apparatus and methods are well suited to detection of repetitive reactions such as those used to characterize or synthesize polymers. A wide variety of polymers exist in nature and an infinite variety of polymers can be made by natural processes, or synthetic processes that nevertheless utilize a relatively small number of monomeric building blocks. For example, DNA is synthesized in nature from four different nucleotides, as is RNA. Protein, another ubiquitous polymer, is made from 20 different genetically encoded amino acids. Apparatus and methods of the present disclosure can be configured to sequentially detect monomeric building blocks, thereby providing a capability to identify any sequence. In particular embodiments, the apparatus and methods can be configured to detect analytes that are consumed, produced or modified during a multi-cycle, repetitive reaction process. For example, intermediate products can be detected at each individual cycle. By way of more specific example, nucleic acids can be sequenced by serially delivering reagents that specifically react with, or bind to, the four different types of nucleotide monomers, and components of each reaction (e.g. labeled nucleotides or labeled polymerases) can be detected during or after each cycle. Alternatively, nucleic acids can be synthesized by serially delivering one of four different nucleotide monomers, or precursors thereof, in a predefined order to a growing polymer and then products (e.g. blocking moieties released during deprotection) can be detected for each cycle. Sequencing or synthesis of proteins can also be detected cyclically using apparatus and methods set forth herein.

Various aspects of the present invention are exemplified with regard to scanning detection. It will be understood that apparatus and methods set forth herein can be used for precise spatially resolved manipulation of reagents or substrates in a vessel whether or not the reagents or substrates are detected. For example, light energy can be delivered to a vessel to perform photoreactions at spatially resolved locations in a vessel or to fabricate light responsive materials in a spatially resolved manner.

This disclosure provides apparatus and methods that can be used to observe a vessel by translational movement of the vessel relative to a detector. Also provided are apparatus and methods to address a vessel, for example, by delivery of localized energy, by translational movement of the vessel relative to an energy source. When detecting analytes, this scanning motion allows the detector to collect signals from sequential subsections of the vessel. The collective combination of signals sums to a total field of detection that is larger than the static detection field of the detector. Taking, for example, a vessel having an interior surface to which an array of optically labeled analytes is attached, translation of the vessel relative to an optical detector can provide an image of the array that is larger than the field of view of the detector. Similarly, scanning-based delivery of energy can allow sequential reactions to be carried out in a vessel.

A difficulty that plagues many scanning detectors is that mechanisms for translating the vessel relative to the detector are coupled with mechanisms for adjusting rotational registration of the vessel with respect to the detector. As such, the scanning detector is burdened with a tolerance stack that includes not only translational tolerances but also rotational tolerances. Relatively small amounts of rolling rotation or pitching rotation (i.e. rotation around the x axis and rotation around the y axis, respectively, as diagrammed in FIG. 1) can have significant adverse impacts on high resolution imaging of an analyte array. This adverse impact is exacerbated in optical scanning applications since a small pitch deviation (i.e. rotation around the y axis) will manifest as an increasing drift out of focus as the optical detector scans a vessel along the x dimension. The longer the scan, the further the deviation from focus.

A common solution to the problem of high tolerance stacks in optical scanners has been to employ moving stages having high precision actuators that are adjustable in a variety of translational and rotational directions. High precision actuators add cost and complexity to a scanner, and such rigs typically require highly trained technicians for routine maintenance. Particular embodiments of the apparatus and methods set forth herein avoid these problems by decoupling the mechanism that is used to translate a vessel with respect to a detector from the mechanism that is used to rotationally register the vessel with respect to the detector. Decoupling translation from rotational registration reduces the tolerance stack for the translation mechanism in detection apparatus and other apparatus of the present disclosure.

A further advantage of replacing a typical stage with a vessel translation apparatus of the present disclosure is that the vessel can be scanned more quickly. The increase in scanning speed is, in large part, a function of the vessel translation apparatus being configured to move a mass that is smaller than a typical stage. A small mass takes less time to settle compared to a larger mass that is moved the same distance. For example, the time spent waiting for a vessel to settle prior to acquiring an image becomes increasingly significant as the desired resolution for detection increases because the motion of the vessel must dampen to a point that the average displacement experienced by features of the object under observation is small enough to preclude substantial distortions in the image. Taking as an example a typical nucleic acid sequencing apparatus, DNA is present in sites of an array that are only a few microns apart and that are observed at low micron resolution. A typical stage used to move the array for sequencing requires settle times of several hundred milliseconds to dampen to the point that displacements are less than a few microns. A typical stage has a mass of several kilograms, whereas a typical flow cell that is supported on the stage has a mass that is less than 25 grams. Avoiding a typical stage by using an apparatus of the present disclosure to move a flow cell (or a low mass mount and flow cell with a combined mass of about 100 grams) allows settle times on the order of a few tens of milliseconds. The milliseconds can add up to hours for a nucleic sequencing protocol or other repetitive scanning operation. For example, saving 500 hundred milliseconds per image adds up to a savings of about 4 hours in settling time alone for a sequencing protocol that acquires 200 images per cycle and performs 150 cycles per run. Similar improvements in processing speed can be achieved for other scanning applications such as photochemistry, photolithography, microfabrication or nanofabrication (e.g. via laser etching), laser ablation or the like.

Although apparatus and methods set forth herein provide advantages in reducing settle time, it will be understood that the uses need not be limited to processes that include a settling step. Accordingly, apparatus and methods set forth herein in the context of so called "step and shoot" scanning procedures can be applied to continuous scanning operations such as time delayed integration (TDI) scanning. For example, apparatus and methods set forth herein can be modified for use in TDI line scanning operations such as those set forth in U.S. Pat. No. 7,329,860, which is incorporated herein by reference.

As set forth in further detail herein, rotational registration of a vessel with respect to a detector can be achieved by physically contacting the vessel with a reference surface, the reference surface being rotationally fixed with respect to the detector. In particular embodiments, as exemplified below, a vessel can be compressed to the reference surface by a preload. Separately, translation can be achieved by a scan actuator (e.g. a gear) that interacts directly with another surface of the vessel (e.g. a rail that complements the gear). The preload and scan actuator need not interact to achieve motion and registration of the vessel. For example, the preload need not be applied to the vessel while the vessel is being translated. However, interaction between the preload and scan actuator can occur for certain applications of the apparatus and methods set forth herein. Accordingly, the preload can be applied to the vessel while the vessel is being translated.

In some embodiments, a vessel that is to be detected can be a component of a cartridge. The cartridge can provide a convenient mechanism to deliver the vessel to a detector. For example, a detector can be maintained inside of an analytical instrument to protect the detector from environmental factors such as moisture, dust or light. A cartridge can be introduced to the analytical instrument via a door or opening such that the vessel is contacted with the detector. In some embodiments, the analytical instrument will remove the vessel from the cartridge and translate the vessel past the detector in a way that does not necessarily involve movement of the cartridge. Alternatively, the vessel can maintain contact with the cartridge such that both the cartridge and vessel are moved to achieve translation or scanning. In a further alternative, the cartridge can be a component of the analytical instrument and the vessel can be introduced to the instrument by placing the vessel into the cartridge. Accordingly, the cartridge functions as a mount that can be used to serially process two or more vessels.

Alternatively or additionally, the vessel can be a component of a caddy that also includes reservoirs and fluidic components that deliver reagents to the vessel during the course of a reaction that is detected, such as a nucleic acid sequencing reaction. In some embodiments, the caddy includes sufficient fluidic components that it functions as a "wet" component and the analytical instrument housing the detector functions as a "dry" component. An advantage of having separate wet and dry components is that the caddy and vessel can be dedicated to a particular sample or reaction, and when the reaction is complete, the caddy and vessel can be removed from the analytical instrument and replaced with a new caddy and vessel dedicated to a second sample or reaction. Because the samples, reagents and reaction products for each of these two reactions are physically separated from the analytical instrument, cross contamination between the reactions, that would otherwise cause detection artifacts, are avoided.

The physical separation of the components provides a further advantage of avoiding unnecessary downtime for the analytical instrument if the fluidic component experiences mechanical difficulties. Specifically, unlike many commercially available analytical instruments which have permanently integrated fluidics, a fluidic system failure can be conveniently overcome by merely removing a faulty fluidic caddy and replacing it with another so that the analytical instrument experiences little to no downtime. In some embodiments, the caddy is disposable, for example, being made from relatively inexpensive components. The caddy can be configured in a way that reagents are sealed in the caddy thereby avoiding unwanted contamination of the environment and unwanted exposure of laboratory personnel and equipment to the reagents. Alternatively, the fluidics caddy can be emptied, refilled and re-used if desired for a particular application.

In some embodiments, a fluidic caddy of the present disclosure includes not only reagent reservoirs, but also includes one or more waste reservoirs. Reagent that is not consumed in a reaction and/or unwanted products of a reaction can be collected in the waste reservoir. Advantages of retaining pre- and post-reaction fluids in a caddy include convenience of the user in handling a single fluidic component before and after a reaction is performed, minimizing user contact with chemical reagents, providing a compact footprint for the apparatus and avoiding unnecessary proliferation of fluid containers.

Exemplary fluidic caddies, reaction vessels and fluidic components that can be modified, in accordance with teachings herein, for use in combination with detection components of the present disclosure are described in commonly owned U.S. patent application Ser. No. 15/922,661, which is published as US Pat. App. Pub. No. 2018/0280975 A1 and claims the benefit of U.S. Provisional App. No. 62/481,289, each of which is incorporated herein by reference. Other fluidic components that are useful, particularly for cyclic reactions such as nucleic acid sequencing reactions, are set forth in US Pat. App. Pub. Nos. 2009/0026082 A1; 2009/0127589 A1; 2010/0111768 A1; 2010/0137143 A1; or 2010/0282617 A1; or U.S. Pat. Nos. 7,329,860; 8,951,781 or 9,193,996, each of which is incorporated herein by reference.

The details of one or more embodiments are set forth in the accompanying drawings and the description below. The drawings and description are provided as examples for purposes of explanation and are not necessarily intended to limit the scope of the invention. The invention is susceptible to modifications in the methods and materials, as well as alterations in the fabrication methods and equipment. Such modifications will become apparent to those skilled in the art from a consideration of the drawings and the description below.

The present disclosure provides a detection apparatus. The apparatus can include (a) a vessel having a lumen and a wall, wherein the wall has an internal surface and an external surface, wherein the internal surface contacts the lumen; (b) a reference surface that forms a structural loop with a detector; (c) a preload configured to urge the external surface of the vessel to contact an area on the reference surface; (d) a scan actuator configured to slide the vessel along the reference surface in a scan dimension; and (e) a transmitter configured to direct, to the detector, a signal from the internal surface or the lumen, when the external surface of the vessel is urged by the preload to contact the reference surface.

In particular embodiments, a detection apparatus can include (a) a vessel having a lumen and a wall, wherein the wall has an internal surface and an external surface, wherein the internal surface contacts the lumen, and wherein the external surface has length f in a scan dimension x; (b) a reference surface; (c) a preload configured to urge the external surface of the vessel to contact an area on the reference surface, optionally the area of contact can have a maximum length in the scan dimension x that is shorter than length l; (d) a scan actuator configured to slide the vessel along the reference surface in the scan dimension x; (e) a detector; and (f) an objective configured to direct radiation from the vessel to the detector when the external surface of the vessel is urged by the preload to contact the reference surface.

The present disclosure also provides is a method of scanning a vessel. The method can include (a) translating a vessel along a reference surface of a detection apparatus, wherein the vessel comprises a lumen and a wall, wherein the lumen comprises analytes, wherein the reference surface contacts at least a portion of the vessel during the translating, and wherein the reference surface forms a structural loop with a detector; and (b) detecting the analytes at different locations along the vessel using the detector, wherein the vessel is urged to the reference surface by a preload during the detecting, thereby scanning the vessel.

In some embodiments, a method of scanning a vessel can include (a) examining a first subset of analytes in a vessel while applying a preload to a first portion of the vessel, wherein the preload positions the first subset of analytes to occupy an xy plane in a detection zone, wherein the preload is not applied to a second portion of the vessel; (b) translating the vessel to position a second subset of the analytes in the xy plane of the detection zone; and (c) examining the second subset of the analytes in the vessel while applying the preload to a second portion of the vessel, wherein the preload positions the second subset of the analytes to occupy the xy plane of the detection zone, wherein the preload is not applied to the first portion of the vessel, thereby scanning the vessel.

Also provided is a method of optically scanning a vessel. The method can include (a) providing a vessel having a lumen and a wall, wherein the lumen contains optically detectable analytes and wherein the wall is transparent to the optically detectable analytes; (b) translating a length of the vessel along a reference surface and detecting the optically detectable analytes at different locations along the length, wherein the reference surface contacts only a portion of the length of the vessel at any time during the translation, wherein the vessel is urged to the reference surface by a preload during the detection, wherein the detection includes transmitting radiation through the wall, then through an objective and then to a detector, thereby optically scanning the vessel.

FIG. 2 shows an exemplary arrangement for scanning a vessel relative to a detector. As shown in the profile views of FIG. 2A and FIG. 2B, the vessel is a flow cell 101 that is aligned with objective 110 via a rigid body 100. The back side of rigid body 100 has a conical depression 116 that complements the shape of objective 110. Accordingly, objective 110 can be moved close to the flow cell for a desired focus or resolution. Any of a variety of depression shapes can be used as desired to accommodate the shapes for various objectives or other optical components. The front side of rigid body 100 has a reference surface 117 that will contact a planar face of flow cell 101. The flow cell 101 is maintained in contact with the reference surface 117 by a preload that applies positive pressure to the side of flow cell 101 that is opposite the reference surface 117. The preload is formed by compression foot 102 which contacts flow cell 101 under force of spring 103.

Generally, reference surface 117 and compression foot 102 create low friction contacts with flow cell 101. This allows the flow cell to slide past the reference surface 117 and to slide past compression foot 102 while under compression force of the preload. This compression provides alignment of the flow cell 101 with the objective 110 via the rigid body throughout the course of flow cell 101 scanning by the objective 110. The reference surface and objective are components of a structural loop. The structural loop contains structural elements that locate the vessel (e.g. flow cell) with respect to the detector (e.g. via the objective). Because the reference surface is pre-aligned with the objective, compressing the flow cell to the reference surface prevents unwanted pitch and roll of the flow cell with respect to the objective. Components of FIG. 2 that are in the structural loop include reference surface 117, which is connected to rigid body 100, which is connected to base 114. Base 114 can be connected to a plate or other structural element that is physically connected to components of an optical system such as those exemplified in FIG. 9.

In the example shown in FIG. 2, reference surface 117 is polished aluminum, which provides rigidity for aligning the flow cell 101 to the objective 110 and a low friction surface for sliding the glass surface of the flow cell 101. Any of a variety of materials can be used that provide rigidity and low friction for the reference surface including, for example, acetal resins (e.g. Delrin® available from DuPont, Wilmington, Del.), diamond like carbon or polished metals. The compression foot 102 provides a low friction surface for the sliding translation of the flow cell 101 glass surface and also provides compressibility to form a compliant contact with the flow cell 101 under the force of spring 103. Any of a variety of materials can be used that provide low friction to the compression foot including, for example, those set forth above for reference surface 117. Optionally, a low friction material used in an apparatus herein can also be compressible, examples of which include, but are not limited to, polytetrafluoroethylene (PTFE, Teflon®), perfluoroalkoxy alkane (PFA), fluorinated ethylene propylene (FEP), silicone foam, nitrile rubber, Buna-N, Perbunan, acrylonitrile butadiene rubber or nitrile butadiene rubber (NBR). Alternatively or additionally, low friction can be achieved using ball bearings, rollers and/or lubricating fluids. Typically, the lubricating fluid is used on the side of the flow cell that is not between the analytes and detector or a fluid is used that does not interfere with detection. In some embodiments, lubricating fluids are not present at the interface between the reference surface and the exterior surface of the vessel wall. For example, lubricating fluids can be avoided to prevent interference caused when the fluid enters the area between the detector and vessel.

In particular embodiments, a vessel (or cartridge containing a vessel) is positioned in an xy plane without contacting a reference surface. For example, a vessel (or cartridge) can be urged, by a preload, toward a fluid bearing or magnetic bearing such that the combination of forces provided by the preload and bearing results in a desired positioning. A fluid bearing can be a gas bearing, whereby gas pressure provides a force for positioning the vessel (or cartridge). Another useful type of fluid bearing is a liquid bearing, whereby liquid pressure provides a force for positioning the vessel (or cartridge). The liquid can be selected for the ability to index match with optical components of the system, such as the wall of the vessel, so as to minimize aberrations when detecting optical signals or delivering radiation.

Figure 2B:
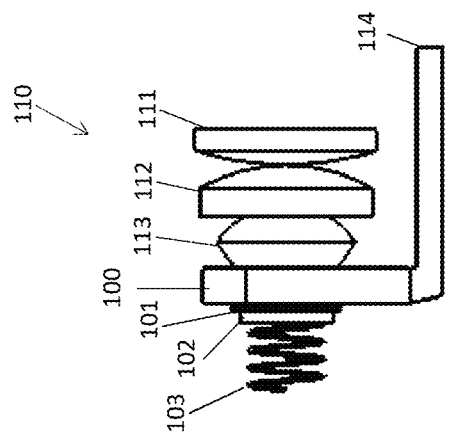
FIG. 2B shows a profile view of the flow cell in contact with a detection apparatus.
Figure 2A:
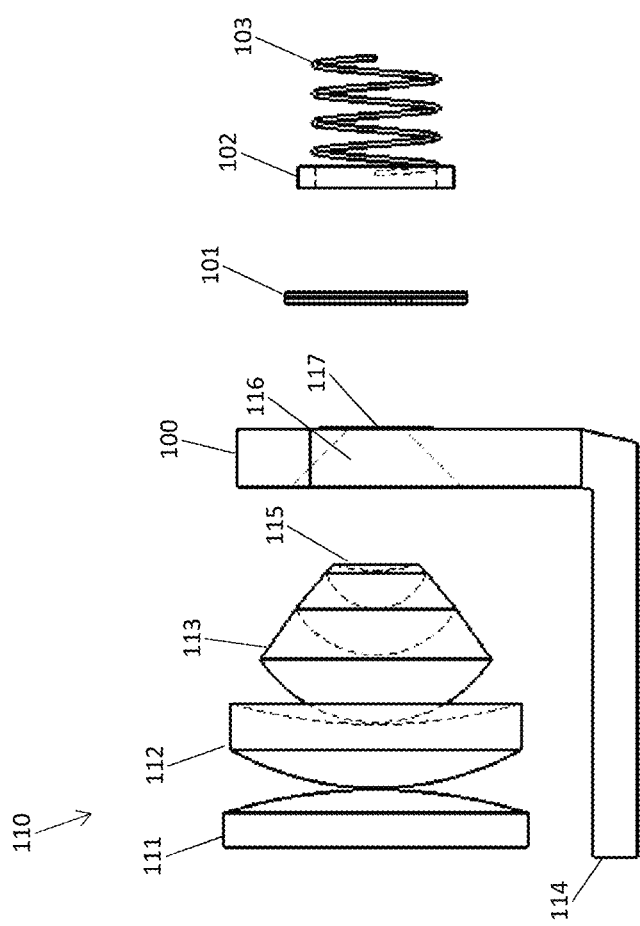
FIG. 2A shows an exploded, profile view of a flow cell and detection apparatus.
Figure 2D:
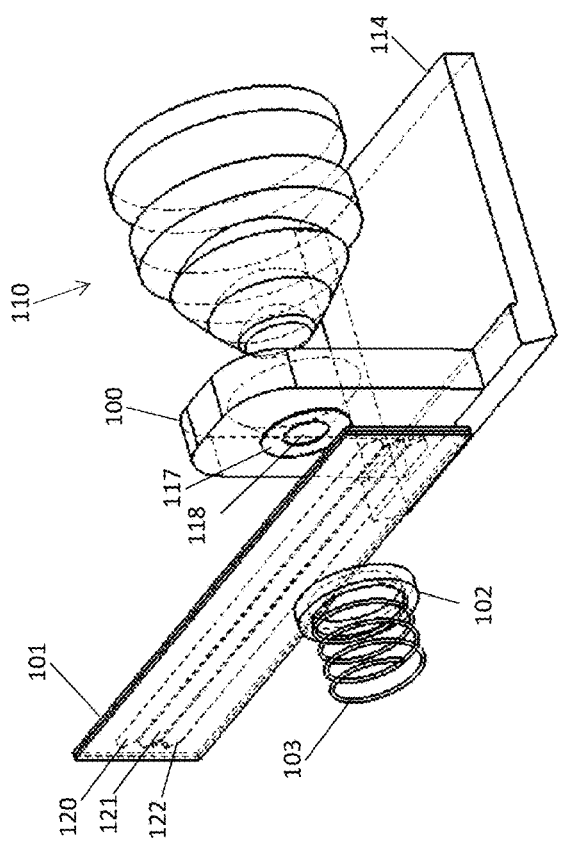
FIG. 2D shows an exploded, perspective view of the flow cell in contact with the detection apparatus.
Figure 2C:
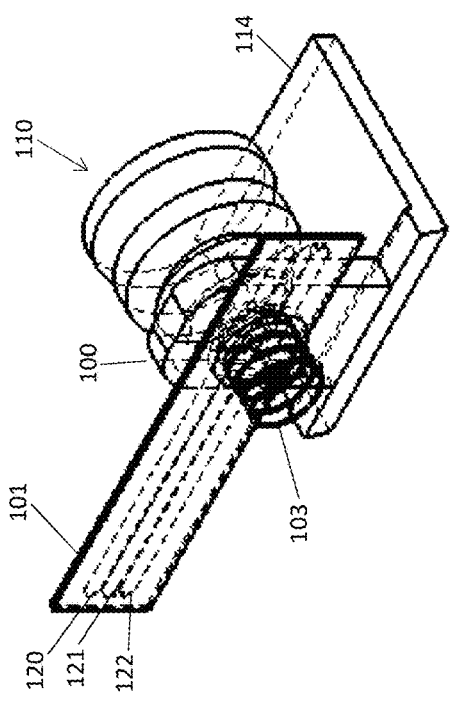
FIG. 2C shows a perspective view of the flow cell in contact with the detection apparatus.

As shown in FIG. 2C and FIG. 2D, reference surface 117 has a planar surface that forms a flat ring on the front face of rigid body 100. The ring is raised compared to the front face of rigid body 100. Raising the reference surface helps to prevent unwanted contact between the flow cell 101 and rigid body 100 that may otherwise create friction that hinders translation. Raising the reference surface 117 also isolates the area of the flow cell that is to be detected and prevents unwanted warping that could otherwise occur if the flow cell contacted other regions of rigid body 101. In the example of FIG. 2, the reference surface has an area that is smaller than the surface of the flow cell and thus only contacts a portion of the flow cell surface. However, in alternative embodiments, the reference surface can be substantially the same size or larger than the flow cell surface and thus can contact substantially all of the flow cell surface (optionally, excepting the area of the flow cell surface that is juxtaposed with a detection window, objective or other transmitter).

In the example shown, reference surface 117 surrounds circular window 118, this window being a hole through rigid body 100. Alternatively, circular window 118 can include a material that is capable of transmitting a signal that is to be detected. For example, the window can be made of quartz, glass, or plastic that facilitates transmission of signals that are to be detected. In some configurations, the window can contain an index matched immersion fluid that contacts the flow cell surface to facilitate detection, as set forth in further detail below with regard to FIG. 11. The circular window 118 is aligned with the front lens 115 of the objective 110 such that the objective 110 can observe flow cell 101 through the window 118. Compression foot 102 has a flat ring shape providing a footprint on flow cell 101 that is complementary to the footprint of flat ring 117 on the opposite side of the flow cell. In this example, the preload (via foot 102) has a contact area with the vessel (flow cell 101) that is the same as the area of contact between reference surface 117 and the vessel. Alternatively, the preload can have a contact area with the vessel that is smaller than the area of contact between the reference surface and the vessel. Indeed, the preload can have a contact area with the vessel that is no larger than the area of contact between the reference surface and the vessel.

Generally, complementarity between the footprints of the preload and reference surface can be configured to result in the compression foot 102 having a contact area on the flow cell 101 that excludes surface area of the flow cell opposite the circular window 118 and that further excludes surface area of the flow cell opposite the region of the rigid body that surrounds reference surface 117. Complementarity between the footprints of compression foot 102 and reference surface 117 helps to maintain flatness for the portion of the flow cell surface that is observed through window 118. This complementarity can be beneficial for detecting analytes on the inner surface of the flow cell, especially at high magnification and high resolution. The complementarity can also facilitate trans-illumination, whereby radiation can pass back or forth through a path defined by the hollow space in the spring 103, compression foot 102 and window 118. The circular shape of the reference surface and preload is exemplary. Other shapes can be used including, but not limited to, square, rectangular, polyhedral, elliptical, triangular or the like. Moreover, the shape for a reference surface used in an apparatus herein need not be continuous. Instead the reference surface and/or contact surface for the preload can be a discontinuous area such as that formed by two parallel tracks or by interruptions to the above shapes. Particularly useful applications are nucleic acid microarray detection and nucleic acid sequencing. The shapes and orientations for preload and reference surface can be used for apparatus that deliver energy to a vessel or that detect non-optical signals.

As exemplified by FIG. 2, a particularly useful vessel for use in a detection apparatus or other apparatus of the present disclosure is a flow cell. Any of a variety of flow cells can be used including, for example, those that include at least one channel and openings at either end of the channel. The openings can be connected to fluidic components to allow reagents to flow through the channel. The flow cell is generally configured to allow detection of analytes within the channel, for example, in the lumen of the channel or on the inner surface of a wall that forms the channel. In some embodiments, the flow cell can include a plurality of channels each having openings at their ends. For example, the flow cell shown in FIG. 2 has three channels 120, 121 and 122 each having openings at both ends. Multiple channels can interact with a fluidic system via a manifold.

In particular embodiments, a flow cell will include a solid support to which one or more target analytes or reagents are attached. A particularly useful solid support is one having an array of sites. Arrays provide the advantage of facilitating multiplex detection. For example, different reagents or analytes (e.g. cells, nucleic acids, proteins, candidate small molecule therapeutics etc.) can be attached to an array via linkage of each different analyte to a particular site of the array. Exemplary array substrates that can be useful include, without limitation, a BeadChip™ Array available from Illumina, Inc. (San Diego, Calif.) or arrays such as those described in U.S. Pat. Nos. 6,266,459; 6,355,431; 6,770,441; 6,859,570; or 7,622,294; or PCT Publication No. WO 00/63437, each of which is incorporated herein by reference. Further examples of commercially available array substrates that can be used include, for example, an Affymetrix GeneChip™ array. A spotted array substrate can also be used according to some embodiments. An exemplary spotted array is a CodeLink™ Array available from Amersham Biosciences. Another array that is useful is one that is manufactured using inkjet printing methods such as SurePrint™ Technology available from Agilent Technologies.

Other useful array substrates include those that are used in nucleic acid sequencing applications. For example, arrays that are used to create attached amplicons of genomic fragments (often referred to as clusters) can be particularly useful. Examples of substrates that can be modified for use herein include those described in Bentley et al., Nature 456:53-59 (2008), PCT Pub. Nos. WO 91/06678; WO 04/018497 or WO 07/123744; U.S. Pat. Nos. 7,057,026; 7,211,414; 7,315,019; 7,329,492 or 7,405,281; or U.S. Pat. App. Pub. No. 2008/0108082, each of which is incorporated herein by reference.

An array can have sites that are separated by less than 100 µm, 50 µm, 10 µm, 5 µm, 1 µm, or 0.5 µm. In particular embodiments, sites of an array can each have an area that is larger than about 100 nm$^2$, 250 nm$^2$, 500 nm$^2$, 1 µm$^2$, 2.5 µm$^2$, 5 µm$^2$, 10 µm$^2$, 100 µm$^2$, or 500 µm$^2$. Alternatively or additionally, sites of an array can each have an area that is smaller than about 1 mm$^2$, 500 µm$^2$, 100 µm$^2$, 25 µm$^2$, 10 µm$^2$, 5 µm$^2$, 1 µm$^2$, 500 nm$^2$, or 100 nm$^2$. Indeed, a site can have a size that is in a range between an upper and lower limit selected from those exemplified above. An array can have sites at any of a variety of densities including, for example, at least about 10 sites/cm$^2$, 100 sites/cm$^2$, 500 sites/cm$^2$, 1,000 sites/cm$^2$, 5,000 sites/cm$^2$, 10,000 sites/cm$^2$, 50,000 sites/cm$^2$, 100,000 sites/cm$^2$, 1,000,000 sites/cm$^2$, 5,000,000 sites/cm$^2$, or higher. An embodiment of the apparatus or methods set forth herein can be used to image an array at a resolution sufficient to distinguish sites at the above densities or site separations.

Several embodiments utilize optical detection of analytes in a flow cell. Accordingly, a flow cell can include one or more channels each having at least one transparent window. In particular embodiments, the window can be transparent to radiation in a particular spectral range including, but not limited to x-ray, ultraviolet (UV), visible (VIS), infrared (IR), microwave and/or radio wave radiation. In some cases, analytes are attached to an inner surface of the window(s). Alternatively or additionally, one or more windows can provide a view to an internal substrate to which analytes are attached. Exemplary flow cells and physical features of flow cells that can be useful in a method or apparatus set forth herein are described, for example, in US Pat. App. Pub. No. 2010/0111768 A1, WO 05/065814 or US Pat. App. Pub. No. 2012/0270305 A1, each of which is incorporated herein by reference in its entirety.

Several examples herein are demonstrated for a rectangular flow cell 101 having elongated channels. In these examples, the area of contact between the flow cell 101 and reference surface 117 has a maximum length in the scan dimension x that is shorter than the length of the flow cell lane in scan dimension x. More specifically, the diameter of ring 117 is shorter than the length of lanes 120, 121 or 122. Alternatively or additionally, the area of contact between the flow cell 101 and reference surface 117 can have a maximum width w in dimension y that is shorter than the width of the flow cell lane in dimension y. Specifically, the diameter of ring 117 can be shorter than the width of any one of lanes 120, 121 or 122.

Similarly, the maximum diameter or length of window 118 in the scan dimension x can be shorter than the length of the flow cell lane in the scan dimension x. Alternatively or additionally, the maximum diameter or width of window 118 in they dimension can be shorter than the width of any one of lanes 120, 121 or 122. In this configuration, the complete width of the lane can be observed by translation in they direction. In some embodiments, the area of window 118 and width of the lane can be configured so that translation in they dimension is not necessary to observe the entire width of the lane. For example, the area of window 118 can have a maximum diameter or width w in dimension y that is equivalent to or longer than the width of the flow cell lane in dimension y. The relative dimension exemplified for the flow cell and apparatus in FIG. 2 can be applied to other flow cells and apparatus set forth herein.

In particular embodiments, a vessel, such as a flow cell, can be moved in an arcuate path during all or part of a scanning operation. Looking to the flow cell orientation in FIG. 1, the arcuate path can result from rotation around the yaw axis. The arcuate path can be a circle, spiral or other path that is desirable for scanning a vessel. Optionally, the area of contact between a vessel and reference surface can have a length or area that is smaller than the length or area, respectively, of the arcuate path. By way of more specific example, a ring-shaped reference surface can have a diameter that is shorter than the length of the arcuate path or shorter than the length of a lane in a flow cell that is moved along the arcuate path. Similarly, the maximum diameter or area of a window in the reference surface, through which detection occurs, can be smaller than the length or area, respectively, of the arcuate path; or the window can be smaller than a flow cell lane that is scanned along an arcuate path.

A flow cell need not be rectangular in shape. Alternative shapes that can be used include, but are not limited to, a disc, square, polygon or irregular shape. The lanes of a flow cell can follow a linear path, arcuate path, winding path or the like. Other types of vessels can also be used. For example, a well of a multi-well strip or multi-well plate can be detected using an apparatus or method of the present disclosure. The bottom surface of a well can be urged toward a reference surface by a preload applied to the top of the vessel (e.g. by contacting a compression foot to the upper side of a multi-well plate or multi-well strip). Optionally, the well can have a flat bottom that contacts the reference surface. As a further option, the well will be larger than the field of view of the detector. For example, the well may be circular in shape and may have a diameter l in scan dimension x that is longer than the length of the reference surface in the scan dimension x.

Another exemplary vessel type is a cylindrical- or tube-shaped vessel such as a capillary tube. The body of a tube can be held to a reference surface under the force of a preload as exemplified herein for flat shaped vessels. In an exemplary configuration the length of the tube can be parallel to the scan axis such that scanning the tube along x will result in relative motion of the reference surface along the length of the tube. For a tube that is configured in this orientation, it may also be useful to rotate the tube in the roll axis. This rotation will result in relative motion of the reference surface around the circumference of a section of the tube. Combining translation along x and rotation along the roll axis can allow a substantial surface area of the tube to come into contact with the reference surface. For example, the tube and reference surface can move in a helical or spiral path relative to each other. The reference surface can be flat, as exemplified herein for flow cells having a flat exterior wall. Alternatively, the reference surface can have a curved shape (e.g. u-shaped or saddle-shaped cross section) that accommodates and orients a cylindrical- or tube-shaped vessel that it contacts.

Typically, the vessel wall is made from a rigid material that is not readily flexible under the conditions used. In alternative embodiments, a vessel is made from a flexible material, for example, forming a sheet, tape, belt or ribbon that can be passed along a reference surface and detected while the vessel is under the urging of a preload. For example, a plurality of analytes, such as an array of nucleic acids, can be attached to the surface of the flexible material and detected when in contact with the reference surface. Exemplary, flexible materials having attached analytes are described, for example, in U.S. Pat. No. 9,073,033 and US Pat. App. Pub. No. 2016/0076025 A1, each of which is incorporated herein by reference.

When using a vessel having a flexible wall, it may be advantageous to pull the wall material over a reference surface, for example, to stretch or straighten the portion of the wall material that is observed by a detector. For example, the reference surface can be a raised rim that surrounds a detection window and the flexible material can be pulled over the rim to apply a pulling force across the window. Pulling can be achieved for example by applying suction to the flexible material via a vacuum chuck that surrounds the raised rim. Suction can be applied as an alternative or supplement to other preload mechanisms set forth herein.

As will be evident from the examples set forth herein, a vessel can be open (e.g. a well of a multi-well plate, surface of a chip, or surface of a sheet) or the vessel can be enclosed (e.g. a lane of a flow cell). It will be understood that, wells of a multi-well plate can optionally be covered to create an enclosed vessel and similarly a sheet, belt, tape or ribbon can have multiple layers such that an internal lumen occurs between layers. Alternatively, a vessel can have one or more open structures such as a trough, well or other concave structure that contains a fluid. A vessel can also have a convex or protruding structure such as a post or ridge, and optionally individual protrusions can each be attached to one or more analyte that is to be detected or manipulated.

The preload exemplified in FIG. 2 creates a pushing force on the side of the vessel (e.g. flow cell) that is opposite the side of the vessel that contacts the reference surface. Pushing force for a preload of the present disclosure can derive from a spring, clamp, positive air pressure, positive fluid pressure, charge repulsion, charge attraction, magnetic attraction or magnetic repulsion. Alternatively, a preload can be configured to create a pulling force on the vessel. For example, a magnetic or ferromagnetic material that is in or on the vessel can be attracted to the reference surface, or charges in or on the vessel can be attracted to the reference surface. In this example, the reference surface or area surrounding the reference surface can contain magnetic or ferromagnetic material that acts as a preload. In another embodiment, pulling force can result from a vacuum chuck that is configured to apply suction to an area of the vessel that contacts the reference surface. In a further embodiment, a magnetic clamping force can be used, whereby the vessel is sandwiched between a magnetic or ferromagnetic material on or around the reference surface that attracts a magnetic or ferromagnetic body that is external to the opposite side of the vessel.

A detection apparatus or other apparatus of the present disclosure can include a scan actuator that is configured to slide a vessel along a reference surface. The vessel can slide along the reference surface and along the surface of the preload. Generally, the scan actuator is configured to move the vessel while the vessel is in contact with the reference surface under the urging of a preload. However, it is also possible to translate the vessel without simultaneously applying a preload to the vessel. It is also possible to translate the vessel through a space defined by a bearing that does not physically contact the vessel, such as a fluid bearing or magnetic bearing. For example, a vessel can be positioned via opposing forces of a preload against a bearing. Particularly useful actuators employ one or more gears that interact with perforations or threads on a flow cell, on a cartridge that contains the flow cell or on a mount to which the flow cell is attached. Several examples are set forth below.

Figure 3B:
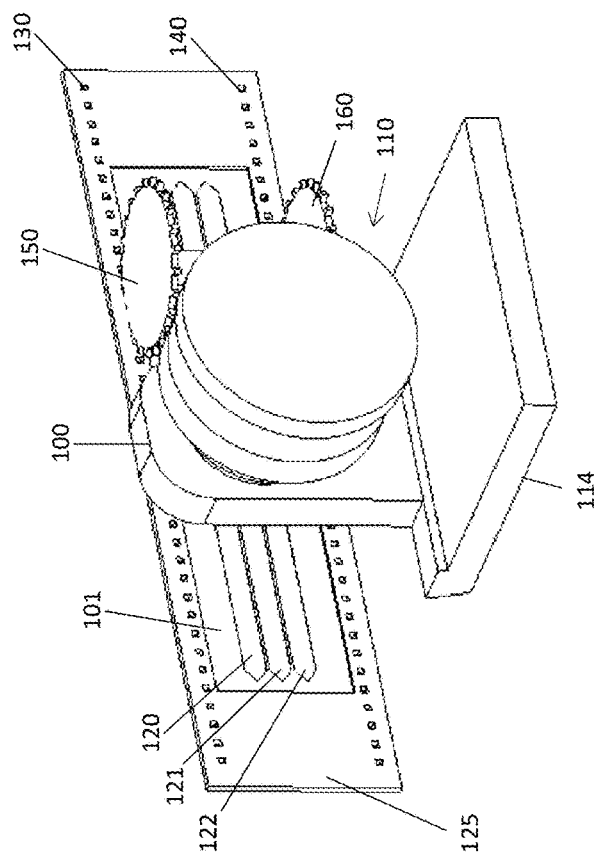
FIG. 3A and FIG. 3B show front and rear perspective views of a film sprocket mechanism for translating a flow cell relative to a detection apparatus.
Figure 3A:
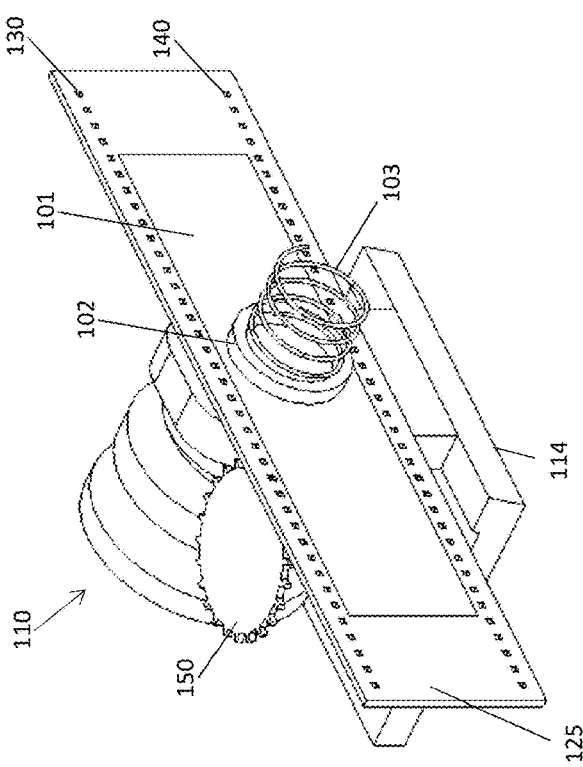

In some embodiments, the scan actuator can use a film sprocket mechanism. The vessel that is to be translated, or a cartridge or mount that holds the vessel, can contain a track of perforations that engages a sprocket in a detection apparatus to achieve translation. As shown in the exemplary configuration of FIG. 3, flow cell 101 is housed in cartridge 125, which contains two perforation tracks 130 and 140. Perforation track 130 is located near the top edge of the cartridge 125 and runs parallel to the longest dimension l of the flow cell. Perforation track 140 is located near the opposite edge of the cartridge 125 and also runs parallel to l. Sprockets 150 and 160 are configured to engage perforation tracks 130 and 140, respectively, when urged toward reference surface 117 by the force of preload spring 103. The flow cell 101 can be translated in scan dimension x, which is parallel to f, by rotating the engaged sprockets 150 and 160.

Figure 4C:
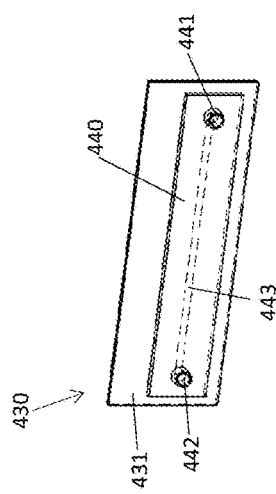
FIG. 4C shows a flow cell.
Figure 4B:
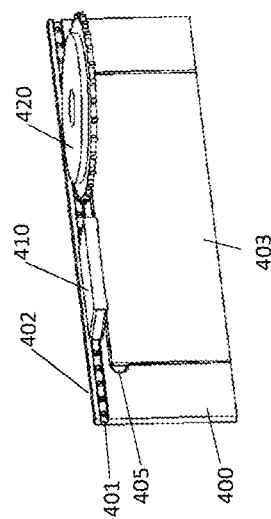
FIG. 4B shows a film sprocket and guide interacting with the flow cell cartridge.
Figure 4A:
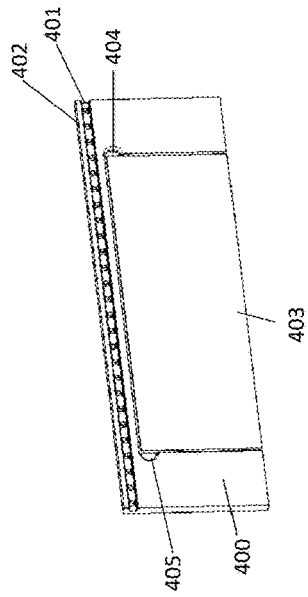
FIG. 4A shows a flow cell cartridge.
Figure 4D:
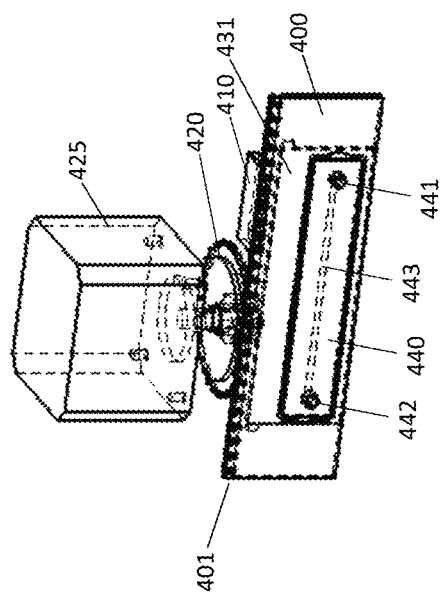
FIG. 4D shows a perspective view of the film sprocket, guide, flow cell cartridge, flow cell and a motor for the film sprocket.

FIG. 4A shows a cartridge 400 having an inset 403 for flow cell 430. The inset includes notches 404 and 405 that are placed to facilitate adjustment or removal of the flow cell 430. Cartridge 400 has a single perforation track 401 near the top edge 402. As shown in FIG. 4B, the perforations are complementary to teeth on sprocket 420 and perforation track 401 is inset into the face of cartridge 400 thereby providing a track that engages guide 410. Guide 410 slots into perforation track 401 to prevent rotation of cartridge 400 in the yaw axis during translation under the action of sprocket 420, thereby preventing unwanted yaw rotation of the flow cell 430 relative to a detector. As shown in FIG. 4C, flow cell 430 includes a bottom plate 431 that is sized for pressure fit with inset 403 and also includes a top plate 440. A channel 443 is formed between plates 431 and 440 due to presence of a spacer or gasket. The top plate 440 also includes holes 441 and 442 which act as inlet and outlet for channel 443. A perspective view of the cartridge 400 with assembled flow cell 430, sprocket 420 with motor 425, and guide 410 is shown in FIG. 4D.

Figure 5A:
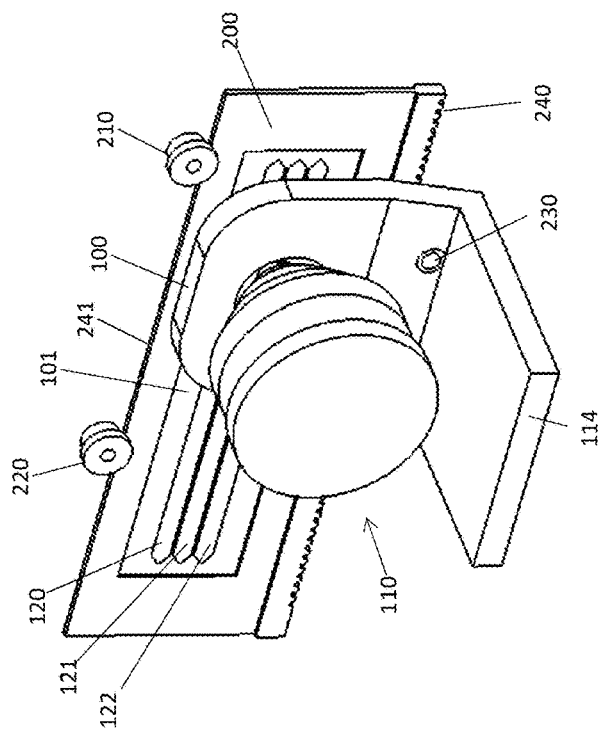
FIG. 5A and FIG. 5B show front and rear perspective views of a spur gear mechanism for translating a flow cell relative to a detection apparatus.
Figure 5B:
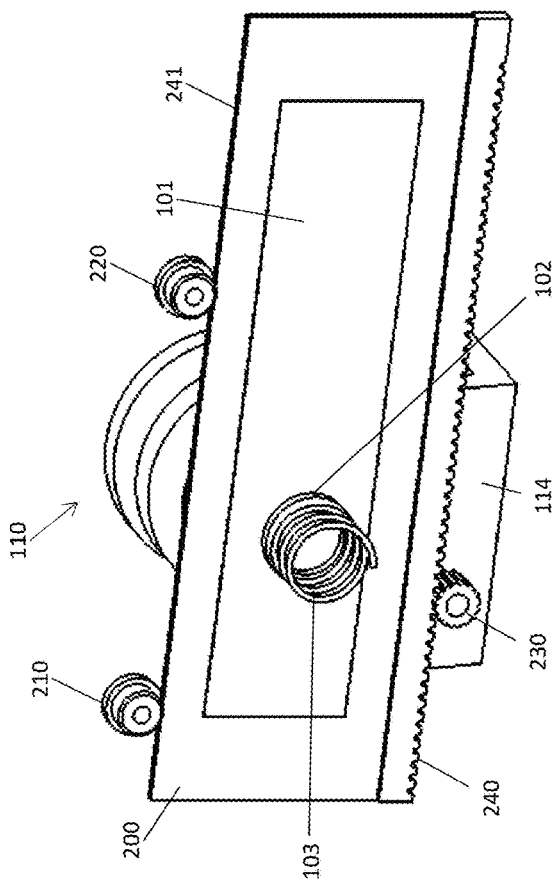

Another useful mechanism for scan actuation is a spur gear that engages teeth on an edge of a flow cell, or on an edge of a cartridge or mount holding the flow cell. FIG. 5A shows cartridge 200 which is pressure fitted to flow cell 101, and which has a serrated bottom edge 240 and smooth top edge 241. Serrated bottom edge 240 engages spur gear 230 when cartridge 200 is urged by preload spring 103 to contact a reference surface on rigid body 100. The cartridge 200 and flow cell 101 are translated by rotating spur gear 230. Wheel guides 210 and 220 engage the smooth edge 241 of the cartridge 200, when the cartridge 200 is positioned to contact the flow cell 101 with a reference surface on rigid body 100. The wheel guides function to prevent rotation of the cartridge 200 and flow cell 101 about the yaw axis.

Figure 6B:
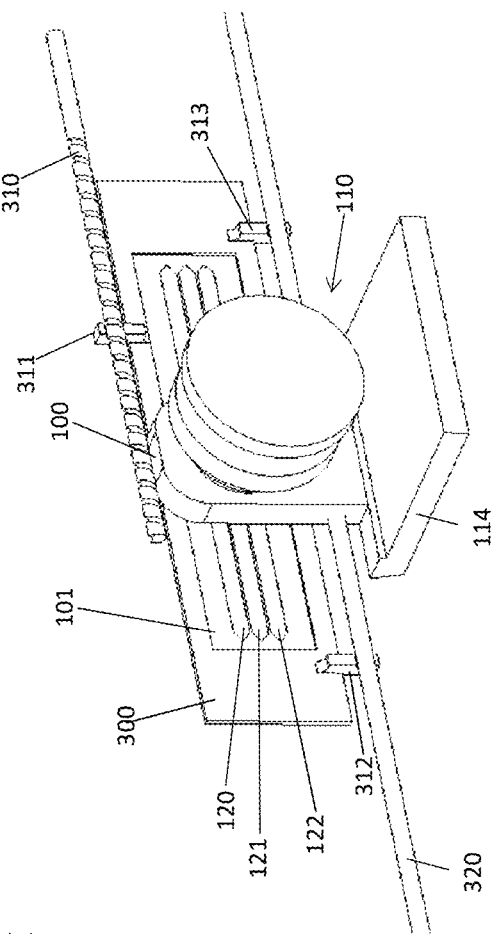
FIG. 6A and FIG. 6B show front and rear perspective views of a ball screw mechanism for translating a flow cell relative to a detection apparatus.
Figure 6A:
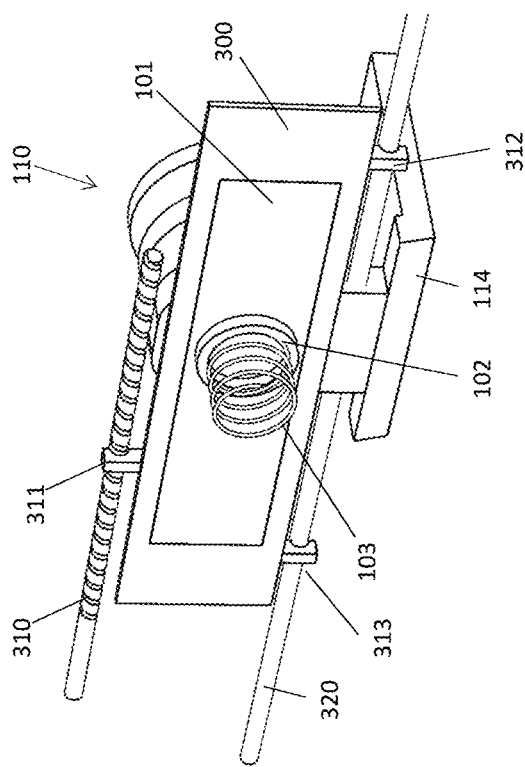

Scan actuation can also employ a ball screw that engages a threaded catch on a flow cell, or on a cartridge or mount holding the flow cell. FIG. 6A shows cartridge 300 which is pressure fitted to flow cell 101, and which has a threaded catch 311 on the top and two guide catches 312 and 313 on the bottom. Threaded catch 311 engages screw 310 when cartridge 300 is urged by preload spring 103 to contact a reference surface on rigid body 100. The cartridge 300 and flow cell 101 are translated by rotating screw 310 against threads of catch 311. Guide catches 312 and 313 engage rail 320, when the cartridge 300 is positioned to contact the flow cell 101 with reference surface 117. The guide catches 312 and 313 function to prevent rotation of the cartridge 300 and flow cell 101 about the yaw axis.

Scan actuation can use mechanical contact between the motor and vessel (or vessel cartridge or mount) as exemplified above. Alternatively or additionally, interaction between motor and vessel (or vessel cartridge or mount) can be mediated by magnetic attraction. For example, the vessel, mount or cartridge can have a magnetic or ferromagnetic material that interacts with a magnetic or ferromagnetic component of the actuator.

Whether using mechanical contact or other interactions to mediate actuation, a linear motor can be used to drive the scanning motion. Exemplary linear motors that can be used include synchronous linear motors, induction linear motors, homopolar linear motors and piezo electric linear motors.

An apparatus of the present disclosure can further include a y actuator configured to change the relative translational position of the detector and the vessel along they dimension. Taking as an example the apparatus shown in FIG. 2, a y actuator can operate, for example, by changing the relative translational position of the objective 110 and the reference surface 117. Alternatively or additionally, a y actuator can operate by changing the relative translational position of the flow cell 101 and the reference surface 117. Translation along they dimension can allow different lanes of a flow cell to be addressed. When a lane is wider than the field of view for the objective, y translation can be used to detect multiple swaths of the lane (i.e. a first swath can be detected by a scan along x and a second swath can be addressed by a step along the y dimension followed by a second scan along x). A y actuator can be configured similarly to the x actuators exemplified herein. For example, a y actuator can be configured to translate the flow cell while it is urged to a reference surface by a preload. Other stepper motors or translation actuators can be used as well for x or y translation.

In particular embodiments, an apparatus of the present disclosure can include a rotational actuator configured to change the relative translational position of the detector and the vessel along an arcuate path. Taking the exemplary flow cell oriented as shown in FIG. 1 a rotational actuator can rotate the flow cell in the yaw axis. Rotation in the yaw axis can be particularly useful for scanning lanes or features that follow an arcuate path. An additional or alternative rotational actuator can rotate a vessel along the roll axis. Rotation in the yaw axis can be particularly useful when the vessel is a tube or cylinder that is oriented to have its length along the x axis.

Several embodiments of the present disclosure are exemplified with regard to an objective having several lenses for gathering and focusing radiation from an object (e.g. a vessel such as a flow cell). It will be understood that any of a variety of optical elements can serve as an objective in an apparatus or method of the present disclosure including, for example, a lens, mirror, fiber optic, fiber bundle, lens array or other optical element that gathers radiation from an object being observed, whether or not the optical element is also capable of focusing the radiation. Objectives or other optical components used in an apparatus or method set forth herein can be configured to transmit radiation in any of a variety of spectral ranges including, but not limited to X-ray, ultraviolet (UV), visible (VIS), infrared (IR), microwave and/or radio wave ranges.

An objective that is used in an apparatus set forth herein can be placed to direct radiation from the internal surface or the lumen of a vessel, through the wall of the vessel and to a detector when the external surface of the vessel contacts a reference surface. In particular embodiments, an objective, and other optional components of an optical system, can be configured for epi-illumination luminescence detection (i.e. epi-luminescence), whereby excitation radiation is directed from a radiation source, through the objective, then through the wall of the vessel to the internal surface or the lumen of the vessel; and whereby emission from the internal surface or the lumen of the vessel is directed back through the wall and through the objective (i.e. excitation and emission both pass through the objective). Alternatively, objectives, and other optional components of an optical system, can be configured for trans-illumination fluorescence, whereby excitation radiation is directed from a radiation source through a first wall of a vessel to the internal surface or the lumen of the vessel; and whereby emission from the internal surface or the lumen of the vessel is directed through another wall of the vessel and through the objective (i.e. emission passes through the objective, excitation does not). Other useful configurations for fluorescence detection include those that excite a vessel via total internal reflection fluorescence (TIRF) or via waveguides. In any of a variety of configurations, the radiation source can form a structural loop with a reference surface such that a vessel that contacts the reference under the urging of a preload will be properly oriented with respect to the radiation source.

The objectives shown in FIGS. 2, 3, 5 and 6 are exemplary, having 4 lenses. Any number or type of lenses can be included to suit a particular application. Particularly useful objectives will have a numerical aperture that is at least 0.1 and at most 0.9. Numerical apertures above 0.95 can be achieved using an immersion objective as set forth in further detail below. An objective or other transmitter can be configured to operate with a detection system that resolves features (e.g. nucleic acid sites) on a surface that are separated by less than 100 µm, 50 µm, 10 µm, 5 µm, 1 µm, or 0.5 µm. The detection system, including objective or other transmitter, can be configured to resolve features having an area on a surface that is smaller than about 1 $mm^2$, 500 $\mu m^2$, 100 $\mu m^2$, 25 $\mu m^2$, 10 $\mu m^2$, 5 $\mu m^2$, 1 $\mu m^2$, 500 $nm^2$, or 100 $nm^2$.

An optical system used in an apparatus or method set forth herein can have a field of view that is at least 0.1 mm², 0.5 mm², 1 mm², 2 mm², 3 mm², 4 mm² or higher. Alternatively or additionally, the field of view can be configured to be at most 4 mm², 3 mm², 2 mm², 1 mm², 0.5 mm², 0.1 mm², or less.

The objective, or other appropriate component of a detection system used in an apparatus set forth herein, can be configured to focus on analytes that are in or on the vessel. For example, the apparatus can include a focus actuator configured to change the relative position of the objective and the reference surface in the focus dimension z. Physically aligning the vessel to the reference surface under force of a preload effectively fixes the position of the vessel in the z dimension, thereby favoring accurate and robust focusing throughout a scanning operation.

An apparatus set forth herein can employ optical subsystems or components used in nucleic acid sequencing systems. Several such detection apparatus are configured for optical detection, for example, detection of fluorescent signals. Examples of detection apparatus and components thereof that can be used to detect a vessel herein are described, for example, in US Pat. App. Pub. No. 2010/0111768 A1 or U.S. Pat. Nos. 7,329,860; 8,951,781 or 9,193,996, each of which is incorporated herein by reference. Other detection apparatus include those commercialized for nucleic acid sequencing such as those provided by Illumina™, Inc. (e.g. HiSeq™, MiSeq™, NextSeq™, or NovaSeq™ systems), Life Technologies™ (e.g. ABI PRISM™, or SOLiD™ systems), Pacific Biosciences (e.g. systems using SMRT™ Technology such as the Sequel™ or RS II™ systems), or Qiagen (e.g. Genereader™ system). Other useful detectors are described in U.S. Pat. Nos. 5,888,737; 6,175,002; 5,695,934; 6,140,489; or 5,863,722; or US Pat. Pub. Nos. 2007/007991 A1, 2009/0247414 A1, or 2010/0111768; or WO2007/123744, each of which is incorporated herein by reference in its entirety. In particular embodiments, the stage of a known sequencing system can be replaced with a scanning apparatus set forth herein.

Generally, an objective is the optical element of the detection apparatus that is proximal (i.e. closest to) the vessel that is to be detected (e.g. flow cell). In some embodiments, the vessel need not include any optical components. In alternative embodiments, one or more optical component, such as a lens or fiber optic, can be provided by a vessel or by a cartridge to which the vessel is attached. For example, the objective of the detection apparatus can be configured to direct excitation, emission or other signals to the optical component that is present on the vessel or cartridge. Thus, the optical component that is proximal to the sample can be provided by the detection apparatus, or alternatively, by the vessel that houses the sample.

A detection apparatus that is used to observe a vessel in a method or apparatus set forth herein need not be capable of optical detection. For example, the detector can be an electronic detector used for detection of protons or pyrophosphate (see, for example, US Pat. App. Pub. Nos. 2009/0026082 A1; 2009/0127589 A1; 2010/0137143 A1; or 2010/0282617 A1, each of which is incorporated herein by reference in its entirety, or the Ion Torrent™ systems commercially available from ThermoFisher, Waltham, Mass.) or as used in detection of nanopores such as those commercialized by Oxford Nanopore™, Oxford UK (e.g. MinION™ or PromethION™ systems) or set forth in U.S. Pat. No. 7,001,792; Soni & Meller, Clin. Chem. 53, 1996-2001 (2007); Healy, Nanomed. 2, 459-481 (2007); or Cockroft, et al. J. Am. Chem. Soc. 130, 818-820 (2008), each of which is incorporated herein by reference.

In a particular embodiments, apparatus or methods set forth herein can be configured for scanning electron microscopy (SEM). Accordingly, an electron beam can be produced by an electron gun and directed to a vessel by one or more condenser lenses, scanning coils and/or deflector plates. Signal can be detected using an electron detector such as a scintillator-photomultiplier system (e.g. an Everhart-Thornley detector).

Figure 7A:
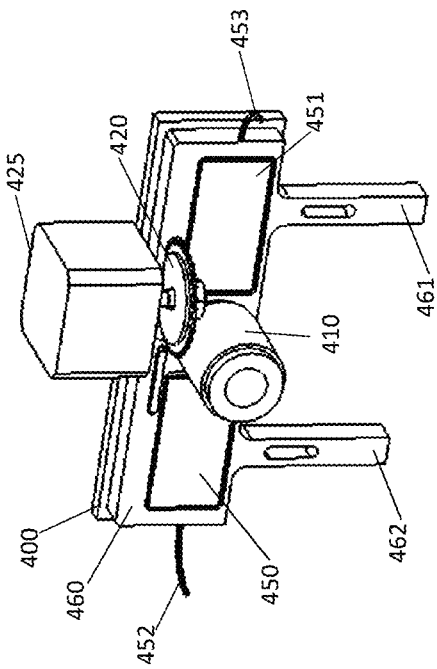
FIG. 7A shows a perspective view of a heating plate and film sprocket scanning mechanism and FIG. 7B shows a perspective view of an objective and the heating plate and film sprocket scanning mechanism.
Figure 7B:
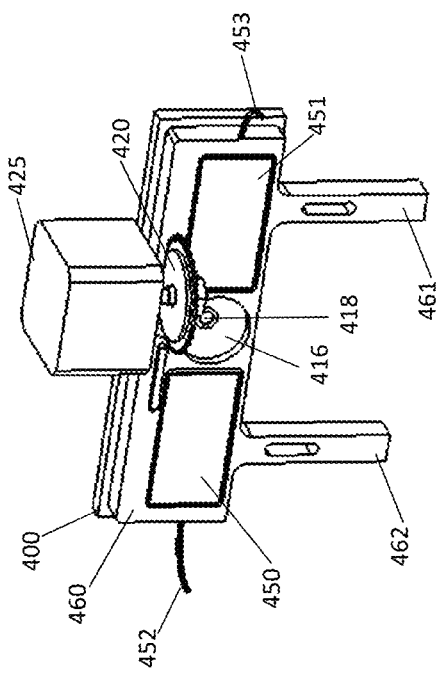

In particular embodiments, a detection apparatus or other apparatus of the present disclosure can provide temperature control of a vessel that is to be detected. Temperature control can be provided by controlling temperature of an internal chamber that houses the vessel. Alternatively or additionally, a vessel that is to be detected can be placed into contact with a thermally conductive surface that is temperature controlled. FIG. 7A shows an exemplary configuration for achieving temperature control of a flow cell via contact with a thermally conductive surface. The backside of aluminum body 460 is attached to two thermal elements 450 and 451 which are located left and right of conical depression 416. The thermal elements can be polyimide thermofoil heaters, Peltier elements, metal heating elements, ceramic heating elements, polymer PTC heating elements or the like. Aluminum body 460 also includes two legs 461 and 462 for attachment to the detection apparatus. As such the two legs form part of the structural loop between the reference surface on the aluminum body 460 and the detection apparatus. Optionally, legs 461 and 462 can be made from a material having low thermal conductivity. Thus, the legs can function to attach the aluminum body to a detection apparatus in a way that insulates other components of the detection apparatus from experiencing unwanted temperature fluctuations. Thermal elements 450 and 451 can be activated via wires 452 and 453 to heat or cool aluminum body 460 such that a flow cell in cartridge 400 is in contact with the opposite side of aluminum body 460 and thus is temperature controlled. As shown in FIG. 7B, conical depression 416 is configured to accept an objective 410 for detection of a flow cell in cartridge 400 through window 418. In the configuration shown, the flow cell cartridge 400 is translated via film sprocket 420 under the control of rotary motor 425.

A detection apparatus or other apparatus of the present disclosure can include a fluidics system for delivering reagents to a vessel that is to be detected. Accordingly, one or more reservoirs can be fluidically connected to an inlet valve of the vessel. The apparatus can further include a pressure supply for driving reagents from reservoirs to the vessel. The apparatus can include a waste reservoir that is fluidically connected to the vessel to remove spent reagents. Taking as an example an embodiment where the vessel is a flow cell, reagents can be delivered via pump to the flow cell through the inlet and then the reagents can flow through the flow cell outlet to a waste reservoir. The reservoirs can include reagents for any of a variety of analytical procedures including, but not limited to nucleic acid sequencing, nucleic acid genotyping, nucleic acid expression analysis, protein sequencing, protein binding analysis (e.g. ELISA), small molecule receptor binding, protein phosphorylation analysis, nucleic acid synthesis or protein synthesis. Alternatively or additionally, the reservoirs can include reagents for a preparative process. Exemplary preparative processes include, but are not limited to, nucleic acid synthesis, peptide synthesis, assembly of oligonucleotides into genes, photolithography, nanofabrication or microfabrication (e.g. via laser etching), laser ablation, or the like.

A fluidic system can include at least one manifold and/or at least one valve for directing reagents from reservoirs to a vessel where detection occurs. Manifolds are particularly useful in sequencing instruments due to the relatively large number of different reagents that are delivered during a sequencing protocol. Exemplary protocols and useful reagents are set forth in further detail below and in references that are incorporated herein by reference. Fluid flow from the reservoirs can be selected via valves such as a solenoid valve (e.g. those made by Takasago Electric, Japan), ball valve, diaphragm valve or rotary valve.

Figure 8B:
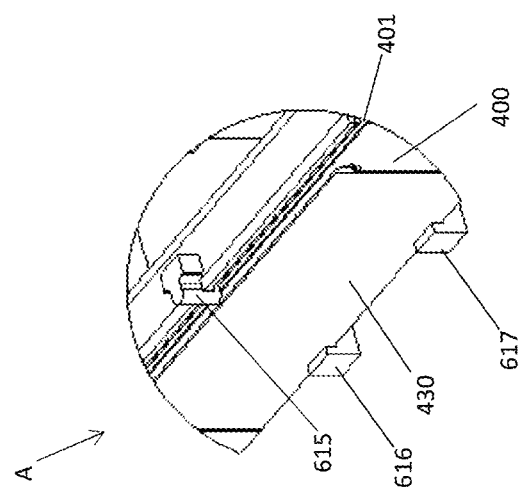
FIG. 8B shows an expanded view of the attachment points for the flow cell to the caddy.
Figure 8A:
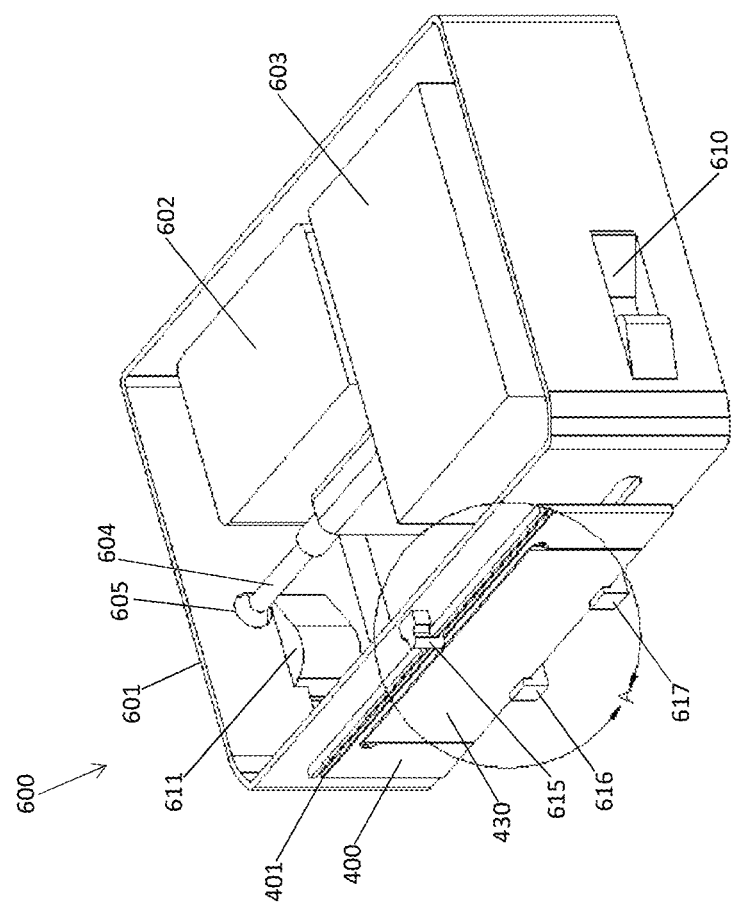
FIG. 8A shows a perspective view of a fluidic caddy with an attached flow cell.

One or more fluidic components used in a detection apparatus or other apparatus of the present disclosure can be housed in a fluidic caddy that is separable from detection components. An exemplary fluidic caddy 600 is shown in FIG. 8A. Fluidic caddy 600 includes a housing 601 having sufficient internal volume to house reagent reservoirs 603, waste reservoirs 602, and a piston shaft 604 for an external pump. Any of a variety of fluidic components can be housed in a fluidic caddy including, but not limited to, one or more reservoirs, fluid lines, valves or pumps. The fluidic caddy includes latches 610 and 611 which are configured to engage with hooks in a detection apparatus. See for example, switch hook 701 in FIG. 9. Flow cell 430 is held within cartridge 400 and cartridge 400 is held to the fluidic caddy 600 via hook 616 and guides 616 and 617. As shown in the expanded cutout of FIG. 8B and in side-view FIG. 8D, hook 615 includes a tooth 614 that inserts into track 401 to hold the cartridge 400 in place. Guides 616 and 617 complete a three-point attachment by engaging the bottom edge of cartridge 400. Preload 620, although shown in retracted position in FIG. 8D, can be extended to push against the back side of the cartridge 400, thereby functioning with hook 615 and guides 616 and 617 to hold the cartridge in place by compressive forces.

Figure 8F:
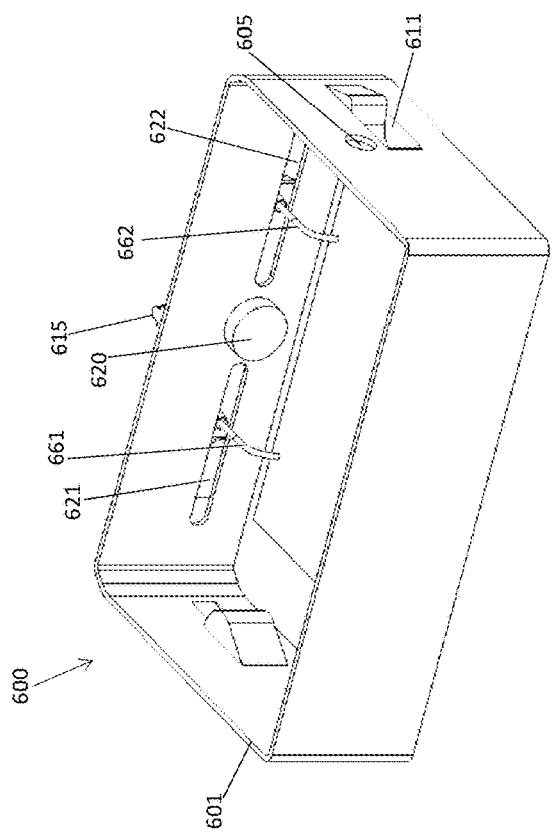
FIG. 8F shows a perspective view of the fluidic caddy emptied of several fluidic components.
Figure 8E:
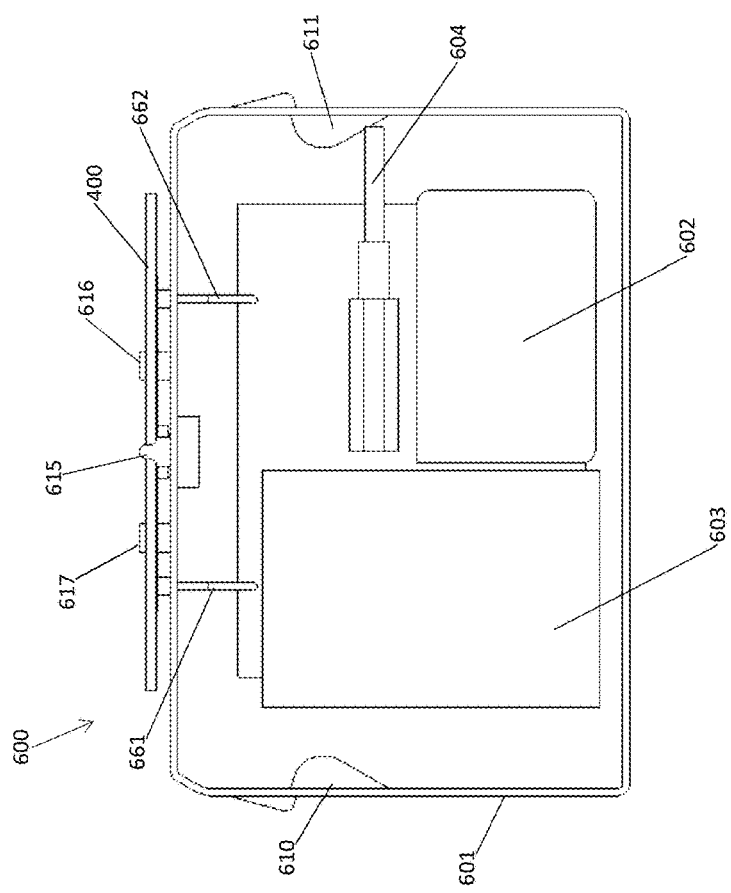
FIG. 8E shows a top view of the fluidic caddy with attached flow cell.

Fluidic caddy 600 includes openings as shown in FIG. 8D and FIG. 8F. For purposes of showing fluidic connections for the flow cell 430, FIG. 8F shows a perspective view of caddy 600 that has been emptied of several other fluidic components. Opening 605 is configured to accept the piston of an external pump. The piston can be driven by a detection apparatus to allow control of fluid flow through flow cell 430 during an analytical procedure (e.g. a nucleic acid sequencing procedure), but the piston need not directly contact any fluids in the caddy 600 or in the flow cell 430. Accordingly, the detection apparatus can constitute a "dry" component that does not make direct contact with fluids, whereas the caddy 600 and flow cell 430 constitute "wet" components. Fluidic caddy 600 includes two elongated openings 621 and 622 which are configured to accommodate tubes 661 and 662, respectively. The elongated shape allows the tubes to move along the x dimension as the flow cell is translated during scanning. Thus, the tubes can remain engaged with the flow cell and fluidic reservoirs during a scanning operation.

The flow cell 430 can be translated independently of caddy 600 via movement of the cartridge as set forth previously herein, for example, in connection with FIG. 4. As such, caddy 600 remains stationary while flow cell 430 is moved. Alternatively, a flow cell can be attached to a caddy such that the caddy and flow cell are translated as a unit. In a further alternative, one or more detection components of a detection apparatus can be moved while the flow cell and/or fluidic caddy is stationary.

Figure 9B:
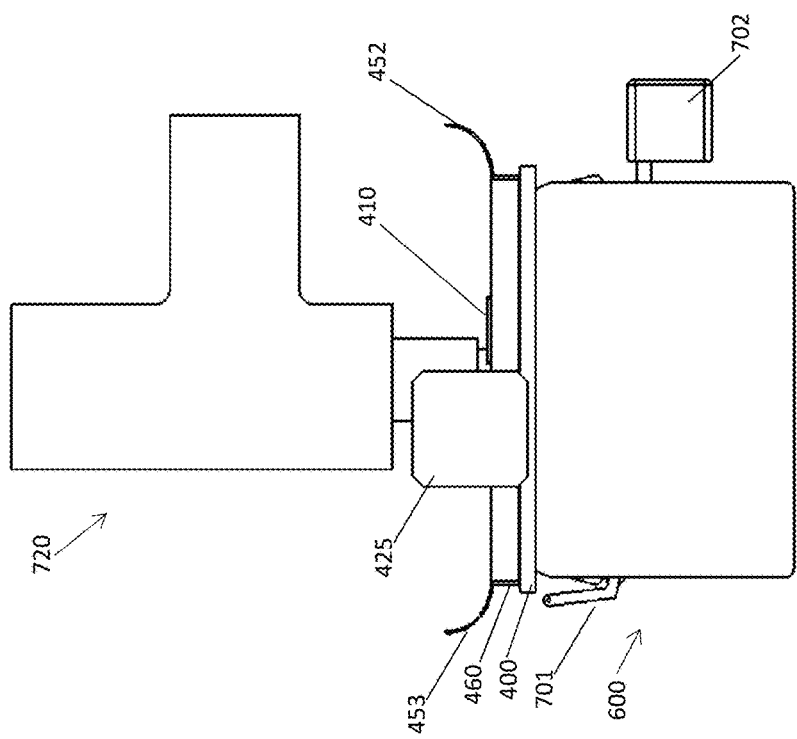
FIG. 9B shows a top view of the fluidic caddy and flow cell interacting with the detection apparatus.
Figure 9A:
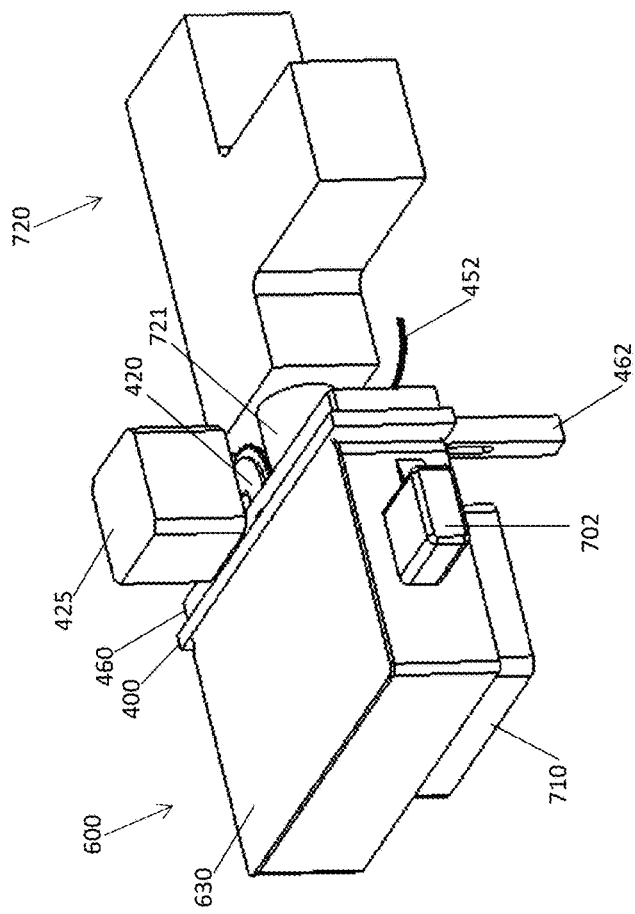
FIG. 9A shows a perspective view of a fluidic caddy and flow cell interacting with a detection apparatus.

Interactions between fluidic caddy 600 and components of a detection apparatus are shown in FIG. 9. The perspective view in FIG. 9A and top view in FIG. 9B, show caddy 600 engaged in a way that sandwiches flow cell cartridge 400 between the caddy 600 and aluminum body 460. When engaged, the flow cell cartridge 400 contacts film sprocket 420 such that motor 425 can drive translation of the flow cell therein. Translation will cause the flow cell to move past objective 721 which is in turn configured to direct fluorescence excitation from fluorometer 720 to the flow cell and to direct fluorescence emission from the flow cell to fluorometer 720.

The mechanism of engaging caddy 600 and flow cell cartridge 400 with a detection apparatus or other apparatus of the present disclosure can be akin to inserting an 8-track cassette into an audio player. The flow cell 430 and cartridge 400 are connected to caddy 600 such that a user need not directly handle the flow cell 430, instead delivering it to the detection apparatus by handling the caddy 600, much like a user need not handle the tape inside of the 8-track cassette. Similarly, individual fluidic components need not be individually handled but can properly engage with actuators in the detection apparatus when the caddy 600 is properly placed in the detection apparatus.

Fluidic caddy 600 is disengaged from the detection apparatus in FIG. 9C, which illustrates mechanical elements that can be used by the detection apparatus to control function of the fluidic caddy 600. The detection apparatus can include a sensor or switch that responds to presence of the fluidic caddy and actuates functional interactions. In the example of FIG. 9, switch hook 701 is displaced when caddy 600 is properly engaged. This displacement can activate one or more functions. For example, the underside of fluidic caddy 600 can include one or more openings that are positioned to accept one or more valve actuator 711 on platform 710. Valve actuators, although shown in the proud position for purposes of illustration, can be retracted into platform 710 when fluidic caddy 600 is not present. The valve actuators can be raised in response to displacement of switch hook 701 and/or in response to control software for the detection apparatus. Accordingly, the one or more valve actuator 711 can be used to control flow of fluids to the flow cell, from the flow cell, and/or between reservoirs within the caddy. In another example, pump component 702 of the detection apparatus can engage with fluidic components of the caddy 600 via opening 710, for example, by inserting a piston. Interaction of pump component 702 with the fluidic caddy 600 can be actuated directly due to displacement of switch hook 701 and/or in response to control software for the detection apparatus.

The structural loop between the flow cell 430 and fluorometer 720 includes reference surface 417, aluminum body 460, legs 461 and 462, a plate or base to which legs 461 and 462 are attached, and fluorometer 720 which is also attached to the plate or base.

FIG. 10 shows a mechanism that can be used for engaging a flow cell with a detection apparatus. FIG. 10A shows a side view and expanded detail of fluidic cartridge 600 and flow cell cartridge 400 when not engaged with a detection apparatus. When the fluidic caddy 600 is not engaged, flow cell cartridge 400 is in contact with hook 615 and guides 616 and 617. FIG. 10B shows an expanded detail of the configuration that results when caddy 600 is engaged with the detection apparatus. Specifically, flow cell cartridge 400 is moved toward the wall of caddy 600, disengaging from hook 615 and from guides 616 and 617.

A mechanism for changing the position of the flow cell cartridge 400 is shown in FIG. 10E, which is a detail view of the interface between caddy 600, flow cell cartridge 400 and aluminum body 460. FIG. 10E is a detail of FIG. 10D which is a cutaway along line m in FIG. 10C. When the caddy 600 is properly engaged with the detection apparatus, hook 615 and guides 616 and 617 are inserted into notches 471, 472 and 473 in aluminum body 460. The notches 471, 472 and 473 have a sufficient depth that compression of the caddy toward the aluminum body 460 causes the front side of flow cell cartridge 400 to engage sprocket 420 and the front side of flow cell 430 to contact reference surface 417. The compression also results in the back side of flow cell cartridge 400 contacting compression foot 102. In this way, the flow cell 430 is pressed against the reference surface 417 for alignment with objective 410, which observes the flow cell 430 through window 418. The flow cell 430 can be translated via interaction of sprocket 420 with perforation track 401.

Although interactions between a fluidic caddy and detection apparatus have been exemplified herein using mechanical contacts, it will be understood that other mechanical switching mechanisms can be used. Electronic switches can also be used, including for example, those that are activated by electronic sensors (e.g. Bluetooth), magnetic sensors, radio frequency sensors (e.g. RFID), pressure sensors, optical sensors (e.g. barcodes) or the like.

The fluidic caddy and components set forth above are exemplary. Other fluidic caddies and fluidic components that can be used with a detection apparatus of the present disclosure are set forth in commonly owned U.S. patent application Ser. No. 15/922,661, which is published as US Pat. App. Pub. No. 2018/0280975 A1 and claims the benefit of U.S. Provisional App. No. 62/481,289, and US Pat. App. Pub. No. 2017/0191125 A1, each of which is incorporated herein by reference. Moreover, a similar fluidic caddy can be used with other apparatus of the present disclosure, such as reactor apparatus, and the other apparatus can be configured as set forth above to interface with a caddy.

Optionally, a detection apparatus or other apparatus of the present disclosure can further include a computer processing unit (CPU) that is configured to operate one or more of the system components set forth herein. The same or different CPU can interact with the system to acquire, store and process signals (e.g. signals detected in a method set forth herein). In particular embodiments, a CPU can be used to determine, from the signals, the identity of the nucleotide that is present at a particular location in a template nucleic acid. In some cases, the CPU will identify a sequence of nucleotides for the template from the signals that are detected.

A useful CPU can include, for example, one or more of a personal computer system, server computer system, thin client, thick client, hand-held or laptop device, multiprocessor system, microprocessor-based system, set top box, programmable consumer electronic, network PC, minicomputer system, mainframe computer system, smart phone, or distributed cloud computing environment that includes any of the above systems or devices. The CPU can include one or more processors or processing units, a memory architecture that may include RAM and non-volatile memory. The memory architecture may further include removable/non-removable, volatile/non-volatile computer system storage media. Further, the memory architecture may include one or more readers for reading from and writing to a non-removable, non-volatile magnetic media, such as a hard drive, a magnetic disk drive for reading from and writing to a removable, non-volatile magnetic disk, and/or an optical disk drive for reading from or writing to a removable, non-volatile optical disk such as a CD-ROM or DVD-ROM. The CPU may also include a variety of computer system readable media. Such media may be any available media that is accessible by a cloud computing environment, such as volatile and non-volatile media, and removable and non-removable media.

The memory architecture may include at least one program product having at least one program module implemented as executable instructions that are configured to control one or more component of an apparatus set forth herein or to carry out one or more portions of a method set forth herein. For example, executable instructions may include an operating system, one or more application programs, other program modules, and program data. Generally, program modules may include routines, programs, objects, components, logic, data structures, and so on, that perform particular tasks such as processing of signals detected in a method set forth herein.

The components of a CPU may be coupled by an internal bus that may be implemented as one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A CPU can optionally communicate with one or more external devices such as a keyboard, a pointing device (e.g. a mouse), a display, such as a graphical user interface (GUI), or other device that facilitates interaction of a user with the nucleic acid detection system. Similarly, the CPU can communicate with other devices (e.g., via network card, modem, etc.). Such communication can occur via I/O interfaces. Furthermore, a CPU of a system herein may communicate with one or more networks such as a local area network (LAN), a general wide area network (WAN), and/or a public network (e.g., the Internet) via a suitable network adapter.

FIG. 11 shows a cutaway profile view of an exemplary optical arrangement that uses immersion optics. The arrangement includes an objective 710 that includes a housing 720 and several lenses 711, 712 and 715. The number, position and shape of the lenses is exemplary and can vary according to desired prescription. Also included is rigid body 700, flow cell 701 and flow cell cartridge 702. Flow cell cartridge 702 includes inlet 741 and outlet 742 for moving fluid reagents into and out of the flow cell. The bottom side of rigid body 700 has a reference surface 717 that becomes sealed by flow cell 710 when a preload is applied, for example, as set forth using configurations set forth above. Opposite this seal, rigid body 700 includes a conical depression 716 that is shaped to accept the tip of objective 710. The space 716 between rigid body 700, objective 710 and the seal can be filled with an immersion fluid, such as an oil or aqueous solvent that is index matched to the objective. As such, the immersion fluid will directly contact the proximal lens 715 of objective 710 and the surface of flow cell 701. The fluid can be maintained in the space 716 by seals 731 and 732, which are optionally flexible. Fluid can be added and/or removed from space 716 via line 733. Immersion optics can provide several advantages over optics that image through air including, for example, the ability to achieve numerical aperture (NA)

greater than 0.95, ability to image at greater depths into a vessel, and alleviating tolerances on the thickness and uniformity of vessel walls through which the objective resolves objects.

The present disclosure provides methods that are particularly useful for performing cyclical reactions. Each cycle can include delivering reagents for the reaction to a flow cell or other vessel where, optionally, the reaction, or products of the reaction, will be observed. Each cycle can further include scanning of the vessel using apparatus or methods set forth herein. The methods are exemplified herein in the context of a nucleic acid sequencing reaction. However, those skilled in the art will understand from the teaching herein how to modify the methods, and the apparatus, for other cyclical reactions such as nucleic acid synthesis reactions, peptide sequencing reactions, peptide synthesis reactions, combinatorial small molecule synthesis reactions or the like. However, the method need not be cyclical and can instead be carried out in a non-repetitive configuration, for example, to observe a single reaction or phenomenon.

Particularly useful sequencing reactions are Sequencing By Binding™ (SBB™) reactions as described in commonly owned US Pat. App. Pub. No. 2017/0022553 A1; U.S. Pat. App. Ser. No. 62/447,319 to which US Pat App. Pub. No. 2018/0044727 A1 claims priority; 62/440,624 to which US Pat App. Pub. No. 2018/0187245 A1 claims priority; or 62/450,397 to which US Pat App. Pub. No. 2018/0208983 A1 claims priority, each of which is incorporated herein by reference. Generally, methods for determining the sequence of a template nucleic acid molecule can be based on formation of a ternary complex (between polymerase, primed nucleic acid and cognate nucleotide) under specified conditions. The method can include an examination phase followed by a nucleotide incorporation phase.

The examination phase can be carried out in a flow cell (or other vessel), the flow cell containing at least one template nucleic acid molecule primed with a primer by delivering to the flow cell reagents to form a first reaction mixture. The reaction mixture can include the primed template nucleic acid, a polymerase and at least one nucleotide type. Interaction of polymerase and a nucleotide with the primed template nucleic acid molecule(s) can be observed under conditions where the nucleotide is not covalently added to the primer(s); and the next base in each template nucleic acid can be identified using the observed interaction of the polymerase and nucleotide with the primed template nucleic acid molecule(s). The interaction between the primed template, polymerase and nucleotide can be detected in a variety of schemes. For example, the nucleotides can contain a detectable label. Each nucleotide can have a distinguishable label with respect to other nucleotides. Alternatively, some or all of the different nucleotide types can have the same label and the nucleotide types can be distinguished based on separate deliveries of different nucleotide types to the flow cell. In some embodiments, the polymerase can be labeled. Polymerases that are associated with different nucleotide types can have unique labels that distinguish the type of nucleotide to which they are associated. Alternatively, polymerases can have similar labels and the different nucleotide types can be distinguished based on separate deliveries of different nucleotide types to the flow cell. Detection can be carried out by scanning the flow cell using an apparatus or method set forth herein.

During the examination phase, discrimination between correct and incorrect nucleotides can be facilitated by ternary complex stabilization. A variety of conditions and reagents can be useful. For example, the primer can contain a reversible blocking moiety that prevents covalent attachment of nucleotide; and/or cofactors that are required for extension, such as divalent metal ions, can be absent; and/or inhibitory divalent cations that inhibit polymerase-based primer extension can be present; and/or the polymerase that is present in the examination phase can have a chemical modification and/or mutation that inhibits primer extension; and/or the nucleotides can have chemical modifications that inhibit incorporation, such as 5' modifications that remove or alter the native triphosphate moiety. The examination phase can include scanning of the flow cell using apparatus and methods set forth herein.

The extension phase can then be carried out by creating conditions in the flow cell where a nucleotide can be added to the primer on each template nucleic acid molecule. In some embodiments, this involves removal of reagents used in the examination phase and replacing them with reagents that facilitate extension. For example, examination reagents can be replaced with a polymerase and nucleotide(s) that are capable of extension. Alternatively, one or more reagents can be added to the examination phase reaction to create extension conditions. For example, catalytic divalent cations can be added to an examination mixture that was deficient in the cations, and/or polymerase inhibitors can be removed or disabled, and/or extension competent nucleotides can be added, and/or a deblocking reagent can be added to render primer(s) extension competent, and/or extension competent polymerase can be added.

It will be understood that any of a variety of nucleic acid sequencing reactions can be carried out using an apparatus and method of the present disclosure. Other exemplary sequencing methods are set forth below.

Sequencing-by-synthesis (SBS) techniques can be used. SBS generally involves the enzymatic extension of a nascent primer through the iterative addition of nucleotides against a template strand to which the primer is hybridized. Briefly, SBS can be initiated by contacting target nucleic acids, attached to sites in a vessel, with one or more labeled nucleotides, DNA polymerase, etc. Those sites where a primer is extended using the target nucleic acid as template will incorporate a labeled nucleotide that can be detected. Detection can include scanning using an apparatus or method set forth herein. Optionally, the labeled nucleotides can further include a reversible termination property that terminates further primer extension once a nucleotide has been added to a primer. For example, a nucleotide analog having a reversible terminator moiety can be added to a primer such that subsequent extension cannot occur until a deblocking agent is delivered to remove the moiety. Thus, for embodiments that use reversible termination, a deblocking reagent can be delivered to the vessel (before or after detection occurs). Washes can be carried out between the various delivery steps. The cycle can be performed n times to extend the primer by n nucleotides, thereby detecting a sequence of length n. Exemplary SBS procedures, reagents and detection components that can be readily adapted for use with a detection apparatus produced by the methods of the present disclosure are described, for example, in Bentley et al., *Nature* 456:53-59 (2008), WO 04/018497; WO 91/06678; WO 07/123744; U.S. Pat. Nos. 7,057,026; 7,329, 492; 7,211,414; 7,315,019 or 7,405,281, and US Pat. App. Pub. No. 2008/0108082 A1, each of which is incorporated herein by reference. Also useful are SBS methods that are commercially available from Illumina, Inc. (San Diego, Calif.).

Some SBS embodiments include detection of a proton released upon incorporation of a nucleotide into an extension product. For example, sequencing based on detection of released protons can use reagents and an electrical detector that are commercially available from ThermoFisher (Waltham, Mass.) or described in US Pat. App. Pub. Nos. 2009/0026082 A1; 2009/0127589 A1; 2010/0137143 A1; or 2010/0282617 A1, each of which is incorporated herein by reference.

Other sequencing procedures can be used, such as pyrosequencing. Pyrosequencing detects the release of inorganic pyrophosphate (PPi) as nucleotides are incorporated into a nascent primer hybridized to a template nucleic acid strand (Ronaghi, et al., *Analytical Biochemistry* 242 (1), 84-9 (1996); Ronaghi, *Genome Res.* 11 (1), 3-11 (2001); Ronaghi et al. *Science* 281 (5375), 363 (1998); U.S. Pat. Nos. 6,210,891; 6,258,568 and 6,274,320, each of which is incorporated herein by reference). In pyrosequencing, released PPi can be detected by being converted to adenosine triphosphate (ATP) by ATP sulfurylase, and the resulting ATP can be detected via luciferase-produced photons. Thus, the sequencing reaction can be monitored via a luminescence detection system that is configured to scan a vessel using apparatus and methods set forth herein.

Sequencing-by-ligation reactions are also useful including, for example, those described in Shendure et al. *Science* 309:1728-1732 (2005); U.S. Pat. No. 5,599,675; or U.S. Pat. No. 5,750,341, each of which is incorporated herein by reference. Some embodiments can include sequencing-by-hybridization procedures as described, for example, in Bains et al., *Journal of Theoretical Biology* 135 (3), 303-7 (1988); Drmanac et al., *Nature Biotechnology* 16, 54-58 (1998); Fodor et al., *Science* 251 (4995), 767-773 (1995); or WO 1989/10977, each of which is incorporated herein by reference. In both sequencing-by-ligation and sequencing-by-hybridization procedures, primers that are hybridized to nucleic acid templates are subjected to repeated cycles of extension by oligonucleotide ligation. Typically, the oligonucleotides are fluorescently labeled and can be detected to determine the sequence of the template, for example, using a scanning apparatus or method set forth herein.

Some embodiments can utilize methods involving real-time monitoring of DNA polymerase activity. For example, nucleotide incorporations can be detected through fluorescence resonance energy transfer (FRET) interactions between a fluorophore-bearing polymerase and gamma-phosphate-labeled nucleotides, or with zero-mode waveguides (ZMW). Techniques and reagents for sequencing via FRET and or ZMW detection that can be modified for use in an apparatus or method set forth herein are described, for example, in Levene et al. *Science* 299, 682-686 (2003); Lundquist et al. *Opt. Lett.* 33, 1026-1028 (2008); Korlach et al. *Proc. Natl. Acad. Sci. USA* 105, 1176-1181 (2008); or U.S. Pat. Nos. 7,315,019; 8,252,911 or 8,530,164, the disclosures of which are incorporated herein by reference.

Steps for the above sequencing methods can be carried out cyclically. For example, examination and extension steps of an SBB' method can be repeated such that in each cycle a single next correct nucleotide is examined (i.e. the next correct nucleotide being a nucleotide that correctly binds to the nucleotide in a template nucleic acid that is located immediately 5' of the base in the template that is hybridized to the 3'-end of the hybridized primer) and, subsequently, a single next correct nucleotide is added to the primer. Any number of cycles of a sequencing method set forth herein can be carried out including, for example, at least 1, 2, 5, 10, 20, 25, 30, 40, 50, 75, 100, 150 or more cycles. Alternatively or additionally, no more than 150, 100, 75, 50, 40, 30, 25, 20, 10, 5, 2 or 1 cycles are carried out.

Nucleic acid template(s), to be sequenced, can be added to a vessel using any of a variety of known methods. In some embodiments, a single nucleic acid molecule is to be sequenced. The nucleic acid molecule can be delivered to a vessel and can optionally be attached to a surface in the vessel. In some embodiments, the molecule is subjected to single molecule sequencing. Alternatively, multiple copies of the nucleic acid can be made and the resulting ensemble can be sequenced. For example, the nucleic acid can be amplified on a surface (e.g. on the inner wall of a flow cell) using techniques set forth in further detail below.

In multiplex embodiments, a variety of different nucleic acid molecules (i.e. a population having a variety of different sequences) are sequenced. The molecules can optionally be attached to a surface in a vessel. The nucleic acids can be attached at unique sites on the surface and single nucleic acid molecules that are spatially distinguishable one from the other can be sequenced in parallel. Alternatively, the nucleic acids can be amplified on the surface to produce a plurality of surface attached ensembles. The ensembles can be spatially distinguishable and sequenced in parallel.

A method set forth herein can use any of a variety of amplification techniques in a vessel. Exemplary techniques that can be used include, but are not limited to, polymerase chain reaction (PCR), rolling circle amplification (RCA), multiple displacement amplification (MDA), bridge amplification, or random prime amplification (RPA). In particular embodiments, one or more primers used for amplification can be attached to a surface in a vessel. In such embodiments, extension of the surface-attached primers along template nucleic acids will result in copies of the templates being attached to the surface. Methods that result in one or more sites on a solid support, where each site is attached to multiple copies of a particular nucleic acid template, can be referred to as "clustering" methods.

In PCR embodiments, one or both primers used for amplification can be attached to a surface. Formats that utilize two species of attached primer are often referred to as bridge amplification because double stranded amplicons form a bridge-like structure between the two attached primers that flank the template sequence that has been copied. Exemplary reagents and conditions that can be used for bridge amplification are described, for example, in U.S. Pat. No. 5,641,658 or 7,115,400; U.S. Patent Pub. Nos. 2002/0055100 A1, 2004/0096853 A1, 2004/0002090 A1, 2007/0128624 A1 or 2008/0009420 A1, each of which is incorporated herein by reference. PCR amplification can also be carried out with one of the amplification primers attached to the surface and the second primer in solution. An exemplary format that uses a combination of one solid phase-attached primer and a solution phase primer is known as primer walking and can be carried out as described in U.S. Pat. No. 9,476,080, which is incorporated herein by reference. Another example is emulsion PCR which can be carried out as described, for example, in Dressman et al., *Proc. Natl. Acad. Sci. USA* 100:8817-8822 (2003), WO 05/010145, or U.S. Patent Pub. Nos. 2005/0130173 A1 or 2005/0064460 A1, each of which is incorporated herein by reference.

RCA techniques can be used in a method set forth herein. Exemplary reagents that can be used in an RCA reaction and principles by which RCA produces amplicons are described, for example, in Lizardi et al., *Nat. Genet.* 19:225-232 (1998) or US Pat. App. Pub. No. 2007/0099208 A1, each of which is incorporated herein by reference. Primers used for RCA can be in solution or attached to a surface in a flow cell.

MDA techniques can also be used in a method of the present disclosure. Some reagents and useful conditions for MDA are described, for example, in Dean et al., *Proc Natl. Acad. Sci. USA* 99:5261-66 (2002); Lage et al., *Genome Research* 13:294-307 (2003); Walker et al., *Molecular Methods for Virus Detection*, Academic Press, Inc., 1995; Walker et al., *Nucl. Acids Res.* 20:1691-96 (1992); or U.S. Pat. Nos. 5,455,166; 5,130,238; or 6,214,587, each of which is incorporated herein by reference. Primers used for MDA can be in solution or attached to a surface in a vessel.

In particular embodiments, a combination of the above-exemplified amplification techniques can be used. For example, RCA and MDA can be used in a combination wherein RCA is used to generate a concatemeric amplicon in solution (e.g. using solution-phase primers). The amplicon can then be used as a template for MDA using primers that are attached to a surface in a vessel. In this example, amplicons produced after the combined RCA and MDA steps will be attached in the vessel. The amplicons will generally contain concatemeric repeats of a target nucleotide sequence.

Nucleic acid templates that are used in a method or composition herein can be DNA such as genomic DNA, synthetic DNA, amplified DNA, complementary DNA (cDNA) or the like. RNA can also be used such as mRNA, ribosomal RNA, tRNA or the like. Nucleic acid analogs can also be used as templates herein. Thus, a mixture of nucleic acids used herein can be derived from a biological source, synthetic source or amplification product. Primers used herein can be DNA, RNA or analogs thereof.

Exemplary organisms from which nucleic acids can be derived include, for example, those from a mammal such as a rodent, mouse, rat, rabbit, guinea pig, ungulate, horse, sheep, pig, goat, cow, cat, dog, primate, human or non-human primate; a plant such as *Arabidopsis thaliana*, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, honey bee or spider; a fish such as zebrafish; a reptile; an amphibian such as a frog or *Xenopus laevis*; a dictyostelium discoideum; a fungi such as *Pneumocystis carinii, Takifugu rubripes*, yeast, *Saccharamoyces cerevisiae* or *Schizosaccharomyces pombe*; or a *Plasmodium falciparum*. Nucleic acids can also be derived from a prokaryote such as a bacterium, *Escherichia coli*, staphylococci or *Mycoplasma pneumoniae*; an archae; a virus such as Hepatitis C virus or human immunodeficiency virus; or a viroid. Nucleic acids can be derived from a homogeneous culture or population of the above organisms or alternatively from a collection of several different organisms, for example, in a community or ecosystem. Nucleic acids can be isolated using methods known in the art including, for example, those described in Sambrook et al., *Molecular Cloning: A Laboratory Manual, 3rd edition*, Cold Spring Harbor Laboratory, New York (2001) or in Ausubel et al., *Current Protocols in Molecular Biology*, John Wiley and Sons, Baltimore, Md. (1998), each of which is incorporated herein by reference. Cells, tissues, biological fluids, proteins and other samples can be obtained from these organisms and detected using an apparatus or method set forth herein.

A template nucleic acid can be obtained from a preparative method such as genome isolation, genome fragmentation, gene cloning and/or amplification. The template can be obtained from an amplification technique such as polymerase chain reaction (PCR), rolling circle amplification (RCA), multiple displacement amplification (MDA) or the like. Exemplary methods for isolating, amplifying and fragmenting nucleic acids to produce templates for analysis on an array are set forth in U.S. Pat. No. 6,355,431 or 9,045,796, each of which is incorporated herein by reference. Amplification can also be carried out using a method set forth in Sambrook et al., *Molecular Cloning: A Laboratory Manual, 3rd edition*, Cold Spring Harbor Laboratory, New York (2001) or in Ausubel et al., *Current Protocols in Molecular Biology*, John Wiley and Sons, Baltimore, Md. (1998), each of which is incorporated herein by reference.

The present disclosure further provides a detection apparatus that includes (a) a vessel having a lumen and a wall, wherein the wall has an internal surface and an external surface, wherein the wall has a plurality of discrete contacts between the internal surface and the external surface, wherein the internal surface contacts the lumen, and wherein the plurality of discrete contacts occupies a length l in a scan dimension x; (b) a transmissive surface; (c) a preload configured to urge discrete contacts on the external surface of the vessel to contact the transmissive surface, optionally, the area of the transmissive surface can have a maximum length in the scan dimension x that is shorter than length l; (d) a scan actuator configured to slide the vessel along the transmissive surface in the scan dimension x; and (e) a detector configured to acquire signals from the discrete contacts via the transmissive surface.

As exemplified in several embodiments herein, optical signals can be relayed to a detection apparatus via transmissive surface that is transparent to optical signals. An objective serves as a useful transmitter of optical signals from a vessel to a detector. In some embodiments the transmitter is an array of lenses. The lenses in the array can be configured to collect signals from (or direct energy to) different areas in an xy plane. The lenses can be arranged to collect signals from contiguous areas in the xy plane or, alternatively, the areas that are observed can be separated by interstitial regions that are not observed when the areas are observed. In some embodiments, the vessel includes an array of sites that is configured to be observed by an array of lenses. Each lens can be configured to simultaneously observe one or more sites in the array of sites. For example, each lens can be configured to observe at least 1, 4, 9, 16, 25, 36, 49, 64, 81, 100 or more sites in an array of sites. Alternatively or additionally, each lens can be configured to observe at most 100, 81, 64, 49, 36, 25, 16, 9, 4 or 1 site(s) in an array of sites. Accordingly, an embodiment is provided wherein each lens is configured to observe a single site.

Each lens in an array of lenses can be aligned with its own optical train to direct radiation to one or more detector. Alternatively, multiple lenses can be combined into a common optical train to direct radiation to one or more detector. The optical trains can include any of a variety of optical components including, but not limited to, a collimating lens for collimating signals from the array of sites, a color separating element for spectrally separating radiation; and a focusing lens for focusing radiation from the sites to a detector. Exemplary configurations for an array of lenses and an array of sites observed by the lenses is provides in U.S. Pat. No. 9,581,550, which is incorporated herein by reference. For example, the sites of the array can be zero mode waveguides (ZMWs).

Other transmitters can be used as appropriate for the energy or signal that is to be transmitted. For example, a transmissive surface can conduct electrical signals, thermal signals, magnetic signals, pressure signals, audio signals, or the like. Temporary electrical contacts such as pogo pins can be used to transmit electrical signals between the transmissive surface and vessel. A transmitter that is present in an apparatus set forth herein can transmit energy of a variety of forms, including but not limited to the aforementioned signals.

In a particular embodiment, the transmissive surface or the internal surface of the vessel includes an electronic detector such as a field-effect transistor (FET) or complementary metal oxide semiconductor (CMOS). Particularly useful electronic detectors include, for example, those used for nucleic acid sequencing applications such as those used for detection of protons as set forth in US Pat. App. Pub. Nos. 2009/0026082 A1; 2009/0127589 A1; 2010/0137143 A1; or 2010/0282617 A1, each of which is incorporated herein by reference. Also useful are electronic detectors used to detect optical signals including for example, those set forth in US Pat. App. Pub. Nos. 2009/0197326 A1; 2015/0293021 A1; 2016/0017416 A1; or 2016/0356715 A1, each of which is incorporated herein by reference.

The apparatus and methods of the present disclosure have been exemplified in the context of use for nucleic acid sequencing reactions. The apparatus and methods can be used for other analytical applications as well. Generally, analytical applications that are carried out in scanning microscopes can be applied to apparatus and methods of the present disclosure. For example, the methods or apparatus can be configured to scan microarrays that are used for analyzing enzyme activity, binding of ligands to receptors, binding of complementary nucleic acids to each other, presence of mutations (such as single nucleotide polymorphisms (SNPs)) in nucleic acids, expression level for RNA species. Microarrays that are detected via optical labels, such as fluorophores, are particularly applicable. Larger biological samples such as cells or tissues can be detected using a method or apparatus herein. Again, detection modalities that utilize optically detected probes or stains are particularly applicable. Other uses include evaluation of manufactured products for which quality or other characteristics are evaluated via microscopic scanning. Exemplary products include, but are not limited to, computer chips, sensors, electronic components and other devices that are microfabricated or nanofabricated. Tests known in the art of molecular diagnostics can be modified for use in an apparatus or method set forth herein such as binding assays (e.g. enzyme-linked immunosorbent assay (ELISA)), real time polymerase chain reaction assays and the like.

Apparatus and methods set forth herein in the context of detecting reactions can be readily modified for use in preparative methods. In particular embodiments, the present disclosure provides reactor apparatus. A reactor apparatus can include (a) a vessel having a lumen and a wall, wherein the wall has an internal surface and an external surface, wherein the internal surface contacts the lumen; (b) a reference surface that forms a structural loop with an energy source; (c) a preload configured to urge the external surface of the vessel to contact an area on the reference surface; (d) a scan actuator configured to slide the vessel along the reference surface in a scan dimension; and (e) a transmitter configured to direct energy from the energy source to the internal surface or the lumen when the external surface of the vessel is urged by the preload to contact the reference surface.

Also provided is a method of performing reactions in a vessel. The method can include (a) translating a vessel along a reference surface of a reactor apparatus, wherein the vessel comprises a lumen and a wall, wherein the lumen comprises reactants, wherein the reference surface contacts at least a portion of the vessel during the translating, and wherein the reference surface forms a structural loop with an energy source; and (b) directing energy from the energy source to the reactants at different locations along the vessel, wherein the vessel is urged to the reference surface by a preload during the directing of the energy to the reactants, thereby performing reactions in the vessel.

A method of performing reactions can include (a) delivering energy from a reactor apparatus to a first subset of reactants in a vessel while applying a preload to a first portion of the vessel, wherein the preload positions the first subset of reactants to occupy an xy plane of a reaction zone, wherein the preload is not applied to a second portion of the vessel; (b) translating the vessel to position a second subset of the reactants in the xy plane of the reaction zone; and (c) delivering energy from the reactor apparatus to the second subset of the analytes in the vessel while applying the preload to a second portion of the vessel, wherein the preload positions the second subset of the analytes to occupy the xy plane, wherein the preload is not applied to the first portion of the vessel, thereby performing reactions in the vessel.

Exemplary energy sources that can be used in apparatus herein include, but are not limited to, radiation sources such as a laser, light emitting diode (LED), lamp, microwave source, or x-ray generator; electricity source; ion beam source such as a duoplasmitron; electron emitter such as a hot filament or hollow cathode; electric current source; or voltage source.

Exemplary Scan Actuators, Vessel Mounts and Methods of Use

The following examples describe scan actuators, vessel mounts and other components that can be used in various apparatus of the present disclosure. For example, a scanning apparatus can include (a) a scan actuator including a linear actuator and a mount for a removeable vessel, wherein the mount has a mechanical fastener (e.g. a post) that is configured to engage a complementary mechanical fastener (e.g. a slot) on the removeable vessel, and wherein the linear actuator is configured to translate the mount while the mechanical fastener engages the complementary mechanical fastener on the removeable vessel; (b) a reference surface; and (c) a preload configured to urge the vessel to contact the reference surface, wherein the linear actuator is configured to slide the vessel along the reference surface while the preload urges the vessel to contact the reference surface.

For ease of illustration, the scan actuators will be exemplified in the context of detection devices. However, the scan actuators can be used for other apparatus such as those set forth in the present disclosure.

In some configurations a scanning detection apparatus can include (a) a scan actuator including a linear actuator and a mount for a removeable vessel, wherein the mount has a mechanical fastener (e.g. a post) that is configured to engage a complementary mechanical fastener (e.g. a slot) on the removeable vessel, and wherein the linear actuator is configured to translate the mount while the mechanical fastener engages the complementary mechanical fastener on the removeable vessel; (b) a detection apparatus including a reference surface that forms a structural loop with a detector, and an objective configured to direct an optical signal from the vessel to the detector; and (c) a preload configured to urge the vessel to contact the reference surface, wherein the linear actuator is configured to slide the vessel along the reference surface while the preload urges the vessel to contact the reference surface.

FIG. 12 provides several views of a rack and pinion scan actuator 900 oriented with respect to several components of an optical detection device 800. The scan actuator and detection device can be used with other components set forth herein such as a preload or flow cell set forth herein. The scan actuator is configured to translate a flow cell assembly 1000 along the x andy axes for detection by an optical detection system 800. The optical detection device 800 components include inter alia a rigid body 801 that has a circular reference surface 803 surrounding an opening 804 through which an objective can view a vessel. A heating surface 802 is in proximity to the reference surface to allow temperature control of the vessel. The detection components are provided for purposes of illustration and can be replaced by other components for detection of analytes or for other procedures that can benefit from scanning, such as those set forth herein supra. The flow cell assembly 1000 is also exemplary and can be replaced by any of a variety of vessels such as those set forth herein supra. For example, in particular embodiments, the flow cell assembly 1000 can include a solid support for attaching one or more target analytes or reagents, which can include chemical and biological analytes having specific applicability to nucleic acid sequencing. The solid support can include an array of sites upon which different reagents or analytes (e.g. cells, nucleic acids, proteins, candidate small molecule therapeutics etc.) can be attached via linkages between the analytes and the corresponding sites in the array.

Figure 12A:
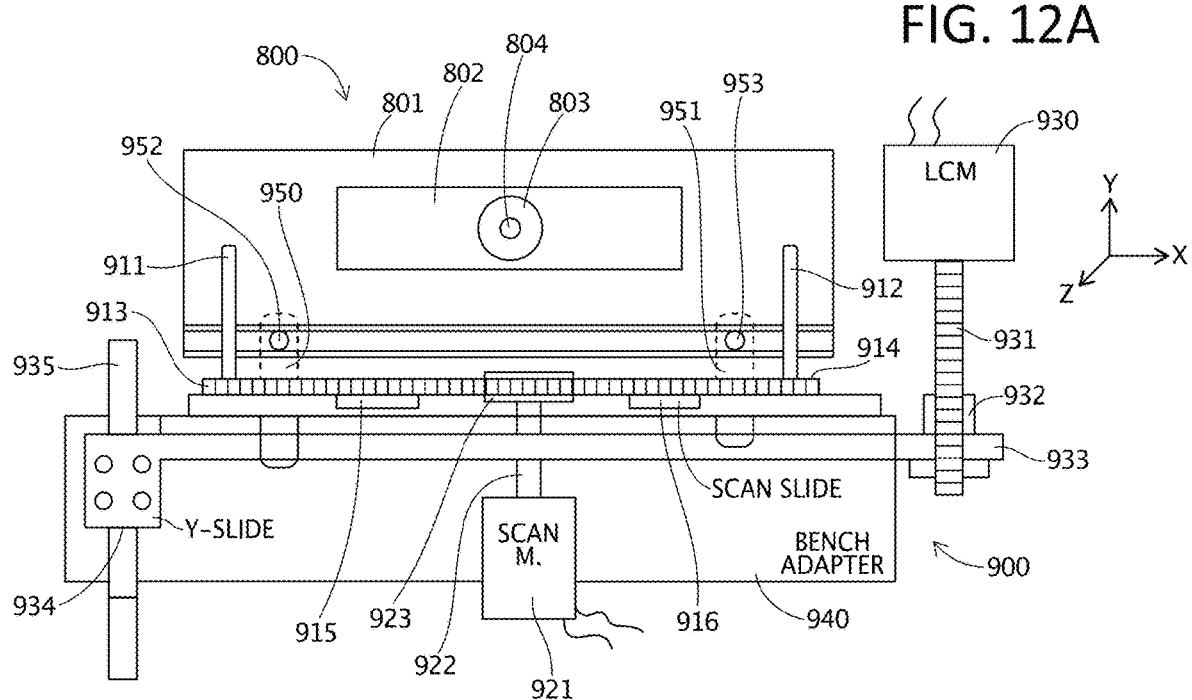
FIG. 12A shows a front view of a rack and pinion scan actuator in an optical detection device.

Scan actuator 900 is configured to allow bi-directional motion of flow cell assembly 1000 along each of the two orthogonal axes x and y. Motions along both axes occur relative to the components of optical detection device 800 that are shown in FIG. 12A. The components of optical detection device 800 that are shown in the figure can remain in a fixed position forming a structural loop with a detector.

A particularly beneficial aspect of scan actuator 900 is that motion along orthogonal dimensions (x and y in this example) can be achieved using a low mass mount 910 for the vessel that is to be observed. The combined mass of mount 910 and flow cell 1000 is less than 100 grams, substantially lower than the mass of a typical stage which is on the order of several kilograms. As set forth previously herein, an advantage of moving a low mass is to allow relatively rapid settling time, which in turn results in faster scanning for high resolution applications as compared to the high mass stages used in standard scanning devices used for high resolution detection. The system shown in FIG. 12 is configured for rapid settling time when scanning occurs along the x dimension since only mount 910 and flow cell 1000 are moved in this dimension. As will be apparent from FIG. 12 and the description below, components that are dedicated to linear actuation in they dimension need not be moved to achieve translation along x. This separation of components of the y-linear actuator from the x-linear actuator provides a substantial reduction in the mass that is to be moved along the primary scan axis and, in turn, a substantial reduction in settling times during the primary scan. More specifically, the primary scan dimension is along the x dimension and settle times are reduced during the primary scan because the components of the y-linear actuator, being separate from the components of the x-linear actuator, do not participate in the step and settle process occurring for the primary scan along the x dimension.

Figure 12B:
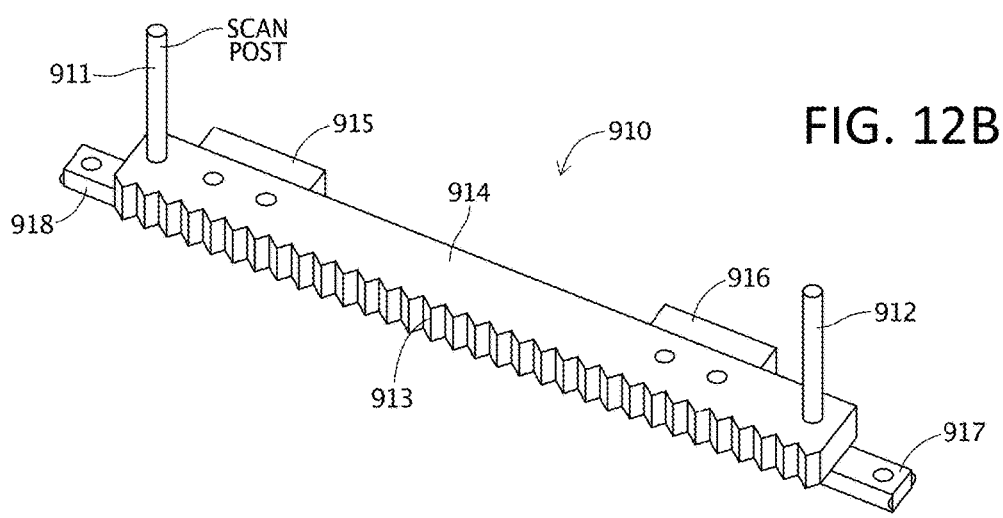
FIG. 12B shows the flow cell mount for the scan actuator.

Flow cell mount 910 can move back and forth, relative to reference surface 803, along the x dimension due to the linear actuation system provided by engagement of rack 913 to pinion 923. Pinion 923 rotates under the force of scan motor 921 which is attached to pinion 923 via shaft 922. Flow cell mount 910 and pinion 923 are fixed in they dimension. As shown in FIG. 12B, the flow cell mount 910 includes a rack 914 having integrated teeth 913. Also included on the flow cell mount are slider blocks 915 and 916. Two posts 911 and 912 are affixed to the rack 914 in a configuration to engage slots 1011 and 1012 on flow cell assembly 1000 (see FIG. 12C). The posts 911 and 912 when engaged with slots 1011 and 1012 will constrain the flow cell assembly 1000 from being displaced in the x dimension relative to mount 910. This provides for accurate positioning of the flow cell assembly 1000 when translated along the x dimension. The posts 911 and 912 also function as guides for translation of the flow cell assembly along the y dimension as set forth in further detail below. In this way the posts 911 and 912 perform a dual function of aligning the flow cell assembly 1000 during both x translation and y translation.

Flow cell assembly 1000 can also be moved along the orthogonal y dimension (up and down in the orientation shown in FIG. 12A). Movement along y is driven by scan motor 930 which rotates screw shaft 931 within threaded opening 932 for linear actuation of support 933. In the configuration shown, threaded opening 932 is proximal to one end of support 933 and a non-threaded opening 934 is proximal to the opposite end of support 933. The non-threaded opening slides along guidepost 935 to keep support 933 level as it moves up and down under the force of scan motor 930. The complementary action of the leadscrew 931 and guidepost 935 prevents unwanted yaw for the support 933 which in turn prevents unwanted yaw for the flow cell assembly 1000 relative to the reference surface. The flow cell assembly 1000 is engaged with the y-linear actuator via engagement of slot 1006 on the flow cell assembly 1000 with guidepins 952 and 953, the guidepins being affixed to support 933 via arms 950 and 951, respectively. Slot 1006 runs the length of flow cell assembly 1000 which prevents guidepins 952 and 953 from constraining translation of the flow cell assembly 1000 along the x dimension. Of course, the interaction between slot 1006 and the guidepins (952 and 953) also function to prevent unwanted yaw for the flow cell assembly relative to the reference surface 803. Posts 911 and 912 function as guides for displacement of the flow cell assembly along they dimension. Slots 1011 and 1012 slide along posts 911 and 912 to prevent unwanted yaw for the flow cell assembly relative to the reference surface 803.

Figure 12C:
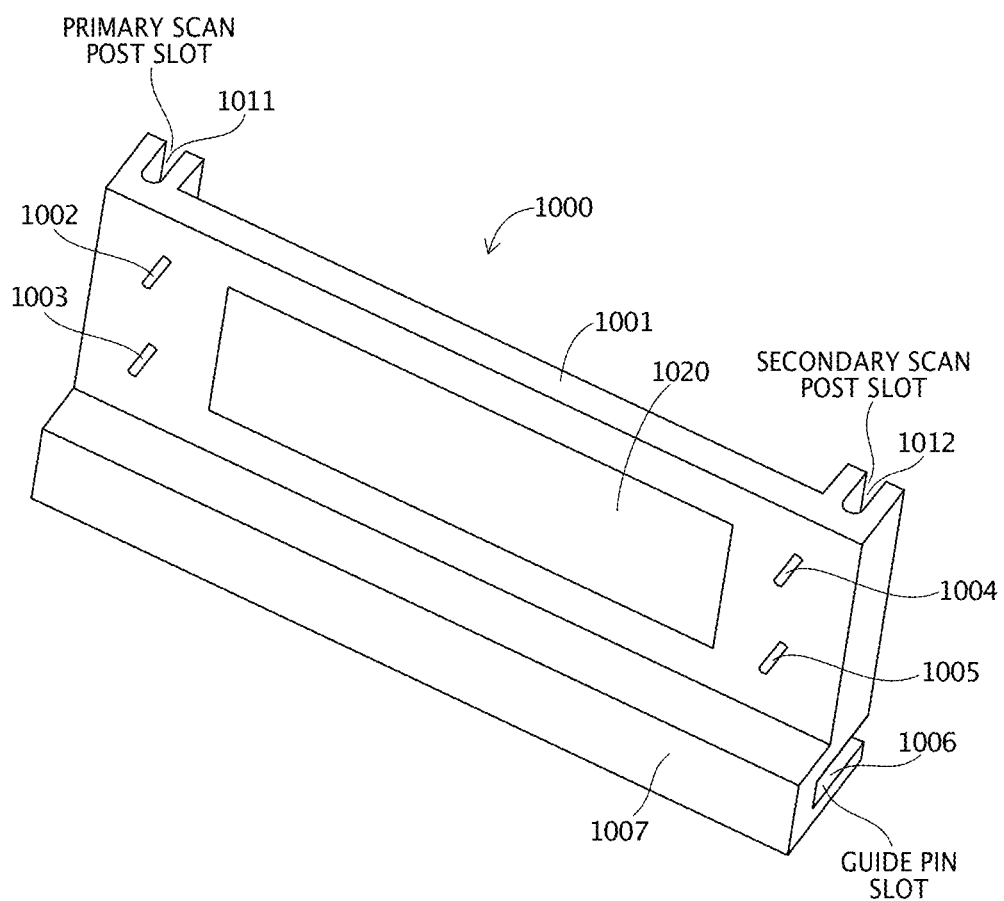
FIG. 12C shows a flow cell assembly.

As shown in FIG. 12C, slots 1011 and 1012 are open slots that do not fully enclose posts 911 and 912. More specifically, the slots have a semicircular or U-shaped cross section. This provides the flow cell assembly 1000 to be conveniently placed on the mount 910 using a pushing motion. The same motion can result in engagement of slot 1006 with guidepins 952 and 953. This pushing motion can be achieved by hand or by a relatively straightforward lever apparatus. In an alternative configuration, the flow cell assembly can have slots that fully enclose the perimeter of posts 911 and 912. For example, the slots can have a circular, oval or pill-shaped cross section. A flow cell assembly, or other vessel, having an enclosed slot can be dropped onto the posts 911 and 912. As will be apparent to those skilled in the art from these examples, the posts and slots can have any of a variety of complementary shapes to achieve similar results.

Flow cell assembly 1000 includes two fluidic ingress ports 1002 and 1003, and two fluidic egress ports 1004 and 1005. A vessel used in the apparatus can include any number of fluidic ports and any number of detection channels to accommodate a desired use. Exemplary flow cells and other vessels are set forth herein supra and in references cited and incorporated herein.

Figure 13A:
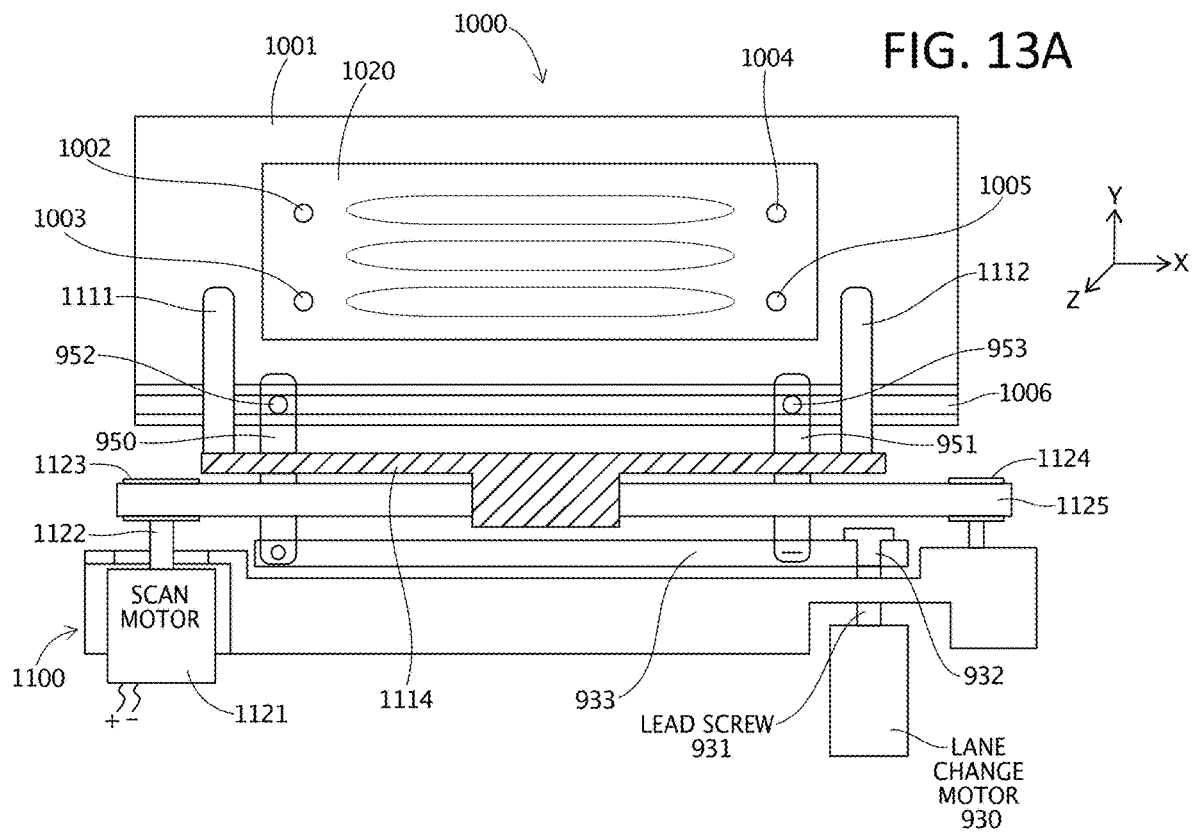
FIG. 13A shows a front view of a belt drive scan actuator in an optical detection device and FIG. 13B shows a top view of the belt drive and flow cell mount.
Figure 13B:
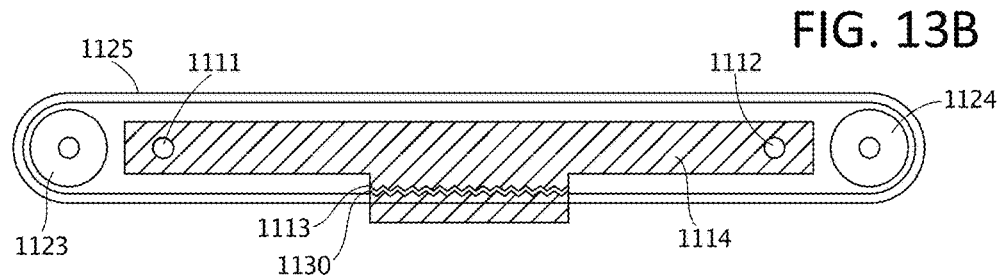

FIG. 13 shows a belt-drive scan actuator 1100 that can be used to translate a vessel, such as flow cell assembly 1000, for detection by a detection device, such as optical detection device 800. The belt-drive scan actuator 1100 can be used for linear translation of flow cell assembly 1000 bidirectionally along the x dimension. The detection components are exemplary and can be replaced by other components for detection of analytes or for other procedures that can benefit from scanning, such as those set forth herein supra. The flow cell assembly is also exemplary and can be replaced by any of a variety of vessels such as those set forth herein supra.

Flow cell assembly 1000 engages posts 1111 and 1112 in similar fashion as exemplified in the context of FIG. 12. The posts 1111 and 1112 are affixed to support 1114. Support 1114 engages belt 1125 via teeth 1113 on support 1114 and teeth on adapter 1130. Adapter 1130 is attached to belt 1125 and belt 1125 is actuated by rotation of gear 1123. Motor 1121 drives rotation of gear 1123 via shaft 1122. The belt 1125 also engages an idler with a tensioner 1124 for optimizing the belt drive.

The belt-drive scan actuator 1100 can be used in combination with the y-linear actuator shown in FIG. 12A. For example, the belt drive scan actuator 1100 can replace the rack and pinion actuator shown in FIG. 12A. In this case, posts 1111 and 1112 of the belt-drive actuator 1100 can function as guideposts for y-translation in the same way that posts 911 and 912 perform guidepost functions for y-translation in FIG. 12A. Movement along y is driven by scan motor 930 which rotates leadscrew 931 within threaded opening 932 for linear actuation of support 933. They slide and guidepost are not shown but can be similar to those shown in FIG. 12A. The flow cell assembly 1000 is engaged with the y-linear actuator via engagement of slot 1006 on the flow cell assembly 1000 with guidepins 952 and 953, the guidepins being affixed to support 933 via arms 950 and 951, respectively.

Figure 14A:
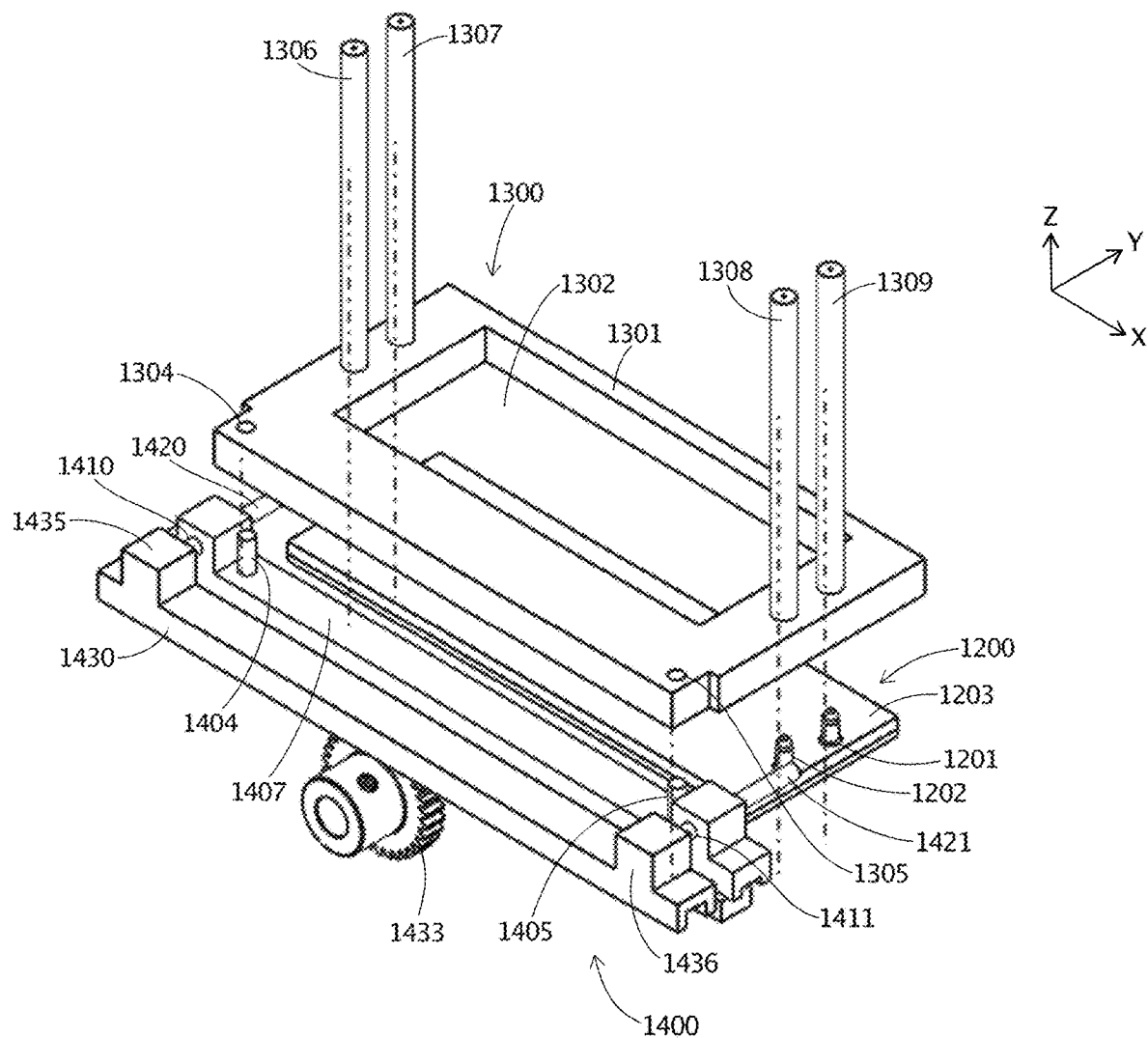
FIG. 14A shows a plan view of a rack and pinion scan actuator with flow cell and separated flow cell frame from a front/side perspective.
Figure 14B:
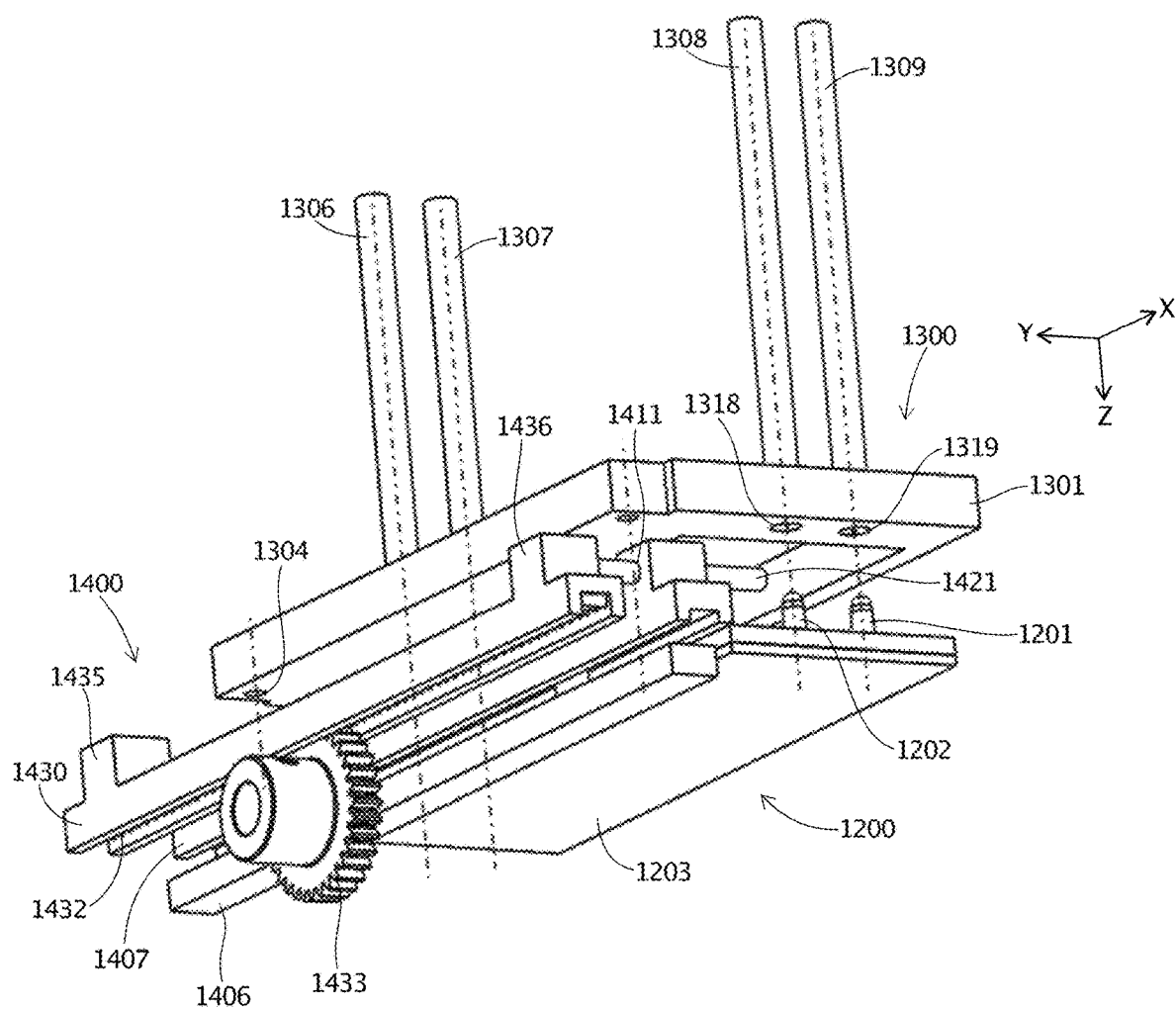
FIG. 14B shows a plan view of the rack and pinion scan actuator with flow cell and separated flow cell frame from a side perspective.
Figure 14C:
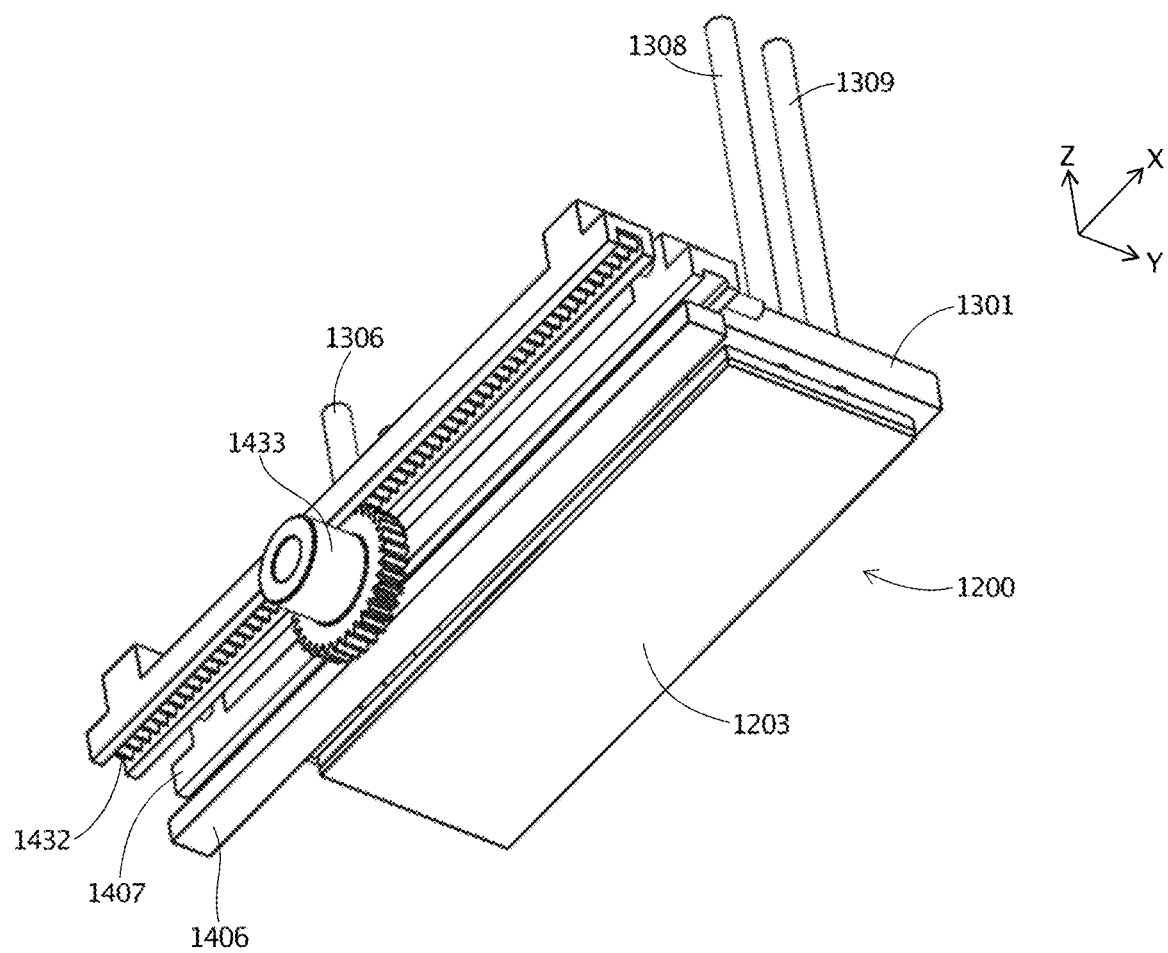
FIG. 14C shows a plan view of the rack and pinion scan actuator with flow cell and engaged flow cell frame from a rear/side perspective.

FIG. 14A and FIG. 14B show a scan actuator 1400 and flow cell 1200 with a flow cell frame 1300 from two different perspectives. The flow cell frame 1300 is separated from the flow cell 1200 in the figures for purposes of illustration. FIG. 14C shows a view of the components with the flow cell frame 1300 assembled with the flow cell 1200. The frame 1300 provides two beneficial functions: aligning the flow cell with the actuation apparatus 1400, which in turn aligns the flow cell 1200 with the detection components (not shown), and of aligning the flow cell 1200 with fluidics components 1306 through 1309. The frame 1300 includes a rigid material 1301 that surrounds a window 1302. The window 1302 is configured to allow observation of the flow cell 1200 and to allow a preload to interact with the flow cell 1200. A preload can be positioned to enter the window 1302 in order to apply pressure to the flow cell 1200 along the z axis. The frame is attached to ingress fluidic lines 1306 and 1307 and to egress fluidic lines 1308 and 1309. The frame 1300 is shown as separated from the flow cell 1200 to allow observation of fluidic connectors 1201 and 1202 which will form a fluidic connection with egress 1309 and 1308, respectively. The separation also shows fiducial posts 1404 and 1405 on support 1407, the fiducial posts being configured to mate with holes 1304 and 1305, respectively, on frame 1300. The resulting connection between frame 1300 and support 1407 affixes the flow cell 1200 for linear action along the y dimension. Support 1407 has holes 1410 and 1411 which slide along posts 1420 and 1421, respectively, to prevent flow cell yaw when the support 1407, support 1406, frame 1300 and flow cell 1200 are moved along the y dimension. Support 1407 can be engaged with a linear actuation motor such as those set forth herein or known in the art. Scanning along the x dimension is achieved via rotation of pinion 1433 against the teeth 1432 of rack 1430. Posts 1410 and 1411 are attached to rack 1430. Accordingly, support 1407 will remain aligned with rack 1430 in the x dimension.

As exemplified by the configurations of FIGS. 12 through 14, a mount for translating a vessel can include a pair of posts or other mechanical fasteners that engage slots or other corresponding mechanical fasteners on the vessel. The mechanical fasteners can be placed to avoid crossing the detection field (e.g. field of view for an objective) of the detector during a scanning operation. This is beneficial for avoiding inefficient motion that would result in a post or other mechanical fastener occupying the detection field instead of an area of the vessel that contains analytes of interest. Accordingly, taking a configuration in which the scan actuator is configured to translate the vessel along a length l in scan dimension x, the posts or other mechanical fasteners can be positioned at a distance d that is longer l. The width of the detection field in the x dimension will generally be shorter than d in the x dimension. Similar relative orientation and motion can be used for other mounts and detectors set forth herein including, for example, mounts that use other mechanical fasteners set forth herein.

The slots on a vessel that engage the posts or other mechanical fasteners on a mount can be positioned on either side of the detectable area of the vessel. For example, the distance between the slots along the x dimension can be greater than the length of the detection area of the vessel in the x dimension. Although the examples above describe configurations having only two posts and two slots, it will be understood that more than 2 posts or other mechanical fasteners can be used. For example, two pairs of posts can be used and, optionally, the first pair can be separated from the second pair by a distance d that is greater than l.

As exemplified by FIGS. 12 and 13, a mount and flow cell can be configured such that the mechanical fasteners of the mount are in the same xy plane as the region of the flow cell that is to be detected. As such, the drive plane of the mechanical fasteners will be in the same plane as the flow cell channel. Additionally, a preload can assert an orthogonal force on the flow cell (i.e. along the z dimension) such that the mechanical fasteners and flow cell body remain in the same plane during scanning.

FIGS. 16A through 16D show various components of scanning device 1600 that can be used to scan flow cell 1610. Scanning device 1600 can be used with detection systems and other device components set forth herein. Scanning device 1600 is configured to translate flow cell 1610 along the x and y axes relative to a rigid body 1628. Rigid body 1628 includes a reference surface 1601 surrounding an opening through which objective 1691 of an optical detector can observe flow cell 1610. Thin flexible heating sheets 1651 and 1652 are placed in contact with rigid body 1628 to allow temperature control of flow cell 1610. The rigid body 1628 and reference surface 1601 are components of a structural loop with the detector. The structural loop also includes adapter 1679 which fixes the position of rigid body 1628 relative to the detector. Scanning device 1600 is configured to allow bi-directional motion of flow cell 1610 along each of the two orthogonal axes x and y. Motions along both axes occur relative to the reference surface 1601 and rigid body 1628.

A beneficial aspect of scanning device 1600 is that motion along the x dimension can be achieved using a low mass mount, for example, the mount including rack 1620, bearing 1673, post 1621 and post 1622. As set forth previously herein, an advantage of moving a low mass is to facilitate relatively rapid settling time, which in turn results in faster scanning for high resolution applications as compared to the high mass stages used in standard scanning devices. The system shown in FIG. 16 is configured for rapid settling time when scanning occurs along the x dimension since only the mount and flow cell are moved in this dimension. Components that are dedicated to linear actuation in the y dimension are also present but need not be moved to achieve translation along x.

Flow cell 1610 includes fluidic connectors 1665 and 1667 and wings 1611 and 1612. The wings are in a plane that is offset from the plane of the body of flow cell 1610. The offset of wings 1611 and 1612 accommodate posts 1621 and 1622 such that the body of flow cell 1610, which includes a channel that is to be detected, will be in the same xy plane as the posts. When compression foot 1630 is pushed against flow cell 1610, the flow cell will be held against reference surface 1601 such that movement of the posts in the x or y dimension will produce a force on the flow cell that is in the same plane as the channel that is to be detected. This, in turn, maintains alignment of flow cell 1610 and reference surface 1601 in the z dimension for accurate detection. Reference surface 1601 protrudes from rigid body 1628 by about 0.1 mm along the z dimension. The protrusion isolates the point of contact between the structural loop and flow cell 1610 such that the footprint for the contact is similar to the footprint of compression foot 1630 on the opposite side of flow cell 1610. Accordingly, any imperfections in the flatness of rigid body 1628 or of flow cell 1610 that are distal to the region of detection will not result in warpage of the flow cell at the region of detection. Post 1621 has two pins 1624 and 1625 that slot into two holes on wing 1611. Post 1622 has a single pin 1623 that slots into a hole on wing 1612. The asymmetry in the number of pins and holes provides a physical barrier to prevent a user from placing a flow cell on the mount in the wrong orientation. The pins function to fix the flow cell relative to the posts in the xy plane to allow efficient transfer of motion from the scanning device to the flow cell when scanning along the x or y dimension.

Flow cell 1610 is moved along the x dimension under the force of stepper motor 1629 which rotates pinion 1680 against the teeth of rack 1620. The rack is attached to bearing 1673 which slides on rail 1671. Flow cell 1610 is moved in the y dimension under the force of ball guided system 1640 which functions to displace the mount (including rack 1620, post 1621 and post 1622), adapter 1645, stepper motor 1645, rail 1681 and bearing 1673 along the y dimension. Thus, movement along the y dimension results in displacement of a larger mass compared to movement along the x dimension. In this configuration, scanning along the x dimension can be performed more rapidly than scanning along the y dimension due to the faster settling time for the mass moved along the x dimension. Accordingly, it is more time efficient to scan the flow cell by scanning along the x dimension to acquire parallel swaths of the flow cell and stepping along y to initiate acquisition of each of the swaths. This will result in fewer steps along the y dimension than along the x dimension. It will be understood that the sliding linear rack 1671 can be replaced with a ball guided system or other linear actuator. Similarly, ball guided system 1640 can be replaced with a sliding rack or other linear actuator.

FIG. 16 exemplifies a mechanically activated preload, in this case activated by hand. Compression foot 1630 can be applied to flow cell 1610 using lever 1632 which is activated by hand to move the preload along the z dimension. The preload includes compression foot 1630 and arm 1631 which transfers force from lever 1632 to compression foot 1630. The lever 1632 is mounted to rigid supports 1677 and 1678 which function to attach the preload to adapter 1679. As such, the preload is physically aligned with the structural loop between reference surface 1601 and the detector. The preload includes ball bearing 1636 which contacts flow cell 1610 to provide a low friction contact during scanning. The ball bearing is held in place by compression foot 1630 which is attached to piston 1637. Piston 1637 can move within cylinder 1636, along the z dimension, to provide variability in the distance between the flow cell 1610 and lever arm 1632. Movement of the piston 1637 into the cylinder 1636 is counterbalanced by spring 1635. The spring maintains a pushing force on flow cell 1610, pushing it against reference surface 1601.

Although scan actuators are exemplified herein using a configuration in which a mount has posts that engage slots on a flow cell, other mechanical fasteners can be used. For example, the fastener components can be reversed such that the mount has one or more slots that engage one or more post on a flow cell. Other mechanical fastener pairs include, but are not limited to, a hook and complementary latch, a plug and complementary receptacle, or a male component that complements a female component. In some configurations the fasteners can be threaded, however, threads need not be present in the fasteners used herein. The scan actuators described herein in the context of FIGS. 12 through 14 and 16 and 17 can interact with a preload, such as a preload set forth herein supra. The preload can be configured to urge the vessel to contact the reference surface, while the vessel interacts with one or both of an x-linear actuator and a y-linear actuator. Taking FIG. 12A as an example the preload (not shown) can be configured to apply pressure into the page to press a vessel (not shown) onto reference surface 803. In the example of FIG. 13A, a preload (not shown) would apply pressure into the face of flow cell assembly 1000 that is shown in the figure. The preload can urge the vessel to contact the reference surface while detection occurs and, optionally, the preload can urge the vessel to contact the reference surface during one or both of translation along the x dimension and translation along the y dimension.

A scanning apparatus of the present disclosure can be configured to maintain flatness of a vessel while a preload is applied. In such configurations, the slots on the vessel are configured to engage the posts to provide desired positioning of the vessel in the x and y dimensions, and to allow the full length of the vessel to be planar when the preload urges the vessel to contact the reference surface. Thus, the slots on the vessel can be configured to avoid pushing or pulling on the posts (along the z dimension) in a way that would bend the vessel when the preload is applied. The use of open sided slots, as exemplified in FIG. 12C, provides an advantage of increasing the tolerance of the system against loss of planarity because the slots have increased range of travel along the z axis without hitting the post. Of course, the slots can have other cross-sectional shapes that accommodate a range of travel along z including for example, the enclosed slot shapes set forth previously herein. Maintaining vessel planarity in this way can prevent permanent warpage to the vessel and improve detection accuracy.

Examples of preloads that can be used in a scanning apparatus set forth in this example, or in other scanning apparatus set forth herein include, for example, preloads that apply pressure under the force of a motor, solenoid or magnet. For configurations that use a motor or solenoid, the preloads can be coupled with a pressure sensor. The pressure sensor can participate in a feedback loop in order to maintain a predefined range of pressure for the preload on the vessel.

In the case of a magnetic preload, the preload can have a shape that is complementary to the shape of the reference surface. For example, a preload magnet having a ring-shaped footprint can be applied to a vessel that is in contact with a ferromagnetic reference surface that is also ring-shaped. Moreover, the width of the ring for the reference surface can be the same or similar as the width of the preload. It will be understood that in the case of a magnetic preload, the preload and reference surface can have opposite polarity so as to be attracted to each other. Opposite polarity can be achieved by configuring the preload to be a magnet of one polarity while the reference surface is a magnet of opposite polarity, by configuring the preload to be a magnet while the reference surface is ferromagnetic, or by configuring the preload to be ferromagnetic while the reference surface is magnetic. Electromagnets can be used for one or both of the preload and reference surface, thereby allowing for convenient reversibility of attraction and/or repulsion between the reference surface and preload.

Low friction contact between the preload and vessel is desirable, as is low friction contact between the reference surface and vessel. Any of a variety of materials that provide low friction can be used such as those set forth supra. In particular configurations of the scanning apparatus provided in this example or elsewhere herein, low friction can be achieved by use of a lubricating liquid. In cases where the lubricating liquid is applied to the side of a vessel through which detection or other processing will occur, the liquid can be removed from areas of interest. For example, liquids can be removed by wiping using a system such as that set forth in U.S. Pat. No. 9,469,112, which is incorporated herein by reference. Hygroscopic polyethylene glycol is a useful lubricant. As an alternative or addition to wiping techniques, a lubricating liquid can be removed by application of an appropriate solvent that will clean the surface or a volatile lubricating liquid can be used under temperature and pressure conditions that allow the liquid to evaporate from the surface after lubrication is done.

In some configurations the linear actuation function and the preload function can be provided by the same component. For example, a scanning apparatus, can include (a) a vessel having a lumen and a wall, wherein the wall has an internal surface and an external surface, wherein the internal surface contacts the lumen, wherein the external surface has a first linear actuation component; (b) a reference surface; and (c) a second linear actuation component that is configured to engage the first linear actuation component to effect linear motion of the vessel, and wherein the second linear actuation component is further configured to function as a preload that urges the external surface of the vessel to contact an area on the reference surface.

A combined linear actuator and preload component can be used in a detection apparatus, such as those having one or more components exemplified herein. For example, a scanning detection apparatus, can include (a) a vessel having a lumen and a wall, wherein the wall has an internal surface and an external surface, wherein the internal surface contacts the lumen, wherein the external surface has a first linear actuation component; (b) a reference surface that forms a structural loop with a detector; (c) a second linear actuation component that is configured to engage the first linear actuation component to effect linear motion of the vessel, and wherein the second linear actuation component is further configured to function as a preload that urges the external surface of the vessel to contact an area on the reference surface; and (d) a transmitter configured to direct, to the detector, a signal from the internal surface or the lumen, when the external surface of the vessel is urged by the preload to contact the reference surface.

Figure 15:
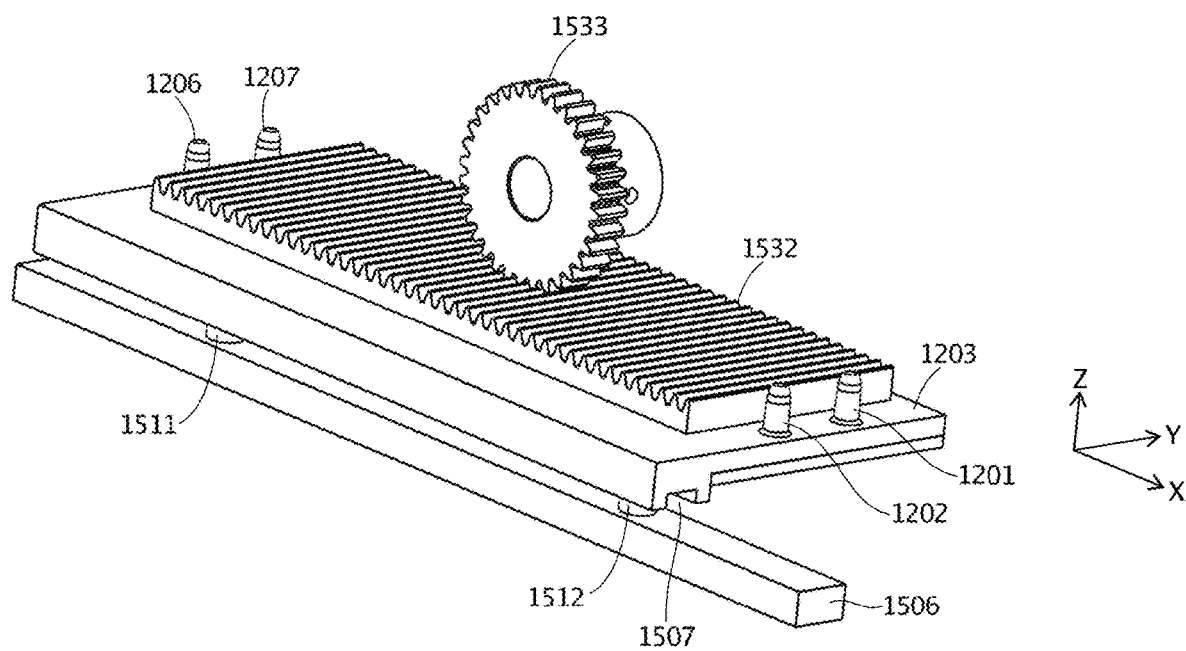
FIG. 15 shows a scanning apparatus having a combined linear actuator and preload component.
Figure 16A:
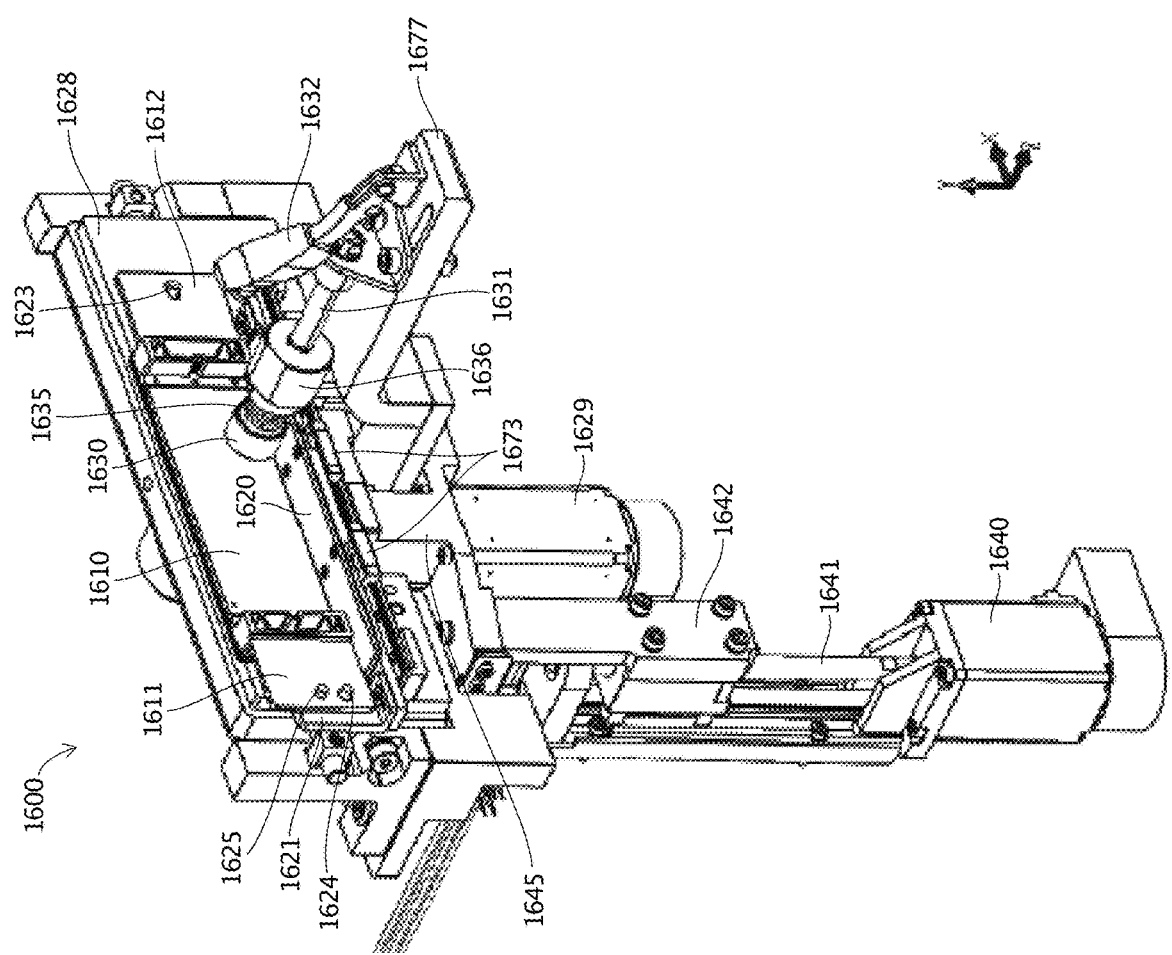
FIG. 16A shows a perspective view of a scanning device and mounted flow cell.
Figure 16B:
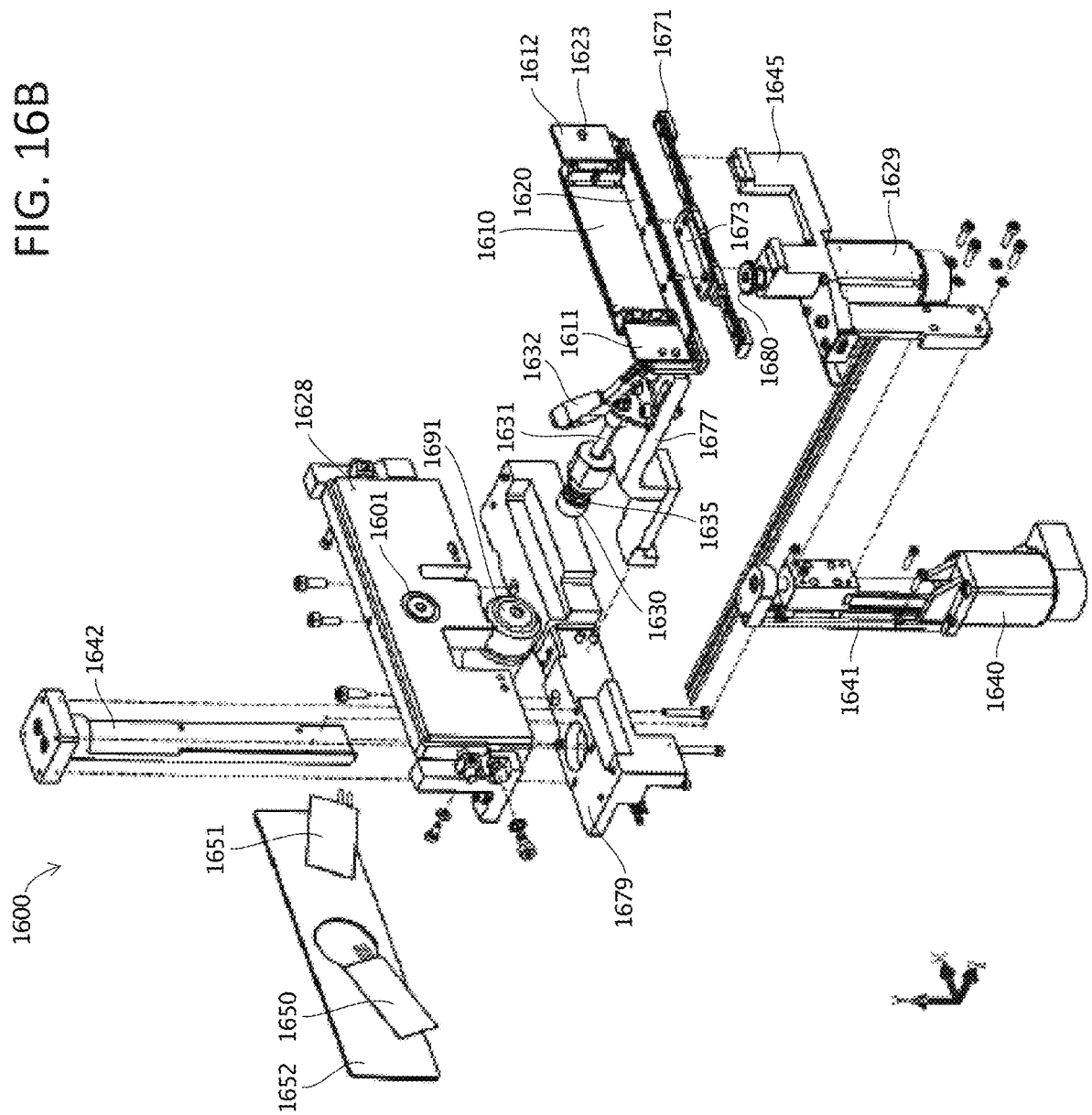
FIG. 16B shows an exploded view of the scanning device and flow cell.
Figure 16C:
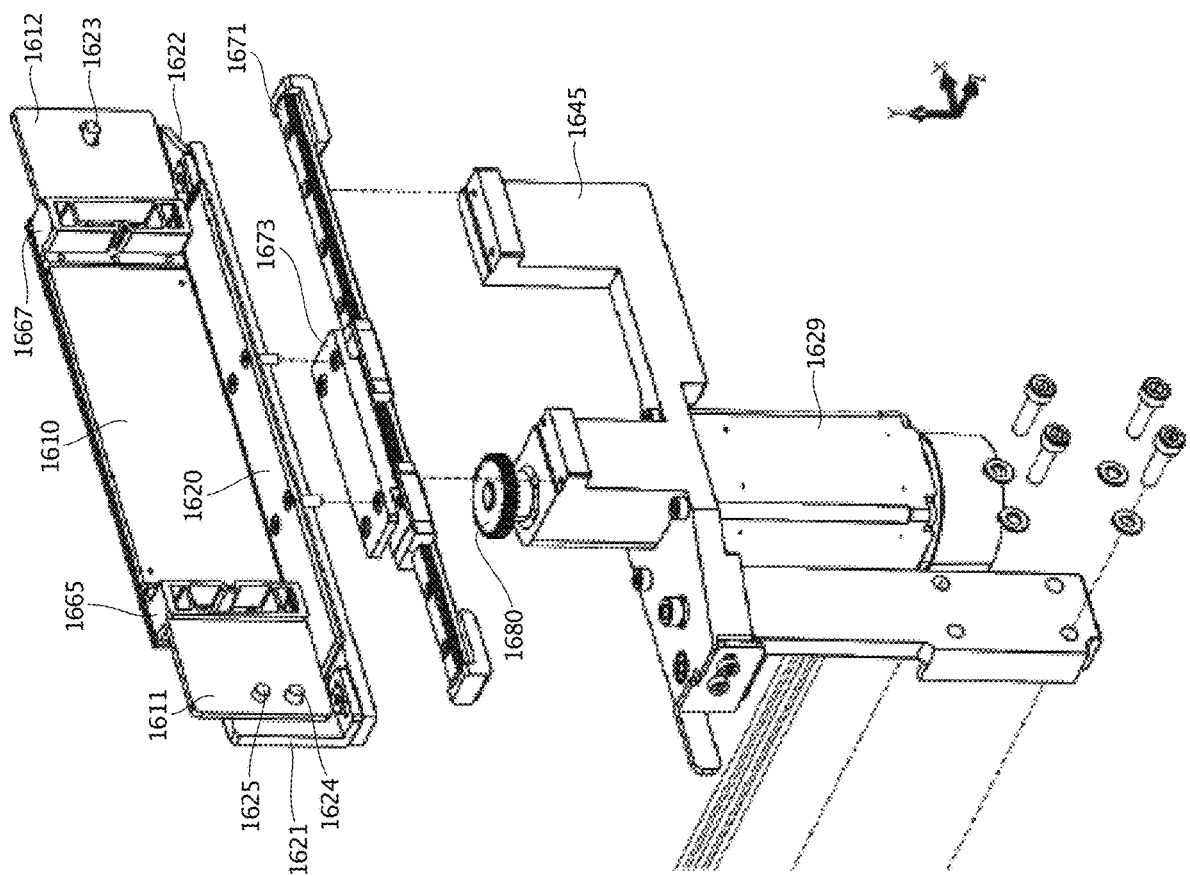
FIG. 16C shows an exploded view of a subset of the components of the scanning device.
Figure 16D:
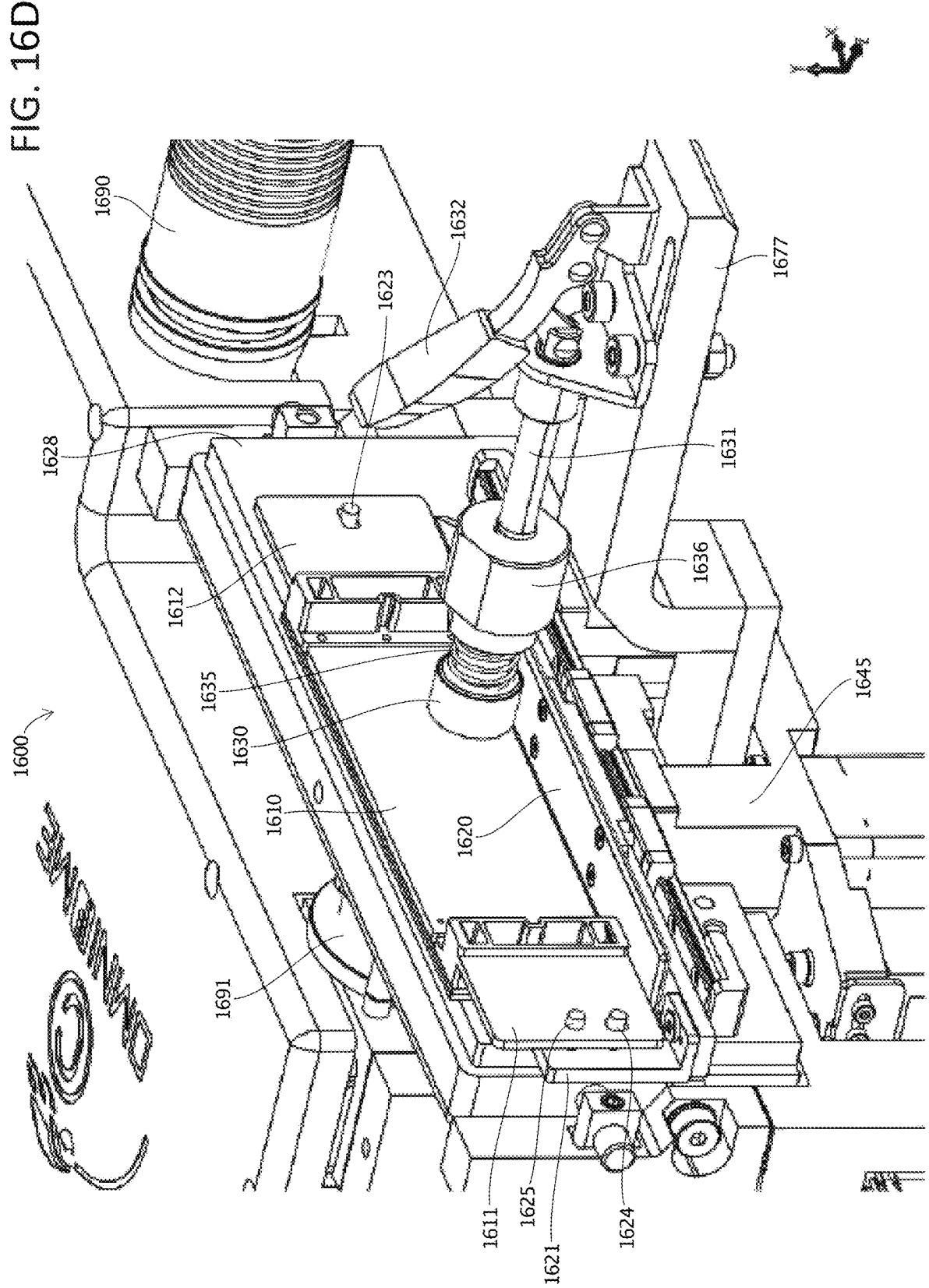
FIG. 16D shows a perspective view of a subset of the scanning device components.

An exemplary scanning apparatus having a combined linear actuator and preload component is shown in FIG. 15. A flow cell assembly includes a body 1203 having ingress fluidic channels 1206 and 1207 and egress fluidic channels 1201 and 1202. The external surface of the flow cell body 1203 is attached to a rack 1532. The rack 1532 spans an area on the surface of the flow cell body 1203 that mirrors the length and width of the detectable surface of the flow cell that is on the opposite side. As such, the pinion 1533 can function to translate the flow cell assembly so that the reference surface can address a large area that is opposite the area of the rack and the pinion can function as a preload to urge the localized area of the flow cell that is opposite the pinion to contact the reference surface for detection. The flow cell assembly also has a slot 1507 that engages pins 1511 and 1512 on support 1506. The pins maintain linear motion of the flow cell 1203 to prevent unwanted yaw. The support 1506 can be actuated along they axis, orthogonal to the direction of scan actuated by pinion 1533, using any of a variety of y-linear actuators such as those set forth herein.

It will be understood that the flow cell assembly in FIG. 15 is exemplary and can be replaced by other vessels set forth herein. Moreover, the rack 1532 can be affixed directly to the vessel or, alternatively, the rack can be affixed to a frame such as the frame shown in FIG. 14. In other configurations, the rack and pinion components can be replaced with the complementary components of any of a variety of other linear actuators set forth herein or known in the art. Generally, the component that has the dual function of driving translation and preloading will be configured to provide an equal force across the surface area of the flow cell that contacts the reference surface. Also the dual function component can be configured to have a compliant interaction with the actuation component that is affixed to the flow cell (or flow cell frame).

Figure 17A:
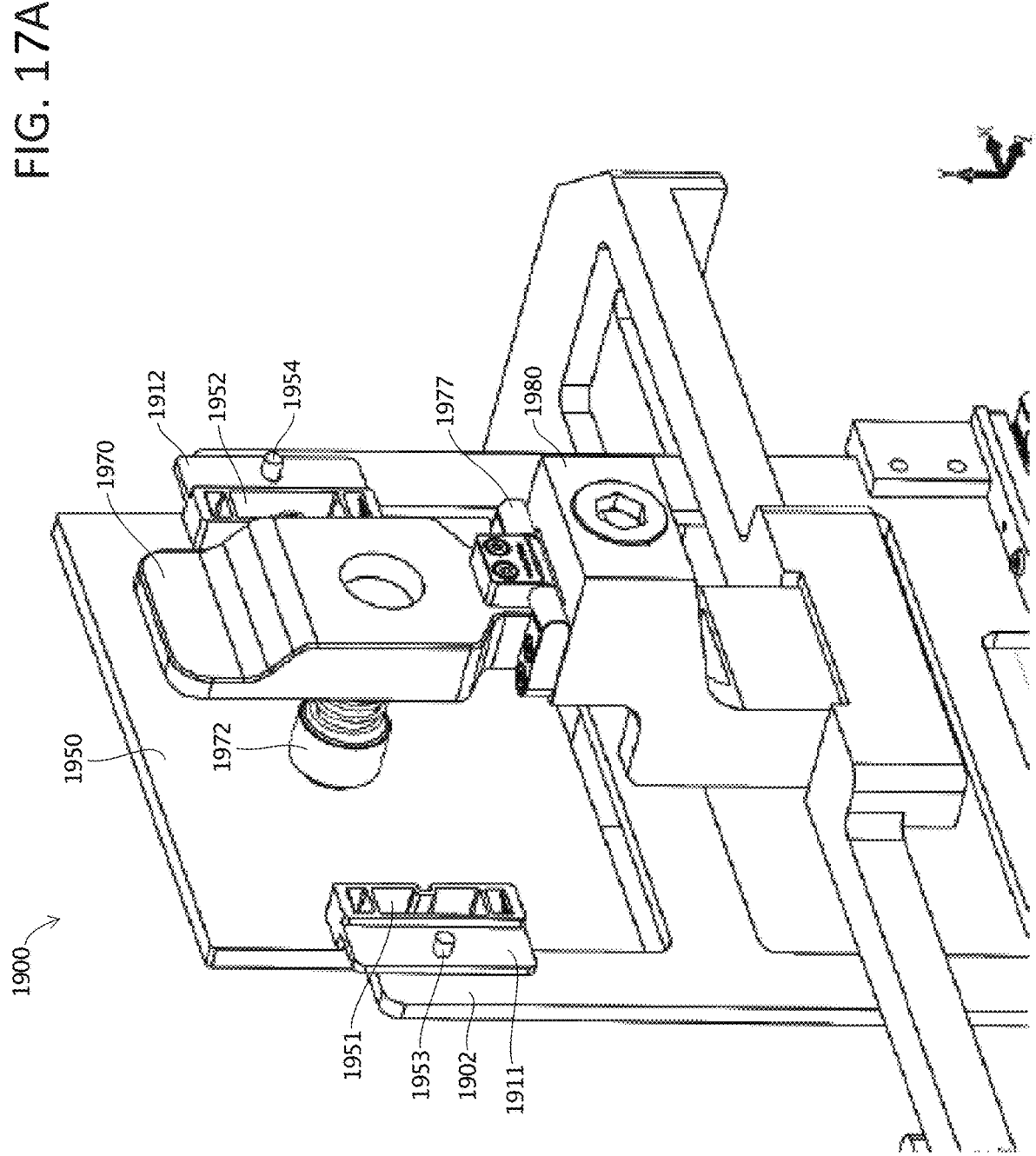
FIG. 17A shows a perspective view of an xy scan actuator and flow cell in contact with a preload that is activated by a torque lever.
Figure 17B:
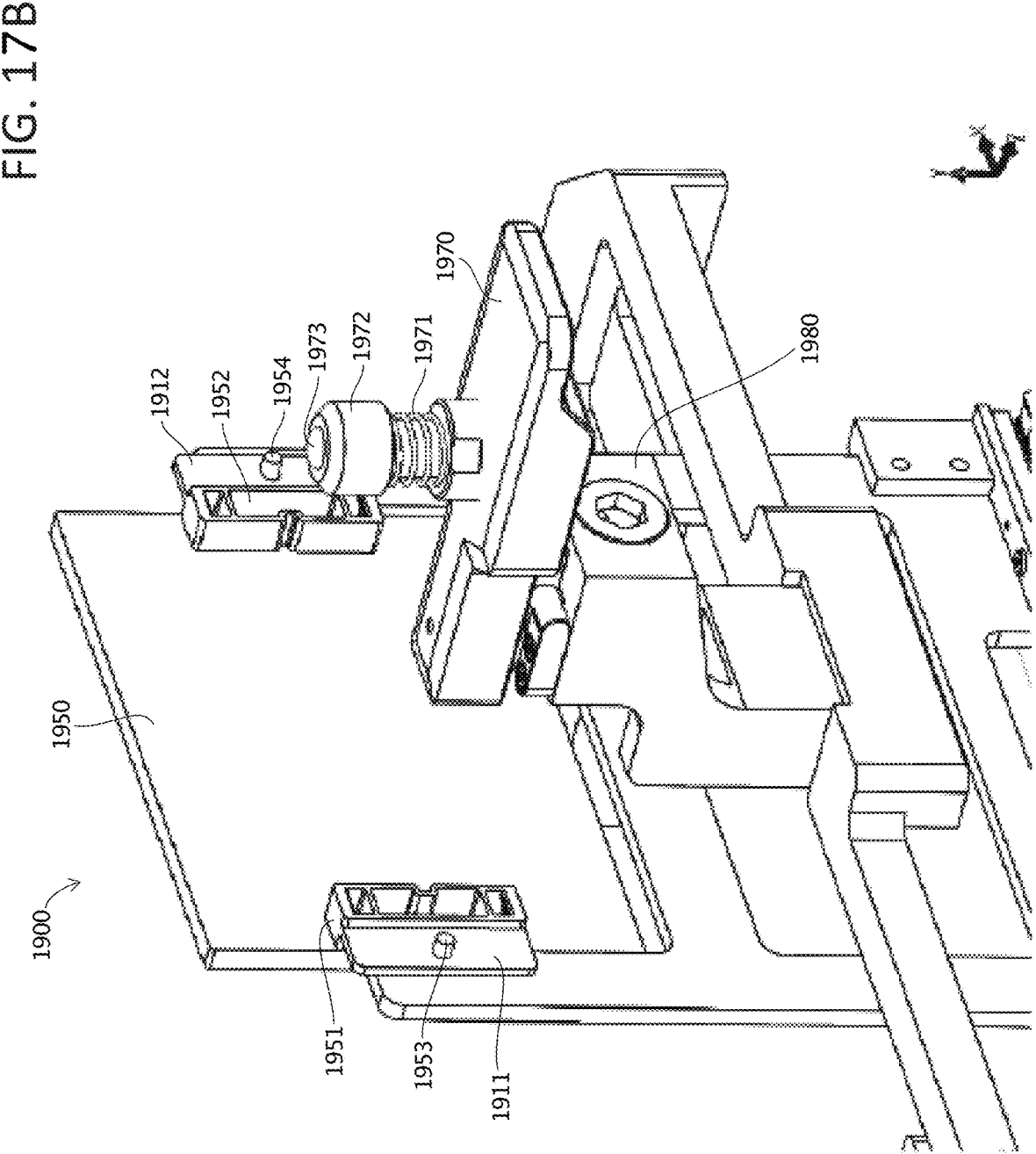
FIG. 17B shows a perspective view of the xy scan actuator and flow cell, wherein the preload is disengaged from the flow cell.
Figure 17C:
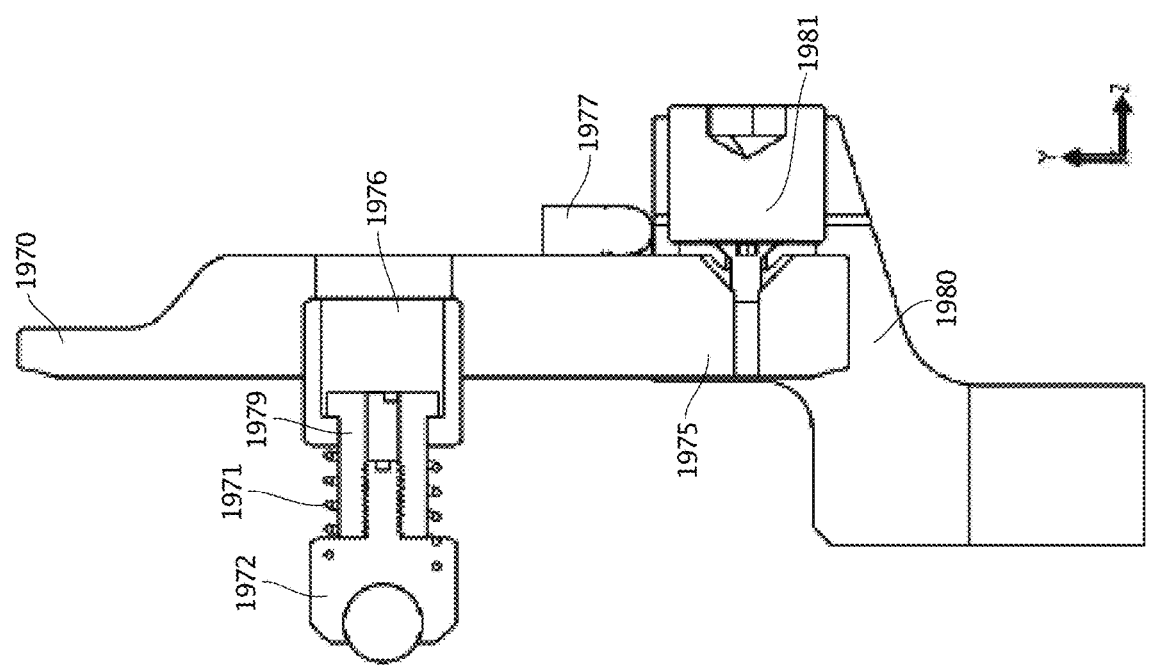
FIG. 17C shows a cross-section view of the preload.

FIG. 17 shows preload 1990 interacting with flow cell 1950 on xy scan actuator 1900. Flow cell 1950 is mounted on monolithic rack 1902 via pins (e.g. pin 1953) that engage holes on wings of the flow cell. Also shown are fluidic connectors 1951 and 1952 engaged with the inlets and outlets of flow cell 1950. Preload 1990 exemplifies another mechanical mechanism for applying a preload to flow cell 1950. Here a user can manipulate lever 1970 by hand such that preload head 1972 rotates via hinge 1977 in the yz plane to bring ball bearing 1973 into contact with the surface of flow cell 1950. The distal end of lever 1970, labeled as 1975, is shaped to fit within a slot in support 1980. The slot prevents the preload from rotating around the z axis. The distal end 1975 of the lever is attracted to magnet 1981 such that the preload 1990 is held in place once engaged by a user. The preload includes ball bearing 1973 which contacts flow cell 1950 to provide a low friction contact during scanning. The ball bearing is held in place by head 1972, which is attached to piston 1979. Piston 1979 can move within cylinder 1981, along the z dimension, to provide variability in the distance between the flow cell 1950 and lever arm 1970. Movement of the piston 1979 into the cylinder 1976 is counterbalanced by spring 1971. The spring maintains a pushing force on flow cell 1950, pushing the flow cell against a reference surface on a rigid body (not shown).

Figure 18A:
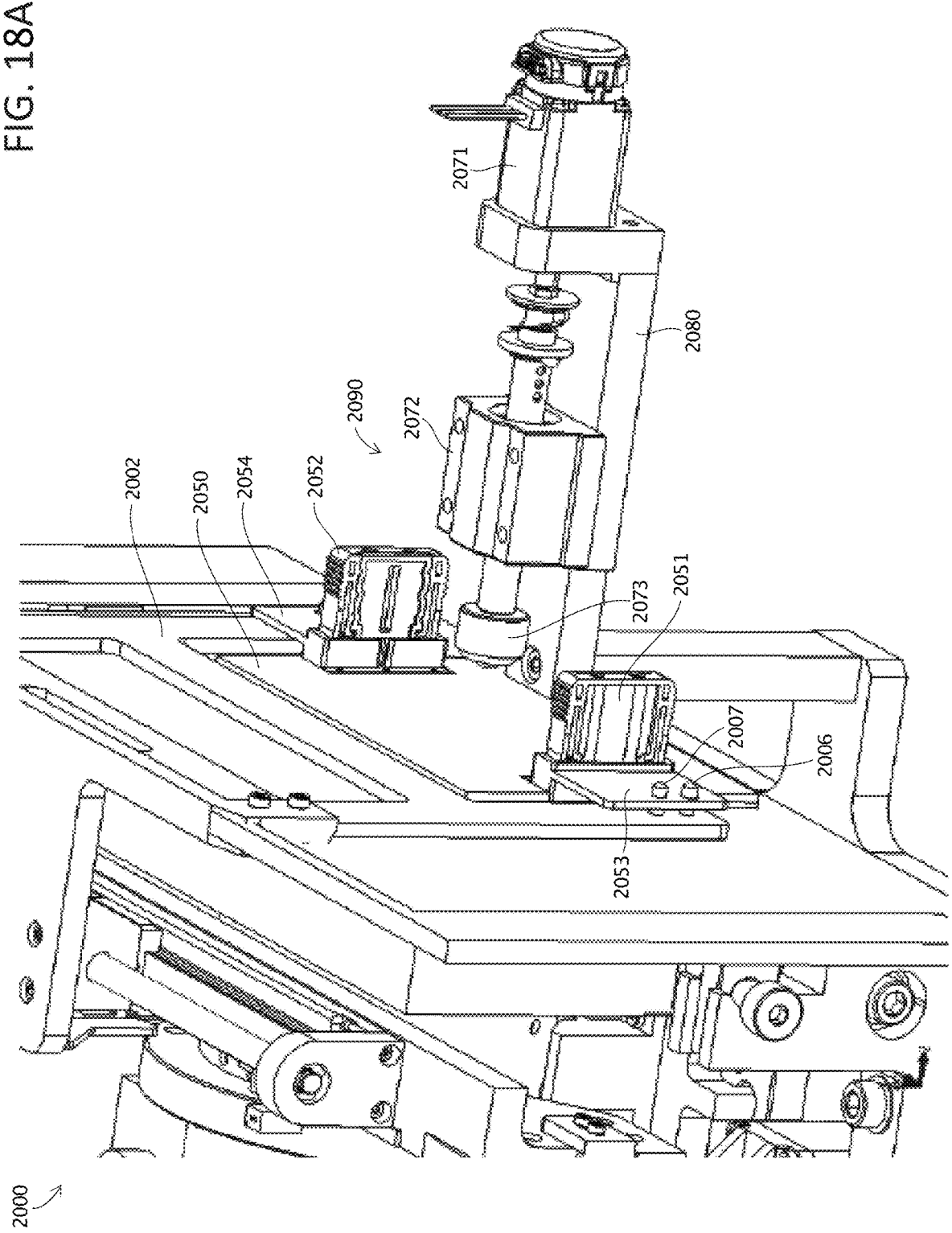
FIG. 18A shows a perspective view of an xy scan actuator and flow cell in contact with a preload that is activated by a screw-drive.
Figure 18B:
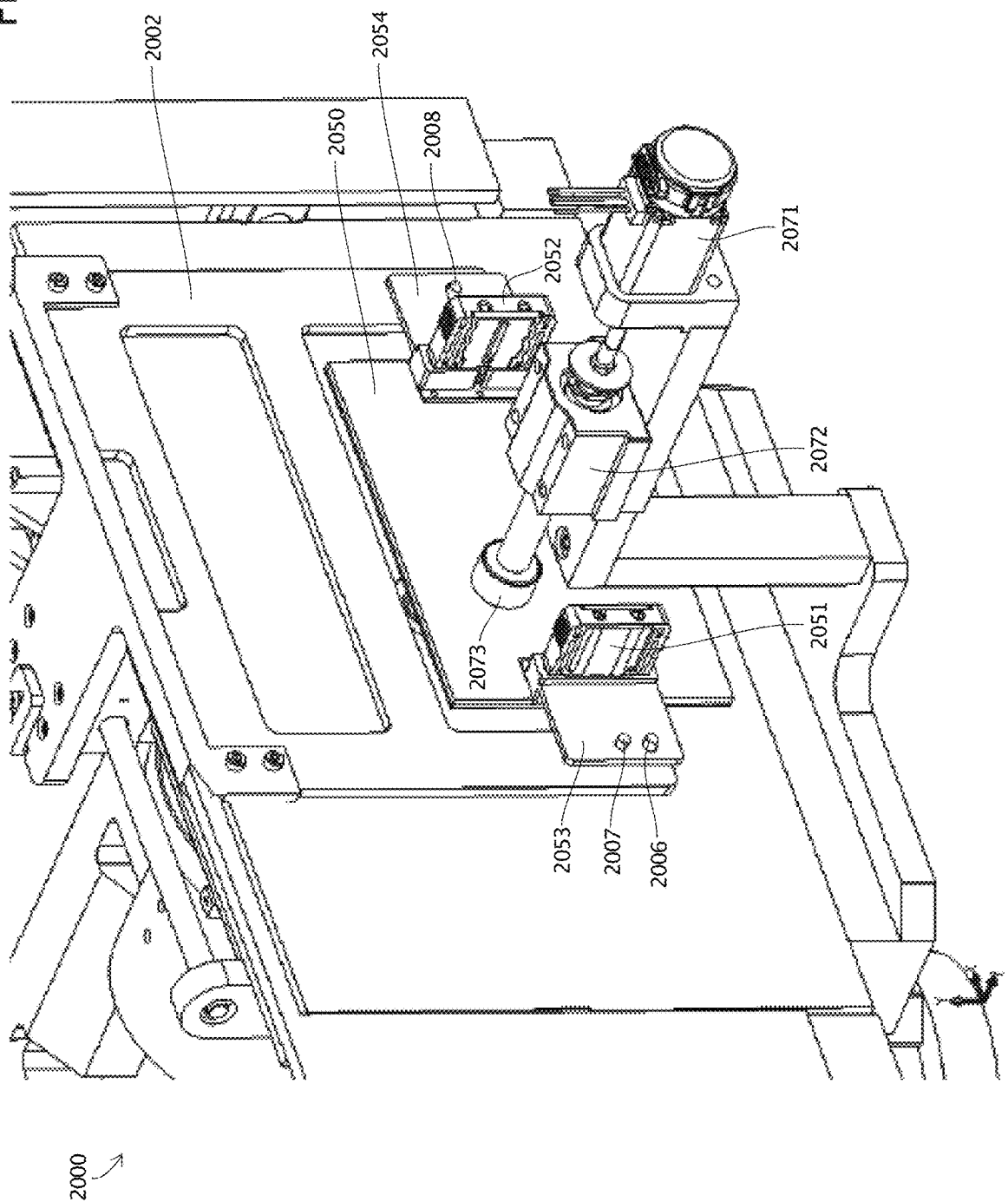
FIG. 18B shows a perspective view of the xy scan actuator and flow cell, wherein the preload is disengaged from the flow cell.

FIG. 18 shows an xy scan actuator and flow cell in contact with a preload that is activated by a screw drive. Flow cell 2050 is mounted on monolithic rack 2002 via pins (e.g. pin 2053) that engage holes on wings of the flow cell. Also shown are fluidic connectors 2051 and 2052 engaged with the inlets and outlets of flow cell 2050. Preload 2090 uses a captive screw mechanism that is electrically activated, for example, by a switch on the scan actuator, a command provided from a user via a graphical user interface, software implementation based on status of the apparatus such as the opening or closing of a door to the stage area, or the like. Activating the motor 2071 brings ball bearing 2073 into contact with the surface of flow cell 2050 due to a clockwise screwing motion of threads on the preload shaft against threads inside of fixed unit 2072. The motor can also be actuated in the opposite direction, rotating in a counterclockwise direction to displace the preload from the surface of the flow cell. The ball bearing is held in place by head 2073. Movement of head 2073 relative to motor 2071 is mediated by spring 2071. The spring maintains a pushing force on flow cell 2050, pushing it against a reference surface on rigid body 2001. The preload is attached to rigid body 2001 via cantilever arm 2080. The preloads shown in FIGS. 17 and 18 can be used with detection systems, scan actuators or other device components set forth herein. Any of a variety of other automated mechanisms can be used to move a preload such as rack and pinion mechanisms, pneumatic mechanisms or mechanisms set forth herein with regard to translation of a vessel, or a cartridge or mount for a vessel.

The scan actuators exemplified herein in the context of FIGS. 12 through 18 demonstrate useful methods for scanning a vessel. For example, a method of scanning a vessel can include steps of (a) providing a scan actuator including a linear actuator and a mount, wherein the mount includes a mechanical fastener (e.g. one or more posts); (b) engaging a vessel with the mount, whereby the mechanical fastener is engaged with a complementary mechanical fastener on the vessel, wherein the vessel has a lumen and a wall, wherein the lumen contains analytes; (c) activating the scan actuator to slide the engaged vessel along a reference surface, and wherein the reference surface contacts at most a portion of the wall during the sliding; and (d) processing the analytes at different locations along the vessel, wherein the vessel is urged to the reference surface by a preload during the processing, thereby scanning the vessel.

For ease of illustration, scan actuation methods will be exemplified in the context of detection methods. However, the scan actuation methods can be used for processing techniques other than detection, such as those set forth herein supra.

A method of scanning a vessel can include steps of (a) providing a scan actuator including a linear actuator and a mount, wherein the mount includes a mechanical fastener (e.g. one or more posts); (b) engaging a vessel with the mount, whereby the mechanical fastener is engaged with a complementary mechanical fastener on the vessel, wherein the vessel has a lumen and a wall, wherein the lumen contains analytes; (c) activating the scan actuator to slide the engaged vessel along a reference surface of a detection apparatus, wherein the reference surface contacts at most a portion of the wall during the sliding, and wherein the reference surface forms a structural loop with a detector; and (d) detecting the analytes at different locations along the vessel using the detector, wherein the vessel is urged to the reference surface by a preload during the detecting, thereby scanning the vessel.

In some configurations a method of scanning a vessel can include steps of (a) providing a scan actuator having a linear actuator and a mount, wherein the mount includes a mechanical fastener (e.g. one or more posts); (b) engaging a vessel with the mount, whereby the mechanical fastener is engaged with a complementary mechanical fastener on the vessel, wherein the vessel has a lumen and a wall, wherein the lumen contains analytes; (c) examining a first subset of analytes in the engaged vessel while applying a preload to a first portion of the wall, wherein the preload positions the first subset of analytes to occupy an xy plane in a detection zone, wherein the preload is not applied to a second portion of the vessel; (d) activating the scan actuator to translate the engaged vessel to position a second subset of the analytes in the xy plane of the detection zone; and (e) examining the second subset of the analytes in the engaged vessel while applying the preload to a second portion of the vessel, wherein the preload positions the second subset of the analytes to occupy the xy plane of the detection zone, wherein the preload is not applied to the first portion of the vessel, thereby scanning the vessel.

In particular configurations, a vessel mount can be an integral component of a scanning apparatus and the vessel can be a removeable component. For example, the scanning apparatus can be configured to allow convenient placement of the vessel on the mount by hand. Alternatively or additionally, removal of the vessel from the mount can be performed by hand in some configurations. For example, as set forth above in the context of the flow cell in FIG. 12C, a vessel can have slots with an open side that allow the vessel to by pushed against one or more post that is present on the mount. Another option for mounting a vessel on a mount include sliding the slots along the long dimension of the posts. This sliding motion can be used for vessels having slots with a fully enclosed cross-sectional shape. The opposite motions can be used to remove the vessels in the respective examples above.

A benefit of using a removable vessel in a scanning apparatus is that the apparatus can be used with different vessels that are dedicated to a particular sample. This in turn provides for use of consumable vessels, a first of which is placed on a scanning apparatus for processing a first sample, then removed from the apparatus and replaced with a second vessel having a second sample to be processed. The vessels can be discarded after use. Vessels need not be discarded and can be re-used, for example, is situations where the cost of a new vessel outweighs the risk of contamination between samples.

A scanning method can employ a vessel mount that is translated by any variety of actuation mechanisms. For example, a vessel mount can be translated by a mechanical mechanism such as a screw mechanism (lead screw, screw jack, ball screw or roller screw), a wheel and axle mechanism (e.g. rack and pinion, belt drive, hoist, winch, chain drive or belt drive) or a cam mechanism; hydraulic mechanism; pneumatic mechanism; magnetic mechanism; piezoelectric mechanism; or electromechanical mechanism. Such mechanisms can supplement or replace the x-linear actuator and/or y-linear actuator exemplified for the vessel mount in regard to FIGS. 12 through 18.

Any of a variety of analytes can be detected or otherwise processed in a method of the present disclosure. Exemplary analytes and processing methods are set forth herein supra. For example, a scanning apparatus or method set forth herein in the context of FIGS. 12 through 18 can be used for sequencing nucleic acids. Reagents and methodologies for various sequencing techniques that can be used, such as SBS or SBB' are set forth herein supra. In many configurations, nucleic acids are presented as an array of features on a solid surface and the array is detected by scanning in the course of a sequencing process or other process.

Throughout this application various publications, patents and/or patent applications have been referenced. The disclosures of these documents in their entireties are hereby incorporated by reference in this application.

The term "comprising" is intended herein to be open-ended, including not only the recited elements, but further encompassing any additional elements.

As used herein, the term "each," when used in reference to a collection of items, is intended to identify an individual item in the collection but does not necessarily refer to every item in the collection. Exceptions can occur if explicit disclosure or context clearly dictates otherwise.

A number of embodiments have been described. Nevertheless, it will be understood that various modifications may be made. Accordingly, other embodiments are within the scope of the following claims.

What is claimed is:

1. A scanning detection apparatus, comprising:
   (a) a scan actuator comprising a linear actuator and a mount for a removable vessel, wherein the mount comprises a mechanical fastener that is configured to engage a complementary mechanical fastener on the removable vessel, and wherein the linear actuator is configured to translate the mount thereby sliding the removable vessel while the mechanical fastener engages the complementary mechanical fastener on the removable vessel;
   (b) a detection apparatus comprising a reference surface that forms a structural loop with a detector, and an objective configured to direct an optical signal from the removable vessel to the detector; and
   (c) a preload configured to urge the removable vessel to contact the reference surface, wherein the linear actuator is configured to slide the removable vessel along the reference surface while the preload urges the removable vessel to contact the reference surface,
   wherein the reference surface is parallel to an xy plane of a Cartesian coordinate system,
   wherein the linear actuator is configured to move the mechanical fastener along the x dimension, thereby sliding the removable vessel along the x dimension, and
   wherein the mechanical fastener comprises a post, wherein the post runs lengthwise along the y dimension.

2. The apparatus of claim 1, wherein the mount comprises a second post that runs lengthwise along the y dimension, wherein the post and the second post are separated by a distance l along the x dimension, and wherein the distance l along the x dimension is greater than the length of the reference surface along the x dimension.

3. The apparatus of claim 2, wherein the post comprises a pin that protrudes from the post lengthwise along the z dimension and, wherein the second post comprises a pin that protrudes from the post lengthwise along the z dimension.

4. The apparatus of claim 3, wherein the removable vessel is engaged with the mount, wherein the removable vessel comprises a hole that is engaged with the pin of the post, and wherein the removable vessel comprises a second hole that is engaged with the pin of the second post.

5. The apparatus of claim 1, wherein the mount comprises a rack, and wherein the linear actuator comprises a motor driven pinion that is configured to engage the rack, thereby translating the mount.

6. The apparatus of claim 5, wherein the scan actuator further comprising a y actuator that is configured to displace the mount along the y dimension, thereby displacing the vessel along the y dimension.

7. A method of scanning the removable vessel of the scanning apparatus of claim 1, comprising:
   (i) engaging the removable vessel with the mount by engaging the mechanical fastener on the mount with the complementary mechanical fastener on the removable vessel, wherein the removable vessel comprises a lumen and a wall, and wherein the lumen comprises analytes;
   (ii) activating the scan actuator to slide the engaged removable vessel along the reference surface of the detection apparatus, wherein the reference surface contacts at most a portion of the wall during the sliding; and
   (iii) detecting the analytes at different locations along the engaged removable vessel using the detector, wherein the engaged removable vessel is urged to the reference surface by the preload during the detecting.

8. The method of claim 7 wherein the mechanical fastener further comprises a second post, wherein the post and the second post run lengthwise along the y dimension, and wherein the post and the second post are separated by a distance l along the x dimension.

9. The method of claim 8, wherein the removable vessel comprises a slot that is engaged with the post and further comprises a second slot that is engaged with the second post, and wherein the vessel comprises a detection zone that is located between the slot and the second slot along the x dimension.

10. The method of claim 9, wherein the distance l along the x dimension is greater than the length of the reference surface along the x dimension.

11. The method of claim 8, wherein the post comprises a pin that protrudes from the post lengthwise along the z dimension and, wherein the second post comprises a pin that protrudes from the post lengthwise along the z dimension.

12. The method of claim 11, wherein the removable vessel comprises a hole that is engaged with the pin of the post and wherein the vessel comprises a second hole that is engaged with the pin of the second post.

13. The method of claim 7, wherein the scan actuator further comprises a y actuator, the method further comprising:
   (iv) activating the scan actuator to slide the engaged removable vessel along the reference surface of the detection apparatus, wherein the scan actuator slides the engaged removable vessel along the y dimension of the xy plane; and
   (v) repeating (ii) and (iii), wherein the activating of the scan actuator slides the engaged removable vessel along the reference surface for a path that is parallel to the x dimension.

14. The method of claim 7, wherein the detecting of the analytes comprises transmitting optical signals from a field of view at each of the different locations along the removable vessel to the detector while the vessel is urged to the reference surface by the preload.

15. The method of claim 7, further comprising, after (iii), removing the removable vessel from the mount by disengaging the mechanical fastener from the complementary mechanical fastener.

16. The method of claim 15, further comprising, after removing the removable vessel, engaging a second removable vessel with the mount, whereby the mechanical fastener is engaged with a complementary mechanical fastener on the second vessel, wherein the second vessel comprises a lumen and a wall, wherein the lumen comprises analytes.

17. The method of claim 16, further comprising repeating (ii) and (iii) using the second removable vessel in place of the vessel.

18. A method of detecting analytes in the removable vessel of the scanning apparatus of claim 1, comprising:
   (i) engaging the removable vessel with the mount by engaging the mechanical fastener on the mount with the complementary mechanical fastener on the removable vessel, wherein the removable vessel comprises a lumen and a wall, wherein the lumen comprises analytes;
   (ii) examining a first subset of analytes in the engaged removable vessel while applying the preload to a first portion of the wall, wherein the preload positions the first subset of analytes to occupy an xy plane in a detection zone, wherein the preload is not applied to a second portion of the vessel;
   (iii) activating the scan actuator to translate the engaged removable vessel to position a second subset of the analytes in the xy plane of the detection zone; and
   (iv) examining the second subset of the analytes in the engaged removable vessel while applying the preload to a second portion of the removable vessel, wherein the preload positions the second subset of the analytes to occupy the xy plane of the detection zone, wherein the preload is not applied to the first portion of the removable vessel, thereby scanning the removable vessel.

* * * * *